(12) United States Patent
Allen

(10) Patent No.: US 8,186,229 B2
(45) Date of Patent: *May 29, 2012

(54) ULTRASONIC FLOW METER HAVING A PORT COVER ASSEMBLY

(75) Inventor: Charles R. Allen, Houston, TX (US)

(73) Assignee: Daniel Measurement and Control, Inc., Houston, TX (US)

( * ) Notice: Subject to any disclaimer, the term of this patent is extended or adjusted under 35 U.S.C. 154(b) by 331 days.

This patent is subject to a terminal disclaimer.

(21) Appl. No.: 12/683,122

(22) Filed: Jan. 6, 2010

(65) Prior Publication Data

US 2011/0162463 A1    Jul. 7, 2011

(51) Int. Cl.
*G01F 1/20* (2006.01)
*G01F 1/66* (2006.01)

(52) U.S. Cl. .................. 73/861.18; 73/861.27

(58) Field of Classification Search .............. None
See application file for complete search history.

(56) References Cited

U.S. PATENT DOCUMENTS

| 4,308,754 A | 1/1982 | Pedersen et al. |
| 7,397,168 B2 | 7/2008 | Straub, Jr. et al. |
| 2011/0162460 A1* | 7/2011 | Allen et al. ............... 73/861.18 |
| 2011/0162461 A1* | 7/2011 | Allen ........................ 73/861.18 |
| 2011/0162463 A1* | 7/2011 | Allen ........................ 73/861.18 |

FOREIGN PATENT DOCUMENTS

GB    2203546 A    10/1988

OTHER PUBLICATIONS

International Application No. PCT/US2011/020026 Search Report and Written Opinion dated Aug. 18, 2011.

* cited by examiner

*Primary Examiner* — Harshad Patel
(74) *Attorney, Agent, or Firm* — Conley Rose, P.C.

(57) ABSTRACT

An ultrasonic flow meter for measuring the flow of a fluid through a pipeline. In some embodiments, the ultrasonic flow meter includes a spool piece, a transducer assembly, and a port cover assembly. The spool piece has a throughbore and a transducer port extending between the throughbore and an outer surface of the spool piece. The transducer assembly is disposed within the transducer port and includes a transformer, a piezoelectric element, and an electrical coupling therebetween. The port cover assembly is coupled to the transducer assembly. The port cover assembly receives a cable coupled to the transducer assembly and is spring-loaded to bias the port cover assembly toward the transducer assembly to resist the cable from being electrically uncoupled from the transducer assembly.

33 Claims, 29 Drawing Sheets

ULTRASONIC FLOW METER HAVING A PORT COVER ASSEMBLY

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND

The embodiments disclosed relate to ultrasonic flow meters and, more particularly, to a port cover assembly for coupling to a transducer assembly in an ultrasonic flow meter.

After hydrocarbons have been removed from the ground, the fluid stream (either in a liquid phase or a gaseous phase) is transported from place to place via pipelines. It is desirable to know with accuracy the amount of fluid flowing in the stream, and particular accuracy is demanded when the fluid is changing hands, or during "custody transfer." Even where custody transfer is not taking place, however, measurement accuracy is desirable, and in these situations ultrasonic flow meters may be used.

An ultrasonic flow meter includes two or more transducer assemblies, each secured inside of a port in the body, or spool piece, of the flow meter. To contain the transported fluid within the flow meter, an end connector is secured over the exterior end of each transducer port in the spool piece. Thus, the spool piece and end connectors create a pressure boundary that contains fluid flowing through the meter.

To measure fluid flow through the meter, a pair of transducer assemblies is positioned along the inner surface of the spool piece, such that each transducer assembly faces the other. Each transducer assembly includes a piezoelectric element. When an alternating current is applied to the piezoelectric element of the first transducer assembly, the piezoelectric element responds by radiating an ultrasonic wave in the fluid being transported through the flow meter. When the wave is incident upon the piezoelectric element of the second transducer assembly, the second transducer assembly responds by generating an electric signal. Some time later, an alternating current is applied to the piezoelectric element of the second transducer assembly, and the piezoelectric element responds by radiating an ultrasonic wave through the fluid in the flow meter. When the wave is incident upon the piezoelectric element of the first transducer assembly, the first transducer assembly responds by generating an electric signal. In this way, the transducer assemblies transmit and receive signals back and forth across the fluid stream.

Each transducer assembly is connected to a cable that extends through the end connector to a remote location external to the spool piece, such as an electronics base enclosure typically mounted to the exterior of the spool piece. The cable carries the signal created by the piezoelectric elements to an acquisition board positioned within the electronics base enclosure, where the signal may be processed and subsequently used to determine the fluid flow rate through the meter.

When not in use, the piezoelectric elements in the transducer assemblies can build up an electrical charge. The electric charge presents a hazard to personnel performing maintenance on the flow meter. To reduce the risk to maintenance personnel, each piezoelectric element is typically coupled to a transformer, which, in addition to functions discussed below, provides a discharge path for an electrical charge created by the piezoelectric element.

The transformer also provides impedance matching between the piezoelectric element and an acquisition device that ultimately receives the signal generated by the piezoelectric element. Thus, the piezoelectric element and the transformer are paired. The transformer is typically positioned within the transducer assembly. With most conventional designs, when either the piezoelectric element or the transformer requires replacement, the entire transducer assembly is removed from the port in the spool piece, often necessitating an undesirable interruption in fluid flow through the spool piece due to removal of the end connector as necessary to access the transducer assembly.

Further, in many conventional transducer assemblies, the transformer within the transducer assembly and/or electrical connections between the transformer and the piezoelectric element are susceptible to exposure to the same conditions as those experienced by the piezoelectric element. Such exposure is undesirable when the transformer or electrical connections are not designed for the same conditions as the piezoelectric element. For example, the fluid passing through the flow meter may be corrosive. While the piezoelectric element may be compatible with corrosive conditions, the transformer may not. In such circumstances, the corrosive fluid may damage the transformer and associated electrical wiring.

Mechanisms which improve the quality of the ultrasonic signals imparted to the fluid may improve measurement accuracy. Moreover, wear, tear, and component degradation (e.g., caused by the corrosivity of the fluid being measured) on the components of the meter can substantially decrease longevity of the device. Thus, any apparatus, methods or systems that increase the durability and/or longevity of the flow meter and its components would be desirable. Finally, ultrasonic flow meters may be installed in harsh environments. Thus, any mechanism to reduce maintenance time, and if possible improve performance, would be desirable.

SUMMARY

An ultrasonic flow meter for measuring the flow of a fluid through a pipeline. In some embodiments, the ultrasonic flow meter includes a spool piece, a transducer assembly, and a port cover assembly. The spool piece has a throughbore and a transducer port extending between the throughbore and an outer surface of the spool piece. The transducer assembly is disposed within the transducer port and includes a transformer, a piezoelectric element, and an electrical coupling therebetween. The port cover assembly is coupled to the transducer assembly and receives a cable coupled to the transducer assembly. The port cover assembly is spring-loaded to bias the port cover assembly toward the transducer assembly to resist the cable from being electrically uncoupled from the transducer assembly. In other embodiments, the port cover assembly has at least two latches operable to releasably engage the spool piece, whereby movement of the port cover assembly relative to the spool piece is limited.

In still other embodiments, the transducer assembly provides a first fluid barrier across the transducer port separating the transducer port into a first portion proximal throughbore and a second portion distal throughbore, wherein the first portion is in fluid communication with the throughbore and the first fluid barrier restricts fluid communication between the throughbore and the second portion. The port cover assembly forms a second fluid barrier that restricts ingression of fluid external to the spool piece into the transducer port.

Thus, embodiments described herein comprise a combination of features and advantages intended to address various shortcomings associated with certain prior devices, systems, and methods. The various characteristics described above, as well as other features, will be readily apparent to those skilled in the art upon reading the following detailed description, and by referring to the accompanying drawings.

BRIEF DESCRIPTION OF THE DRAWINGS

For a detailed description of exemplary embodiments of the invention, reference will now be made to the accompanying drawings in which.

DETAILED DESCRIPTION OF THE DISCLOSED EMBODIMENTS

Figure 1A:
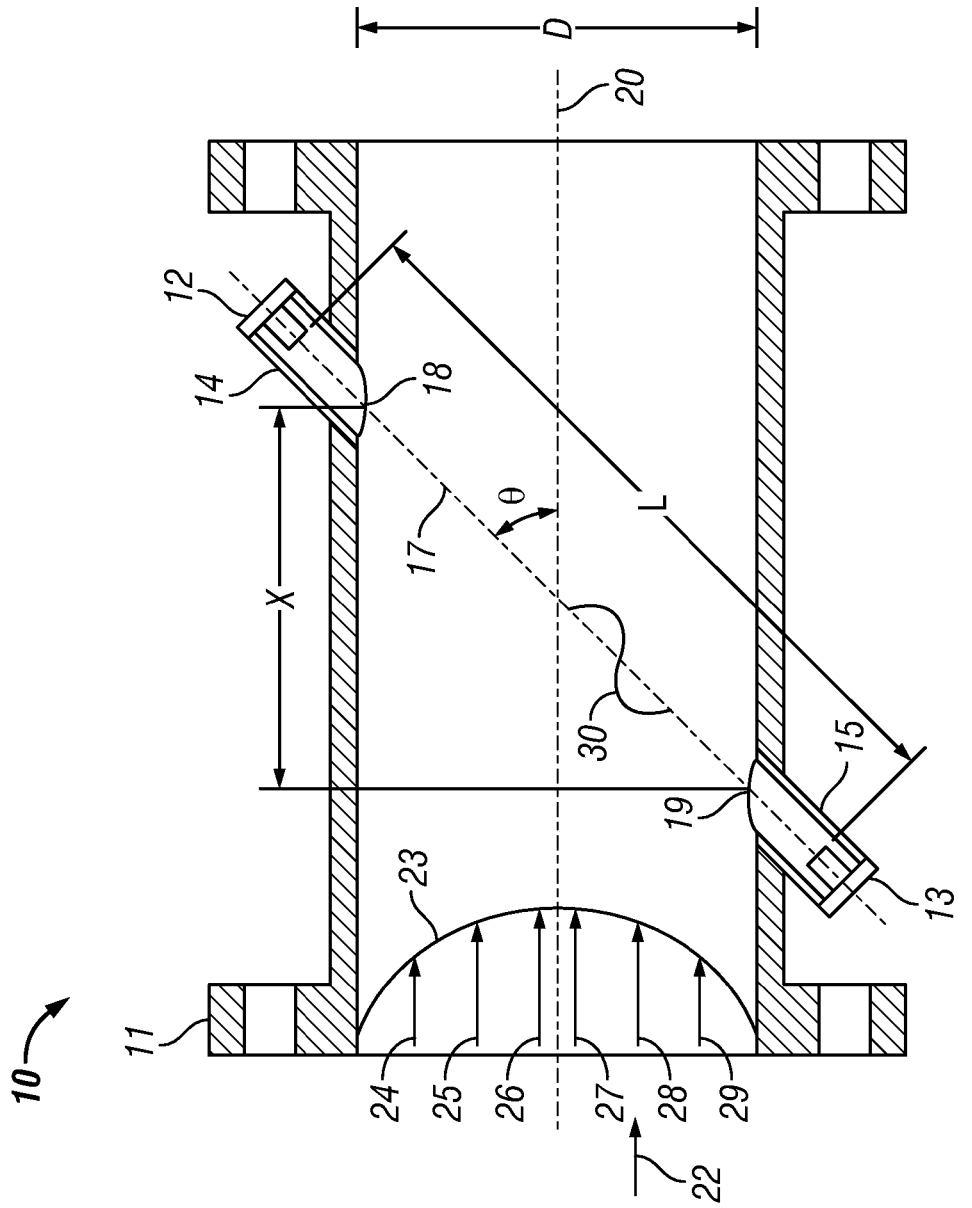
FIG. 1A is a cross-sectional top view of an embodiment of an ultrasonic flow meter.

The following discussion is directed to various embodiments of the invention. Although one or more of these embodiments may be presently preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

Certain terms are used throughout the following description and claims to refer to particular features or components. As one skilled in the art will appreciate, different persons may refer to the same feature or component by different names. This document does not intend to distinguish between components or features that differ in name but not function. The drawing figures are not necessarily to scale. Certain features and components herein may be shown exaggerated in scale or in somewhat schematic form and some details of conventional elements may not be shown in interest of clarity and conciseness.

In the following discussion and in the claims, the terms "including" and "comprising" are used in an open-ended fashion, and thus should be interpreted to mean "including, but not limited to . . . ." Also, the term "couple" or "couples" is intended to mean either an indirect or direct connection. Thus, if a first device "couples" or "is coupled" to a second device, that connection may be through a direct connection, or through an indirect connection via other devices, components, and connections. In addition, as used herein, the terms "axial" and "axially" generally mean along or parallel to a central axis (e.g., central axis of a body or a port), while the terms "radial" and "radially" generally mean perpendicular to the central axis. For instance, an axial distance refers to a distance measured along or parallel to the central axis, and a radial distance means a distance measured perpendicular to the central axis.

Figure 1B:
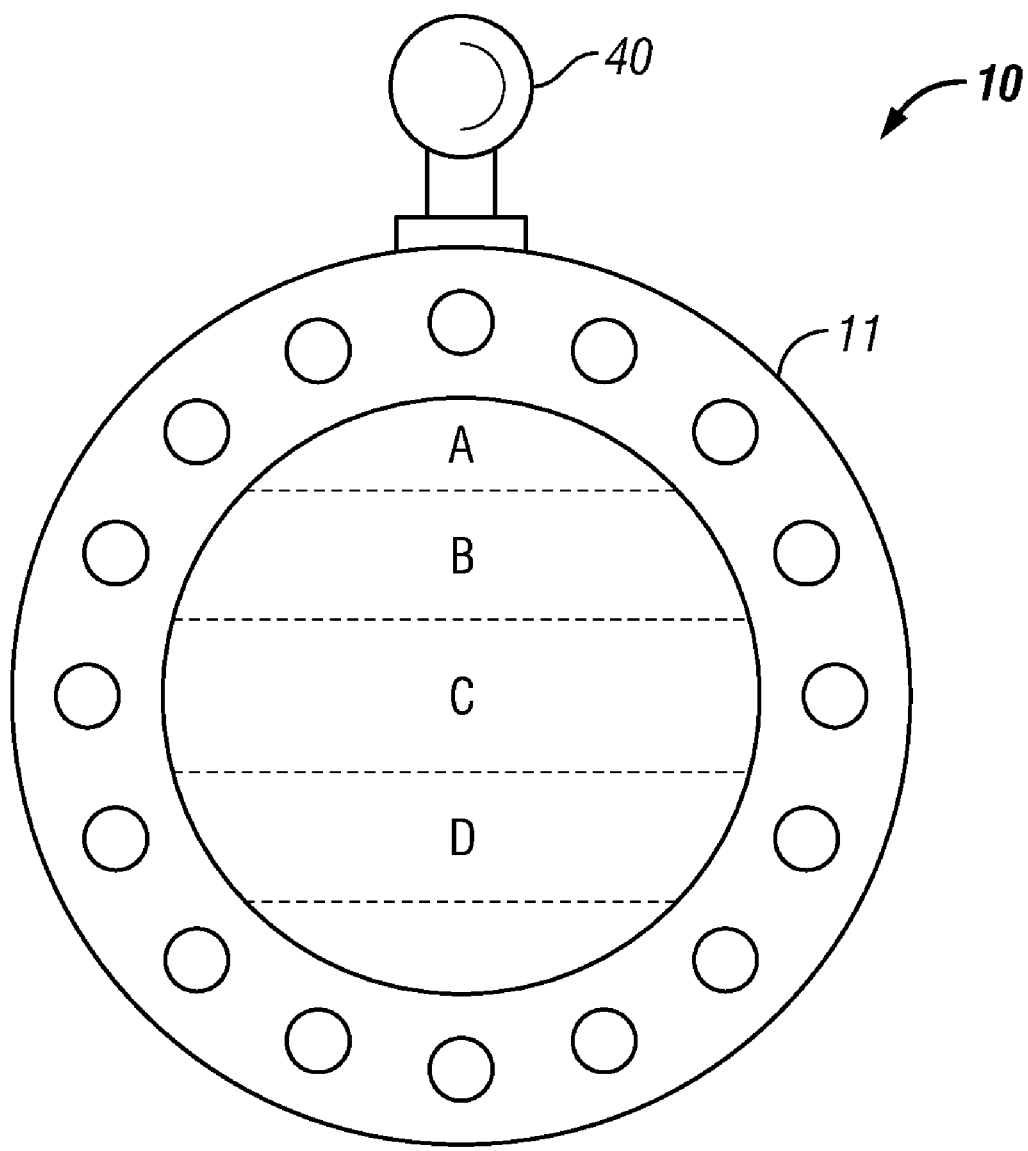
FIG. 1B is an end view of the flow meter of FIG. 1A.

FIGS. 1A and 1B show an embodiment of an ultrasonic flow meter 10 for purposes of explaining its various components and their relationships. Spool piece 11 is suitable for placement between sections of a pipeline. Spool piece 11 has a predetermined size and defines a central passage through which a fluid (e.g., gas and/or liquid) flows. An illustrative pair of transducers 12 and 13 and their respective housings 14 and 15 are located along the length of spool piece 11. Transducers 12 and 13 are acoustic transceivers. More particularly, transducers 12, 13 are ultrasonic transceivers, meaning that they both generate and receive acoustic energy having frequencies of above about 20 kilohertz.

The acoustic energy may be generated and received by a piezoelectric element in each transducer 12, 13. To generate an acoustic signal, the piezoelectric element is stimulated electrically by way of a sinusoidal signal and responds by vibrating. The vibration of the piezoelectric element generates the acoustic signal that then travels through the fluid to the corresponding transducer 12, 13 of the transducer pair. Similarly, upon being struck by acoustic energy (i.e., the acoustic signal and other noise signals), the receiving piezoelectric element vibrates and generates a sinusoidal electrical signal that is detected, digitized, and analyzed by electronics associated with the meter.

A path 17, sometimes referred to as a "chord," exists between illustrative transducers 12, 13 at an angle θ to a centerline 20 of spool piece 11. The length of "chord" 17 is the distance between the face of transducer 12 and the face of transducer 13. Points 18 and 19 define the locations where acoustic signals generated by transducers 12, 13 enter and leave fluid flowing through the spool piece 11 (i.e., the entrance to the spool piece bore). The position of transducers 12, 13 may be defined by the angle θ, by a first length L measured between transducers 12, 13, a second length X corresponding to the axial distance between points 18, 19, and a third length D corresponding to the pipe inside diameter. In most cases distances D, X, and L are precisely determined during meter fabrication. Further, transducers 12, 13 are usually placed a specific distance from points 18, 19, respectively, regardless of meter size (i.e., spool piece size). Fluid passing through spool piece 11, such as natural gas, flows in a direction 22 with a velocity profile 23. Velocity vectors 24-29 illustrate that the gas velocity through spool piece 11 increases toward the centerline 20.

Initially, downstream transducer 12 generates an acoustic signal that propagates across the fluid in the spool piece 11, and is then incident upon and detected by upstream transducer 13. A short time later (e.g., within a few milliseconds), the upstream transducer 13 generates a return acoustic signal that propagates back across the fluid in the spool piece 11, and is then incident upon and detected by the downstream transducer 12. Thus, the transducers 12, 13 play "pitch and catch" with signals 30 along chordal path 17. During operation, this sequence may occur thousands of times per minute.

The transit time of the acoustic signal 30 between transducers 12, 13 depends in part upon whether the acoustic signal 30 is traveling upstream or downstream with respect to the fluid flow. The transit time for an acoustic signal traveling downstream (i.e., in the same direction as the fluid flow) is less than its transit time when traveling upstream (i.e., against the fluid flow). The upstream and downstream transit times can be used to calculate the average velocity along the signal path, or chordal path 17, and the speed of sound in the measured fluid.

Ultrasonic flow meters can have one or more acoustic signal paths. FIG. 1B illustrates an elevation view of one end of ultrasonic flow meter 10. As shown, ultrasonic flow meter has four chordal paths A, B, C, D at varying levels within the spool piece 11. Each chordal path A-D extends between a pair of transducers, each transducer behaving alternately as a transmitter and receiver. Hidden from view in FIG. 1B are the four pairs of transducers that correspond to chordal paths A-D. A control electronics package or enclosure 40 is also shown. Electronics package 40 acquires and processes data for the four chordal paths A-D.

Figure 1C:
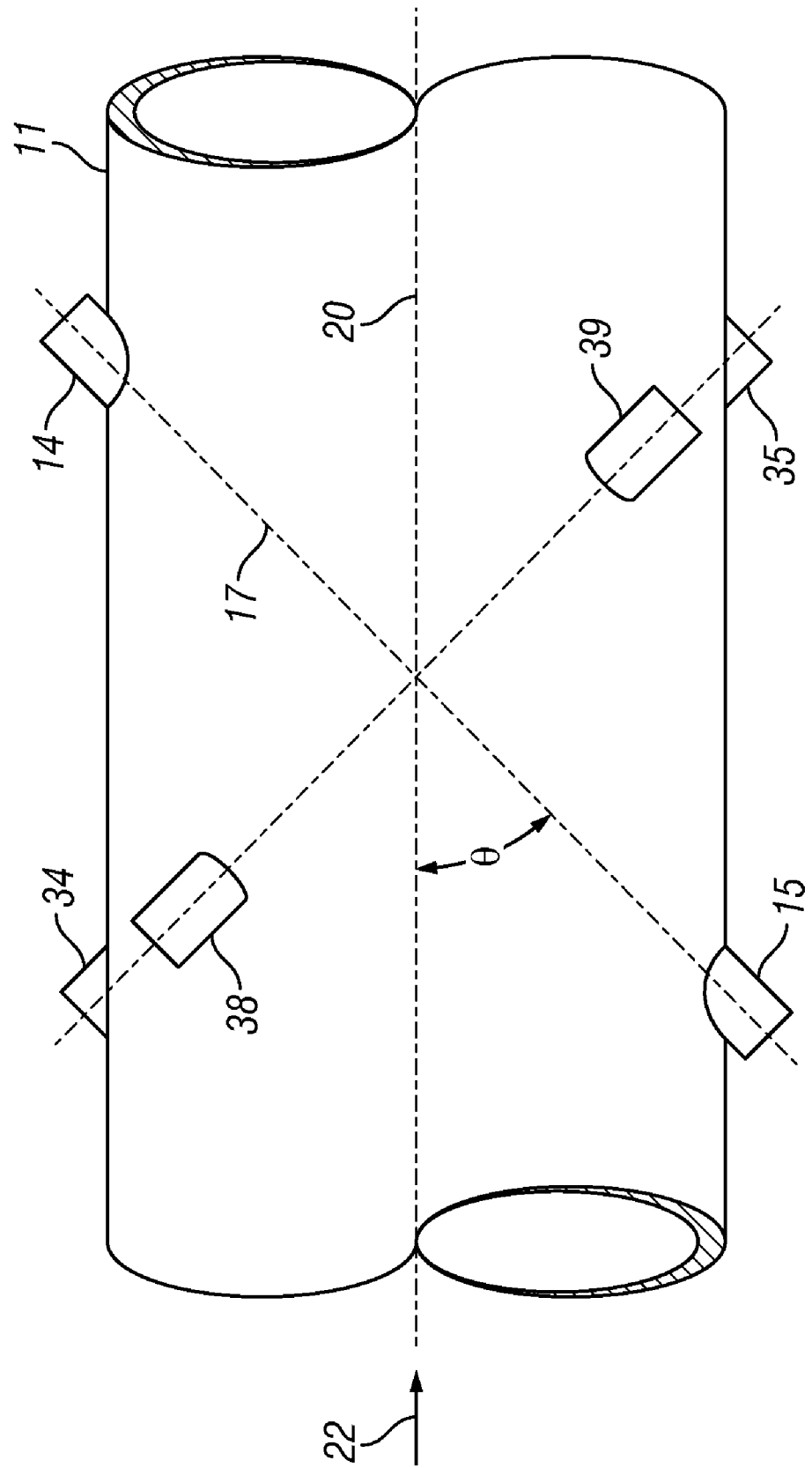
FIG. 1C is a top schematic view of the flow meter of FIG. 1A.

The arrangement of the four pairs of transducers may be more easily understood with reference to FIG. 1C. Four pairs of transducer housing are formed in spool piece 11. A transducer is mounted within each housing. A single chordal path extends between each pair of transducers. For example, a first pair of transducer housings 14, 15 house transducers 12, 13 (FIG. 1A). The transducers 12, 13 are mounted within transducer housings 14, 15, respectively, at a non-perpendicular angle θ to centerline 20 of spool piece 11. Chordal path 17 extends between transducers 12, 13. Another pair of transducer housings 34, 35 (only partially in view) and associated transducers is mounted such that a chordal path extending between the transducers in transducer housings 34, 35 and chordal path 17 between transducers 12, 13 loosely forms the shape of an "X."

Similarly, transducer ports 38, 39 are placed parallel to transducer ports 34, 35 but at a different "level" (i.e., a different radial position in spool piece 11). Not explicitly shown in FIG. 1C is a fourth pair of transducers and transducer ports. Taking FIGS. 1B and 1C together, the pairs of transducers are arranged such that the chords paths A, B of the upper two pairs of transducers form an the shape of an "X", and the chordal paths C, D of the lower two pairs of transducers corresponding also form the shape of an "X." The flow velocity of the fluid may be determined at each chord A-D to obtain chordal flow velocities, and the chordal flow velocities then combined to determine an average flow velocity through spool piece 11. From the average flow velocity, the amount of fluid flowing through the spool piece 11, and thus the pipeline, may be determined.

Figure 2:
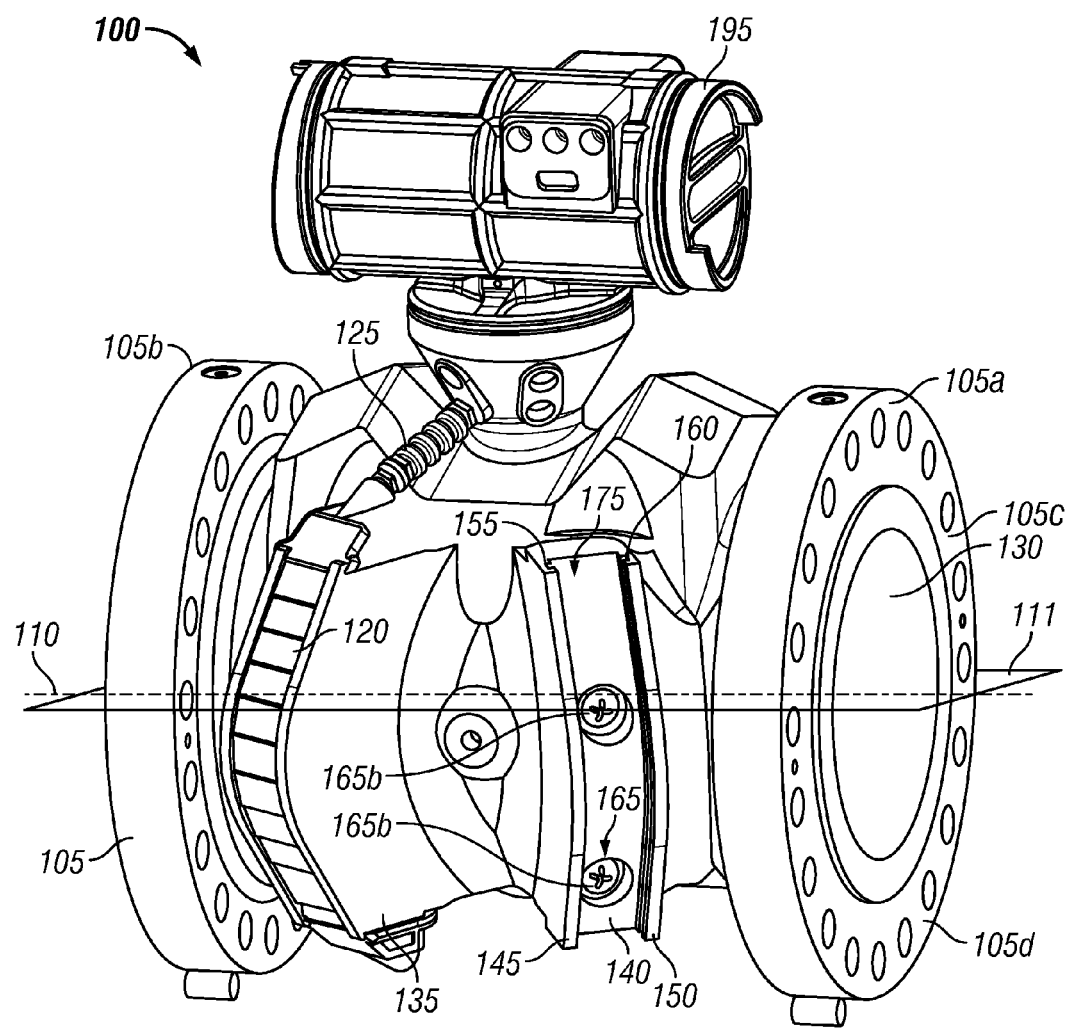
FIG. 2 is a perspective view of an embodiment of an ultrasonic flow meter in accordance with the principles described herein.
Figure 3:
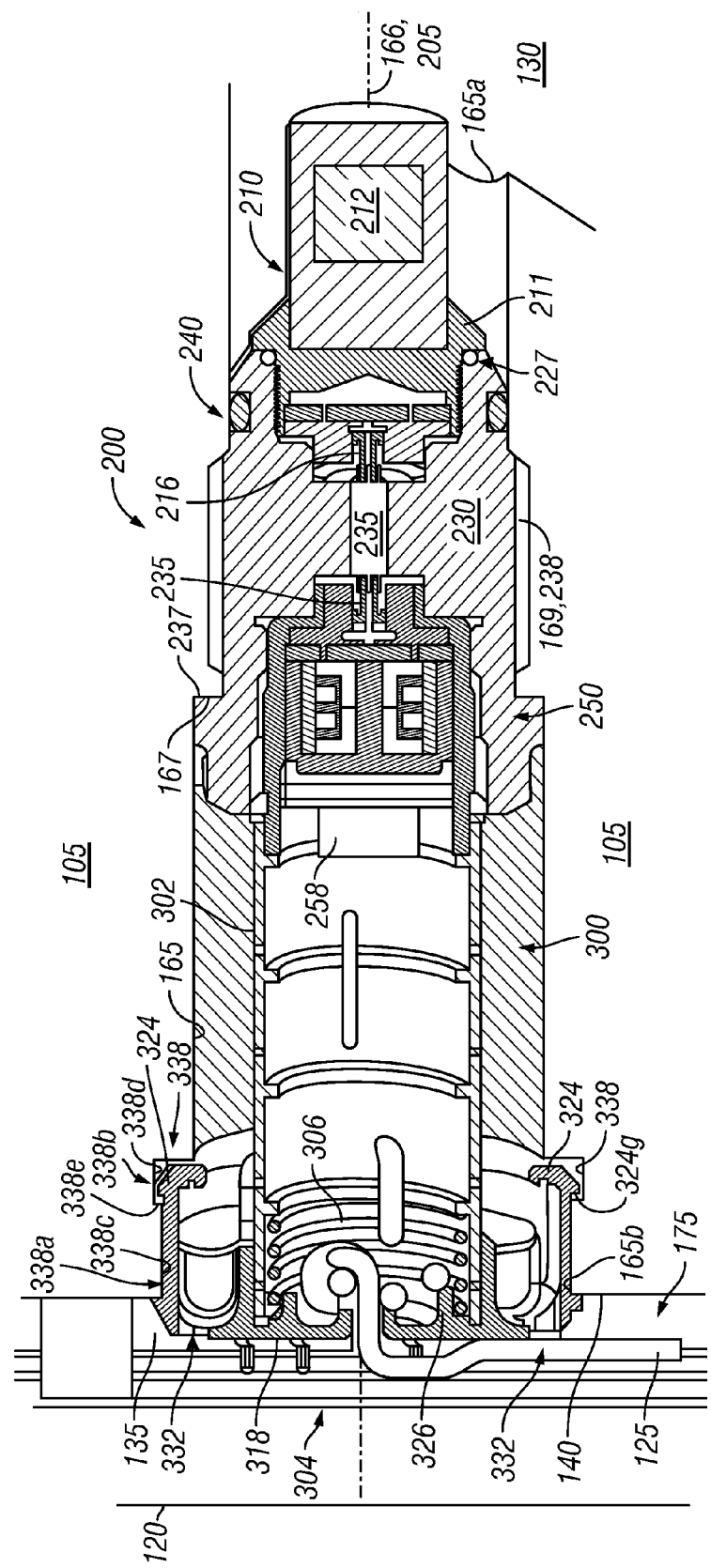
FIG. 3 is an enlarged partial cross-sectional view of an embodiment of a gas ultrasonic transducer assembly with a port cover assembly coupled thereto disposed in one of the transducer ports of the ultrasonic flow meter of FIG. 2.

Referring now to FIGS. 2 and 3, perspective and partial cross-sectional views, respectively, of an ultrasonic flow meter 100 for measuring fluid flow rates in a pipeline are shown. Ultrasonic flow meter 100 includes a body or spool piece 105, a plurality of gas ultrasonic transducer assemblies 200, an electrical wire or cable 125 extending from each transducer assembly 200 to an electronics package 195 coupled to the top of spool piece 105, and a removable cable cover 120.

Spool piece 105 is the housing for ultrasonic flow meter 100 and configured for placement between sections of a pipeline. Spool piece 105 has a central axis 110 and includes a first or inlet end 105a, a second end or outlet end 105b, a fluid flow passage or throughbore 130 extending between ends 105a, 105b, and a plurality of transducer ports 165 extending from the outer surface of spool piece 105 to throughbore 130. In this embodiment, ends 105a, b each include a flange that axially couples spool piece 105 end-to-end between individual pipe segments of a pipeline. A horizontal reference plane 111 passes through central axis 110 and generally divides spool piece 105 into upper and lower halves 105c, d, respectively.

As best shown in FIG. 2, spool piece 105 also includes a plurality of transducer bosses 135 extending generally vertically along its outer circumference. Each boss 135 is positioned such that it intersects the radially outer (relative to axis 110) ends 165b of two vertically spaced transducer ports 165. Each cable 125 extends from one of the transducer assemblies 200 installed one port 165 along one of the bosses 135 to the electronics package 195. As two transducer ports 165 intersect each boss 135, two cables 125 extend vertically within each boss 135.

Each transducer boss 135 further includes recessed face 140, sides 145, 150, and side grooves 155, 160. Face 140 and sides 145, 150 define a pocket 175 therebetween that receives cables 125. Side grooves 155, 160 extend along opposing surfaces of sides 145, 150, respectively, which also face pocket 175. With cables 125 disposed within pocket 175 of transducer boss 135, the lateral edges of cable cover 120 are inserted into and slidingly advanced within grooves 155, 160, thereby covering cables 125 and protecting them from the environment external to spool piece 105. Examples of suitable cable covers are disclosed in U.S. patent application Ser. No. 11/763,783, entitled "Cable Cover for an Ultrasonic Flow Meter" and filed on Jun. 15, 2007, which is hereby incorporated herein by reference in its entirety for all purposes.

In some embodiments, spool piece 105 is a casting into which transducer ports 165 are machined. Pockets 175 are also created by the machining process to desired dimensions. The width of face 140 is greater than the diameter of transducer ports 165. The depth of pocket 175 is sufficient to allow side grooves 155, 160, to be machined into sides 145, 150 of transducer boss 135 as well as pocket 175 itself, and to receive cables 125. In some embodiments, side grooves 155, 160 are three-sided grooves with square corners. In other embodiments, side grooves 155, 160 may be half-dovetail grooves with only two sides, where the first side is parallel to face 140 of transducer boss 135 and the second side is oriented at angle less than 90 degrees from the first side. Moreover, in embodiments where side grooves 155, 160 are half-dovetail grooves, the angle of sides 145, 150 with respect to face 140 may be less than or greater than 90 degrees.

As best shown in FIG. 3, one transducer assembly 200 is disposed within each transducer port 165. Each transducer port 165 has a central axis 166 and extends through spool piece 105 from a radially inner (relative to central axis 110 of FIG. 2) or first end 165a at throughbore 130 to a radially outer (relative to central axis 110) or second end 165b at the outer surface of the spool piece 105. In this embodiment, each transducer port 165 is generally horizontal. In other words, central axis 166 of each transducer port 165 lies in a plane generally parallel to reference plane 111 (FIG. 2). Although a projection of central axis 166 of each transducer port 165 may not necessarily intersect central axis 110 of spool piece 105, for purposes of simplicity, the radial positions of various features and components may be described relative to axis 110, it being generally understood that "radially inner" (relative to central axis 110) refers to positions generally proximal axis 110 and bore 130 and "radially outer" (relative to central axis 110) refers to positions generally distal axis 110 and bore 130.

The inner surface of each transducer port 165 includes an annular shoulder 167 between ends 165a, b and internal threads 169 positioned axially (relative to central axis 166) between shoulder 167 and first end 165a. As will be described in more detail below, shoulder 167 aids in positioning transducer assembly 200 within port 165, and threads 169 engage mating threads on transducer assembly 200, thereby threadingly coupling transducer assembly 200 within port 165 to spool piece 105.

Referring to FIGS. 2 and 3, during use, fluid flows through the pipeline and throughbore 130 of spool piece 105. Transducer assemblies 200 send acoustic signals back and forth across the fluid stream in throughbore 130. In particular, transducer assemblies 200 are positioned such that an acoustic signal traveling from one transducer assembly 200 to the other intersects fluid flowing through meter 100 at an acute angle relative to central axis 110. The electronics package 195 is coupled to the top of the spool piece 105 to provide power to transducer assemblies 200 and receive signals from transducer assemblies 200 via cables 125 extending therebetween.

Upon receipt of the signals from transducer assemblies 200, the electronics package 195 processes the signals to determine the fluid flow rate of product passing through bore 130 of flow meter 100.

Referring now to FIG. 3, gas ultrasonic transducer assembly 200 with a port cover assembly 300 coupled thereto is coaxially disposed within port 165 and extends from throughbore 130 to pocket 175 of boss 135. Thus, transducer assembly 200 has a central or longitudinal axis 205 that is generally coincident with central axis 166 of port 165 when transducer assembly 200 is coupled within port 165 to spool piece 105. Moving radially outward (relative to axis 110 of FIG. 2) from throughbore 130 of spool piece 105, transducer assembly 200 includes a piezoelectric capsule 210, a transducer holder 230, and a transformer capsule 250, including a terminal block 258. Port cover assembly 300 is positioned radially outward of transducer assembly 200. Piezoelectric capsule 210, transducer holder 230, transformer capsule 250, and port cover assembly 300 are axially coupled end-to-end and coaxially oriented relative to axes 166, 205. Thus, piezoelectric capsule 210, transducer holder 230, transformer capsule 250, and port cover assembly 300 each have a central axis generally coincident with axes 205, 166. For purposes of conciseness, axial positions of various features and components of transducer assembly 200 and port cover assembly 300 are defined herein relative to axes 166, 205, it being understood that each individual component, when assembled into transducer assembly 200 or port cover assembly 300, has a central axis generally coincident with axis 205 and generally coincident with axis 166 when installed in port 165.

Figure 4:
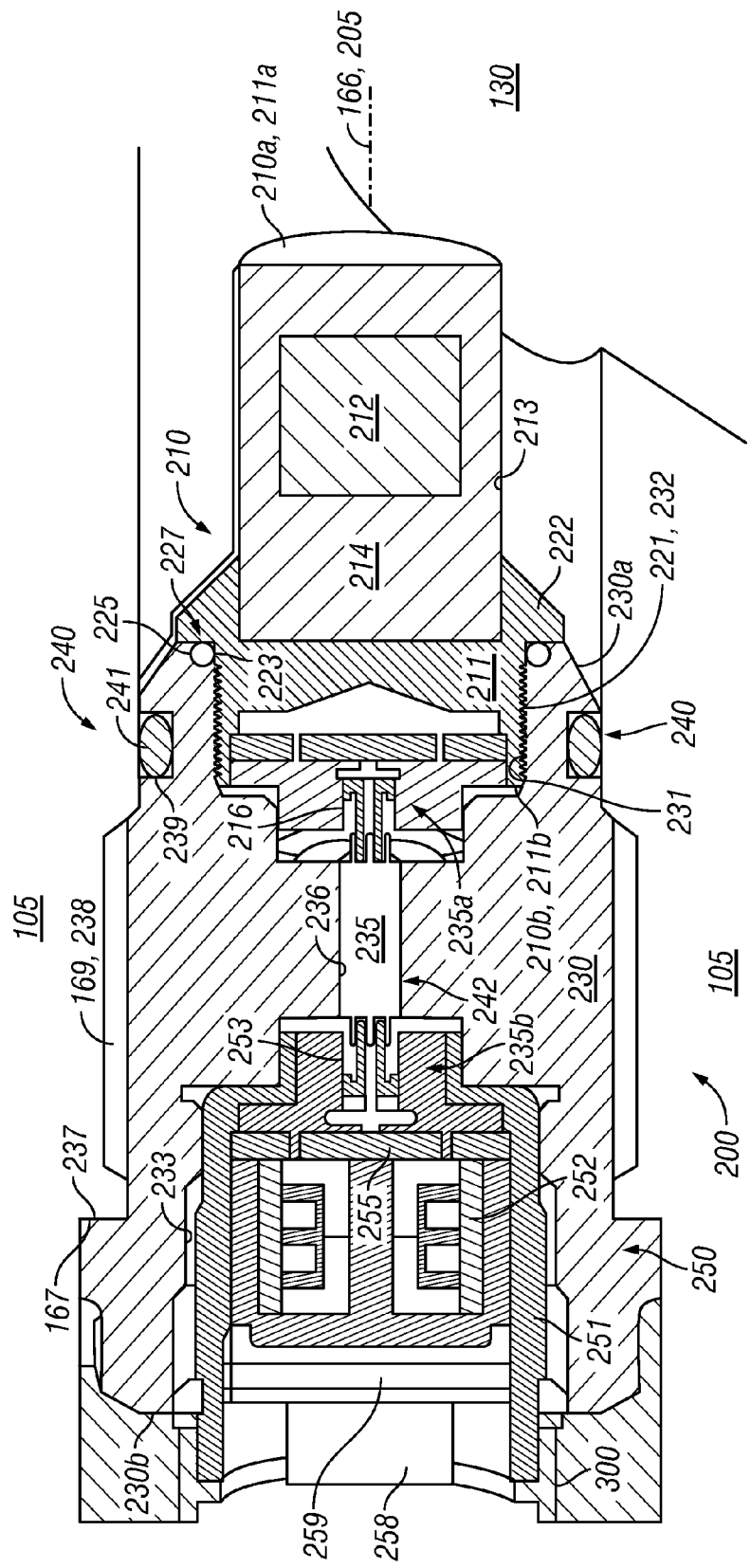
FIG. 4 is an enlarged partial cross-sectional view of the gas ultrasonic transducer assembly of FIG. 3.
Figure 5:
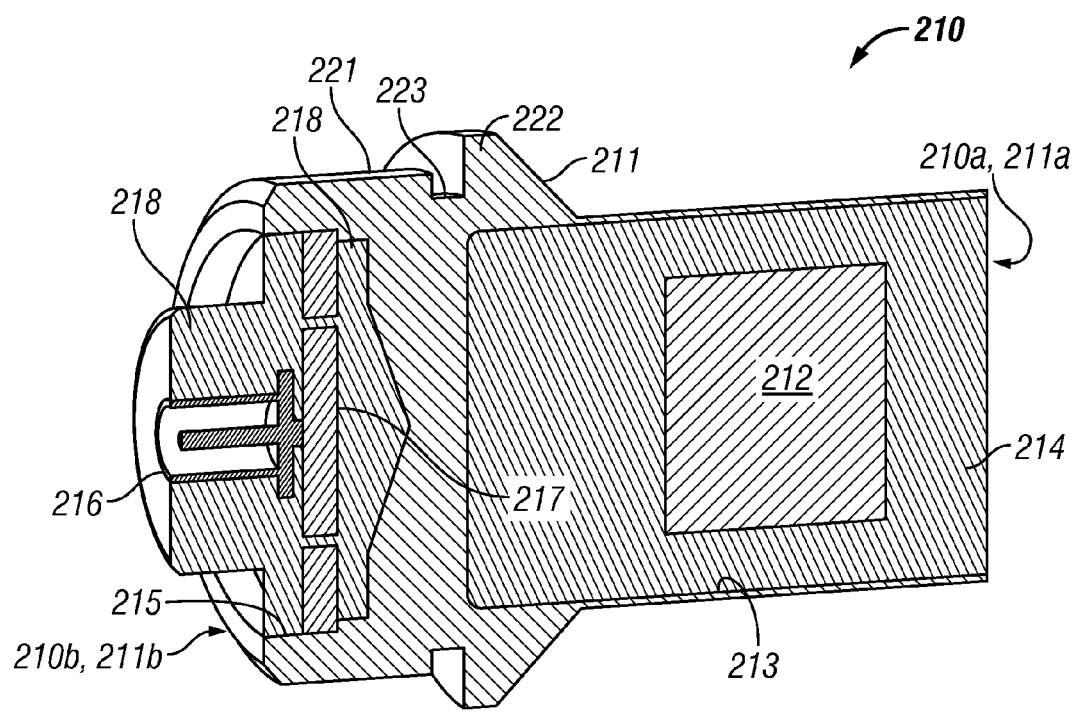
FIGS. 5 and 6 are enlarged cross-sectional views of the piezoelectric capsule of FIG. 4.

Referring now to FIGS. 3-6, piezoelectric capsule 210 has a radially inner (relative to central axis 110 of FIG. 2) or first end 210a, proximal bore 130, a radially outer (relative to central axis 110) or second end 210b, distal bore 130, and includes a body or housing 211, a piezoelectric element 212, a matching layer 214, and an electrical connector 216. In FIG. 5, piezoelectric capsule 210 is shown with matching layer 214 (e.g., after installation of matching layer 214), and in FIG. 6, piezoelectric capsule 210 is shown without matching layer 214 (e.g., prior to inclusion of matching layer 214).

Housing 211 extends axially (relative to axis 205) between ends 210a, b, and thus, may also be described as having first and second ends 211a, b generally coincident with ends 210a, b, respectively. First ends 210a, 211a of piezoelectric capsule 210 and housing 211, respectively, extend axially (relative to axes 166, 205) to bore 130 and are exposed to the fluid flowing within throughbore 130. In addition, first end 211a of housing 211 includes a counterbore 213 that extends axially (relative to axis 205) from first end 211a.

Piezoelectric element 212 is coaxially disposed in counterbore 213 proximal first end 211a and bore 130. Piezoelectric element 212 is a piezoelectric material that produces an electrical potential in response to applied mechanical stress, and produces a mechanical stress and/or strain in response to an applied electric field. More specifically, piezoelectric element 212 produces an electrical potential and associated current in response to an acoustic signal, and produces an acoustic signal in response to an applied electrical potential and associated current. In general, piezoelectric element 212 may include any suitable piezoelectric material, such as but not limited to a piezoelectric crystal or ceramic. In this embodiment, piezoelectric element 212 is a piezoelectric crystal.

Matching layer 214 fills the remainder of counterbore 213, completely surrounding or encasing piezoelectric element 212. The matching layer (e.g., matching layer 214) may include any suitable material, such as but not limited to plastic, metal, glass, ceramic, epoxy, powder-filled epoxy, rubber, or powder-filled rubber. In this embodiment, matching layer 214 includes epoxy that is injected in a fluid form into counterbore 213 and around and over piezoelectric element 212 and allowed to cure and harden. Regardless of its material, the matching layer (e.g., matching layer 214) provides acoustical coupling between the piezoelectric element (e.g., piezoelectric element 212) and fluid flowing through the meter (e.g., fluid flowing in bore 130 of flow meter 100). In accordance with certain embodiments disclosed herein, the acoustic matching layer has an acoustic impedance between that of the piezoelectric element and fluid within the meter. With the acoustic impedance of the matching layer between that of the piezoelectric element and the fluid in the meter, the quality of the ultrasonic signal is improved (e.g., larger amplitude and faster rise time).

Referring still to FIGS. 3-6, matching layer 214, and thus piezoelectric element 212, are coupled to housing 211 within counterbore 213. In general, matching layer 214 may be coupled to housing 211 by any suitable means including, without limitation, bonding, interference or spring fit, an engagement of mating threads, acoustic coupling oil, grease or adhesive. In this embodiment, matching layer 214 is directly connected to the inner cylindrical surface of counterbore 213 of housing 211 by the adhesive bond of the epoxy.

Figure 6:
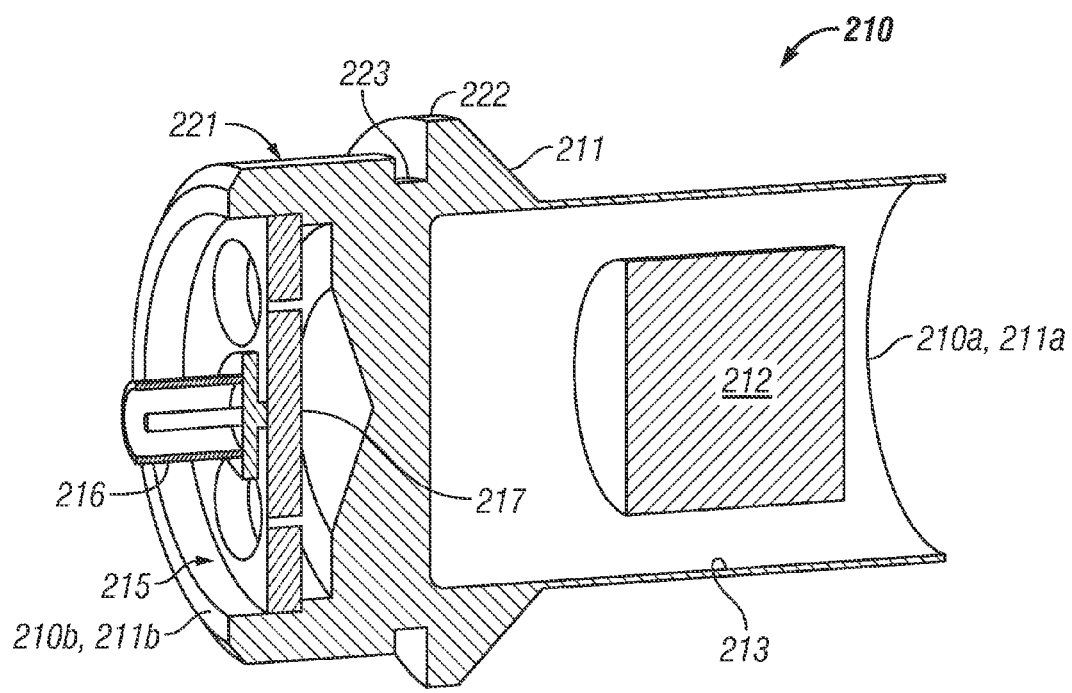

As best shown in FIGS. 5 and 6, electrical connector 216 is disposed at second end 210b of piezoelectric capsule 210 and coupled to second end 211b of housing 211. In particular, second end 211b of housing 211 includes a counterbore 215 that extends axially (relative to axis 205 of FIG. 3) from second end 211b. Electrical connector 216 is surface mounted to and extends axially (relative to axis 205) from a circuit board 217 disposed in counterbore 215. In this embodiment, electrical connector 216 is a female coax socket or receptacle. In general, "coax" connectors (e.g., male coax connectors, female coax connectors, coax sockets, coax receptacles, etc.) are connectors configured and designed for use coaxial, or coax, cables and couplings. Coaxial cables and couplings include an inner electrical conductor surrounded by a tubular insulating layer typically of a flexible material with a high dielectric constant, all of which are surrounded by an electrically conductive layer (typically of fine woven wire for flexibility, or of a thin metallic foil) and covered with a thin insulating layer on the outside. Thus, coax cables and couplings include a radially inner conductor and a radially outer conductor that is concentric with the inner conductor and radially spaced from the inner conductor by a tubular insulating layer.

Two leads or wires (not shown) electrically couple piezoelectric element 212 to circuit board 217 and electrical connector 216. Circuit board 217 in piezoelectric capsule 210 preferably includes a resistor between the two piezoelectric leads to allow electrical charges in piezoelectric element 212 to safely discharge when piezoelectric capsule 210 is decoupled from transformer capsule 250. In this embodiment, circuit board 217 includes a one mega ohm resistor (not shown) between the two piezoelectric leads to allow electrical charges in piezoelectric element 212 to safely discharge when piezoelectric capsule 210 is decoupled from transformer capsule 250.

Circuit board 217 and electrical connector 216 are rigidly held in place relative to housing 211 by a fill material 218 that fills the remainder of counterbore 215 and is disposed about the circumference of female plug socket 216. In FIG. 5, piezoelectric capsule 210 is shown with fill material 218 (e.g., after installation of fill material 218 in counterbore 215), and in FIG. 6, piezoelectric capsule 210 is shown without fill material 218 (e.g., prior to inclusion of fill material 218 in counterbore 215). In general, the fill material (e.g., fill material 218) may comprise any suitable material such as plastic or epoxy. Fill material 218 preferably creates an adhesive bond with circuit board 217, electrical connector 216, any resistors and wire leads in counterbore 215, and housing 211 to rigidly hold each of these components in place. In this embodiment, filler 218 is a rigid epoxy similar to matching layer 214.

Referring still to FIGS. 3-6, the radially outer surface of housing 211 (relative to axis 205) includes external threads 221 at second end 211b, an annular flange 222 between ends 211a, b, and an annular recess or groove 223 axially disposed (relative to axis 205) adjacent flange 222 between threads 221 and flange 222. As best shown in FIGS. 3 and 4, annular groove 223 and an annular seal member 225 disposed therein define a seal assembly 227 positioned radially (relative to axis 205) between housing 211 and transducer holder 230. Seal assembly 227 forms an annular seal between housing 211 and transducer holder 230, and restricts and/or prevents the axial flow of fluid (e.g., relative to axis 205) between transducer holder 230 and housing 211. For example, seal assembly 227 restricts and/or prevents fluid in bore 130 from flowing between housing 211 and transducer holder 230. In this embodiment, annular seal member 225 is an elastomeric O-ring seal that is radially compressed between housing 211 and transducer holder 230 upon assembly.

Referring now to FIGS. 3 and 4, transducer holder 230 has a radially inner (relative to axis 110) or first end 230a, proximal bore 130, and a radially outer (relative to axis 110) or second end 230b, distal bore 130. End 230a includes a counterbore 231 with internal threads 232. Counterbore 231 extends axially (relative to axis 205) from end 230a. Second end 210b of piezoelectric capsule 210 is threadingly received by counterbore 231 via mating threads 221, 232. The engagement of mating threads 221, 232 is preferably sufficient to resist potential forces resulting from trapped pressurized fluids that may have undesirably permeated seal assembly 227 over time. Such a robust engagement of threads 221, 232 may be important when transducer holder 230 and piezoelectric capsule 210 are removed from port 165, or when pressure within bore 130 is lowered. Any gas trapped between transducer holder 230 and piezoelectric capsule 210 may be vented around seal assembly 227 when piezoelectric capsule 210 is unthreaded from transducer holder 230.

An electrical coupling 235 is coaxially disposed in a throughbore 236 that extends axially (relative to axis 205) through transducer holder 230 between counterbore 231 and another counterbore 233 that extends axially (relative to axis 205) from end 230b. Coupling 235 includes ends 235a, b connected to piezoelectric capsule 210 and transformer capsule 250, respectively. Coupling 235 electrically couples piezoelectric capsule 210 and transformer capsule 250, and allows communication of data relating to the fluid flowing in bore 130 from piezoelectric capsule 210 to transformer capsule 250. In this embodiment, coupling 235 is a coaxial, or "coax," coupling that includes coax connectors at each end 235a, b. As will be described in more detail below, in this embodiment, coax connectors at ends 235a, b are each male coax connectors that mate and engage corresponding female coax connectors in piezoelectric capsule 210 and transformer capsule 250, respectively.

Referring still to FIGS. 3 and 4, an annular seal 242 is formed between electrical coupling 235 and transducer holder 230, thereby restricting and/or preventing the axial flow of fluids (relative to axis 205) between coupling 235 and transducer holder 230. Annular seal 242 formed between coupling 235 and transducer holder 230 is preferably sufficient to withstand the anticipated fluid pressures in bore 130, typically between about 1 psi and 10,000 psi. Consequently, in the event pressurized fluid within bore 130 permeates or bypasses seal assembly 227 over time, annular seal 242 provides yet another barrier to restrict and/or prevent fluids in bore 130 from reaching transformer capsule 250, port cover assembly 300, cables 125, and the environment external to flow meter 100. In this embodiment, seal 242 is a glass seal between coupling 235 and transducer holder 230.

The radially outer (relative to axis 205) surface of transducer holder 230 includes an annular shoulder 237 proximal second end 230b, external threads 238 positioned between shoulder 237 and first end 230a, and one or more recesses or grooves 239 axially positioned (relative to axis 205) between external threads 238 and first end 230a. An annular seal member 241 is disposed in each groove 239. Together, grooves 239 and seals 241 disposed therein define seal assemblies 240 positioned radially (relative to axis 205) between transducer holder 230 and spool piece 105. Seal assemblies 240 restrict and/or prevent the axial flow of fluid (relative to axis 205) between transducer holder 230 and spool piece 105. Consequently, seal assemblies 240 restrict and/or prevent fluids in bore 130 from flowing between transducer holder 230 and spool piece 105. In this embodiment, each annular seal member 241 is an elastomeric O-ring seal that is radially compressed between spool piece 105 and transducer holder 230 upon assembly.

As previously described, seal assembly 227 restricts and/or prevents the flow of fluid (e.g., fluid flowing in bore 130) between transducer holder 230 and housing 211, annular seal 242 restricts and/or prevents the axial flow of fluids (relative to axis 205) between coupling 235 and transducer holder 230, and seal assemblies 240 restrict and/or prevent the flow of fluid between transducer holder 230 and spool piece 105. Thus, seal assembly 227, seal assemblies 240, and seal 242 together forms a fluid barrier, or seal, that seals port 165 to restrict and/or prevent potentially hazardous, contaminating, or corrosive fluids in bore 130 from escaping bore 130 via port 165. Restricting and/or preventing the flow of fluids from bore 130 through port 165 may be particularly important in situations where the fluid in bore 130 contains toxic and/or poisonous substances (e.g., the fluid is a hydrocarbon stream containing hydrogen sulfide). Seal assembly 227, seal assemblies 240, and seal 242 also function to maintain the pressure differential between ambient conditions external spool piece 105 and the pressurized fluid in bore 130. Thus, although piezoelectric capsule 210 is exposed to the fluid in bore 130 and its associated pressure, transformer capsule 250, including terminal block 258, port cover assembly 300, and cables 125 are isolated from the fluid and pressure within bore 130. Consequently, transformer capsule 250, port cover assembly 300, and cables 125 are merely subjected to the ambient pressures external spool piece 105.

Transducer holder 230 is threadingly coupled to spool piece 105 via mating threads 169, 238, and annular shoulder 237 of transducer holder 230 engages annular shoulder 167 of port 165. During assembly, transducer holder 230 is threaded and axially advanced into port 165 (relative to axis 166) until shoulders 167, 237 engage, thereby preventing continued axial advancement of transducer holder 230 (and transducer assembly 200) into port 165. Thus, shoulder 167 in port 165 defines the axial position (relative to axis 166) of transducer holder 230 (and transducer assembly 200) within port 165.

Figure 7:
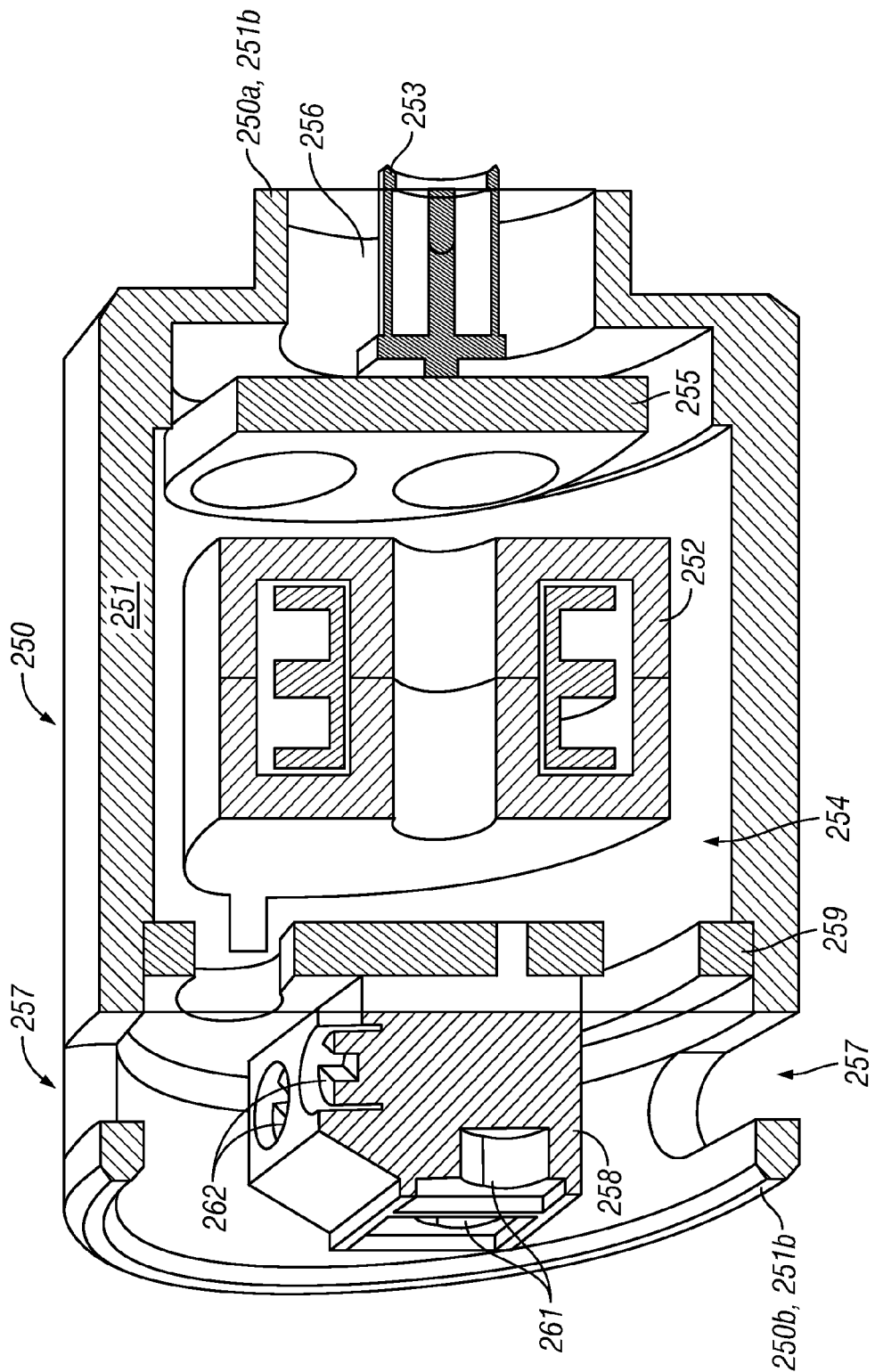
FIG. 7 is an enlarged cross-sectional view of the transformer capsule of FIG. 4.

Referring now to FIGS. 3, 4, and 7, transformer capsule 250 has a radially inner (relative to axis 110 of FIG. 2) or first end 250a, a radially outer (relative to axis 110) or second end 250b, and includes a body or housing 251, a transformer 252, an electrical connector 253, two circuit boards 255, 259, and terminal block 258. Housing 251 extends axially (relative to axis 205 of FIG. 3) between ends 250a, b, and thus, may also be described as having first and second ends 251a, b coincident with ends 250a, b, respectively. Housing 251 includes a throughbore 254 extending axially (relative to axis 205) between ends 251a, b and two circumferentially (relative to axis 205) spaced cutouts 257 proximate end 251b.

As best shown in FIG. 7, electrical connector 253 is disposed at first end 250a of transformer capsule 250 and is coupled to first end 251a of housing 251. In particular, electrical connector 253 is surface mounted to and extends axially (relative to axis 205) from circuit board 255 disposed in throughbore 254. In this embodiment, electrical connector 253 is a female coax connector. A first pair of leads or wires (not shown) electrically couple transformer 252 to circuit board 255 and electrical connector 253, and a second pair of leads or wires (not shown) electrically couple transformer 252 to circuit board 259. In general, transformer 252 matches the impedance of the piezoelectric element 212 to the electronics.

Terminal block 258 is disposed proximate second end 250b of transformer capsule 250 and is coupled to housing 251 proximate second end 251b. In particular, terminal block 258 is mounted to and extends axially (relative to axis 205) from circuit board 259 disposed in throughbore 254. Terminal block 258 includes one or more screw terminals 261 that enable electrical coupling of cables 125 with transducer assembly 200 to allow signals from transducer assembly 200 to be delivered to the electronics package 195 (FIG. 2) and power to be provided from the electronics package 195 to transducer assembly 200.

In this embodiment, terminal block 258 has three screw terminals 261 (only one and a half of another is visible in FIG. 7). Two leads or wires (not shown) electrically couple two screw terminals 261 of terminal block 258 to circuit board 259 and transformer 252. A third lead or wire (also not shown) electrically couples the third screw terminal 261 of terminal block 258 to housing 251. As will be described, the two screw terminals 261 coupled to transformer 252 are also electrically coupled to two conductors in cable 125. Thus, these two screw terminals 261 electrically couple transducer assembly 200 to the electronics package 195. The third screw terminal 261 is a connection point for a ground connection for a cable shield in cable 125. Cutouts 257 enable access to screws 262 of screw terminals 261 and, as will be described, coupling of port cover assembly 300 to transformer capsule 250.

Circuit boards 255, 259, transformer 252, and female plug socket 253 are rigidly held in place relative to housing 251 within throughbore 254 by a fill material 256 that fills the remainder of throughbore 254. In FIG. 7, transformer capsule 250 is shown with fill material 256 (e.g., after installation of fill material 256 in throughbore 254). In general, the fill material (e.g., fill material 256) may include any suitable material such as but not limited to plastic or epoxy. Fill material 256 preferably creates an adhesive bond between circuit boards 255, 259, transformer 252, female plug socket 253, the wire leads, and housing 251 sufficient to rigidly hold these components in position. In this embodiment, filler 256 is a rigid epoxy similar to matching layer 214.

As best shown in FIGS. 3 and 4 and previously described, electrical coupling 235 is disposed in throughbore 236 of transducer holder 230 and extends between piezoelectric capsule 210 and transformer capsule 250. Ends 235a, b of coax coupling 235 engage and mate with electrical couplings 216, 253, respectively, thereby electrically coupling piezoelectric capsule 210 and transformer capsule 250. In particular, second end 210b of piezoelectric capsule 210 is threadingly advanced into counterbore 231 of transducer holder 230 via mating threads 221, 232 until male coax connector 235a is sufficiently received and seated in mating female coax connector 216. Transformer capsule 250 is inserted into counterbore 233 of transducer holder 230 until the male coax connector 235b is sufficiently received and seated in mating female coax connector 253. Once so seated, transformer capsule 250 is rotatable (about axis 205) relative to transducer holder 230 and piezoelectric capsule 210. Thus, piezoelectric capsule 210 and transformer capsule 250 are axially spaced apart (relative to axis 205) by electrical coupling 235.

Referring again to FIG. 3, port cover assembly 300 enables coupling of cable 125 to terminal block 258 such that there is little, preferably negligible, tension at this coupling. Port cover assembly 300 also enables cable 125 to be easily covered, for example, by cover 120. Port cover assembly 300 includes a tubular member 302, a cover cap 304, and a spring 306 disposed therebetween.

Figure 8:
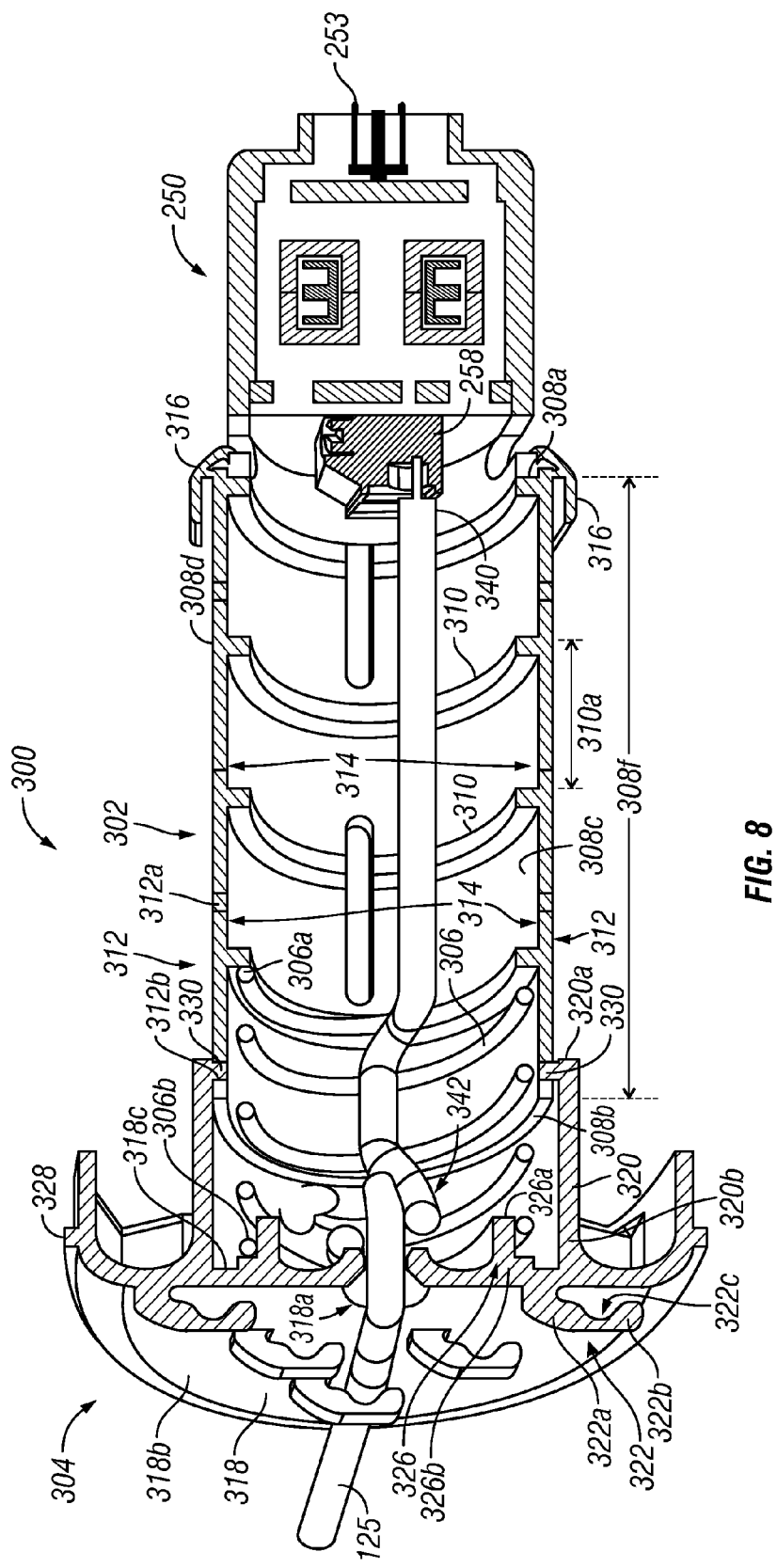
FIG. 8 is a cross-sectional view of the port cover assembly and transformer capsule of FIG. 3.
Figure 9:
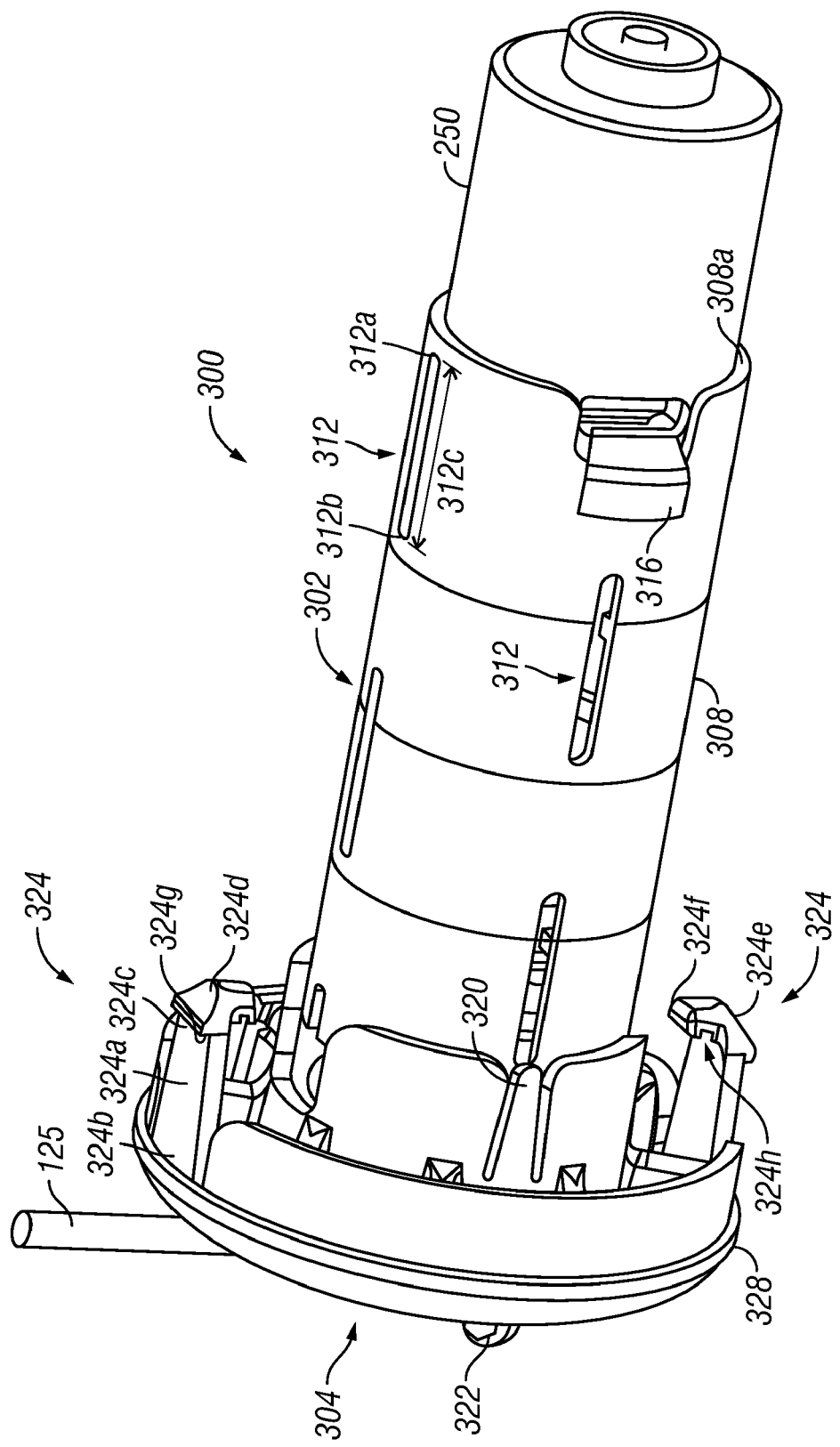
FIG. 9 is a perspective view of the port cover assembly and transformer capsule of FIG. 3.

Turning to FIGS. 8 and 9, tubular member 302 has a cylindrical body 308 with a radially inner (relative to axis 110 of FIG. 2) or first end 308a, proximal bore 130 (FIG. 3), a radially outer (relative to axis 110) or second end 308b, distal bore 130 (FIG. 3), and a length 308f extending between ends 308a, b. Tubular member 302 further includes a plurality of axially spaced (relative to axis 205 of FIG. 3) stop rings 310. As will be described, stop rings 310 enable spring loading of cover cap 304 to tubular member 302. Each stop ring 310 extends both circumferentially along and radially inward from the inner surface 308c of body 308. Further, each stop ring 310 is spaced a substantially equal distance 310a between two adjacent stop rings 310, between end 308b and an adjacent stop ring 310, or between end 308a and an adjacent stop ring 310. In this embodiment, stop rings 310 are spaced 0.5 inches apart.

Tubular member 302 further includes one or more pairs 314 of slots 312 formed in body 308. As will be described, slots 312 enable releasable coupling of cover cap 304 to tubular member 302. Each slot 312 has a radially inner (relative to axis 110) or first end 312a, proximal bore 130, a radially outer (relative to axis 110) or second end 312b, distal bore 130, and a length 312c. Length 312c of each slot 312 is greater than spacing 310a between adjacent stop rings 310. The slots 312 of each pair 314 are axially aligned (relative to axis 205), meaning their ends 312a are substantially equidistant from end 308a of body 308, and their ends 312b are substantially equidistant from end 308b of body 308. The slots 312 within each pair 314 are also circumferentially spaced apart. Further, adjacent pairs 314 of slots 312 are axially spaced a distance equal to distance 310a and circumferentially offset. In this embodiment, the slots 312 within each pair 314 are circumferentially spaced 180 degrees, and adjacent pairs 314 of slots 312 are circumferentially offset 90 degrees.

At end 308a of body 308, tubular member 302 further includes two latches 316. Latches 316 enable releasable coupling of port cover assembly 300 to transformer capsule 250. In this embodiment, tubular member 302 is molded such that latches 316 are integral to body 308. Latches 316 are circumferentially spaced (relative to axis 205) such that their circumferential spacing is substantially the same as that between cutouts 257 (FIG. 7) in housing 251 of transformer capsule 250. As will be described, this enables latches 316 to engage housing 251 at cutouts 257 to couple, or lock, port cover assembly 300 to transformer capsule 250.

Figure 10A:
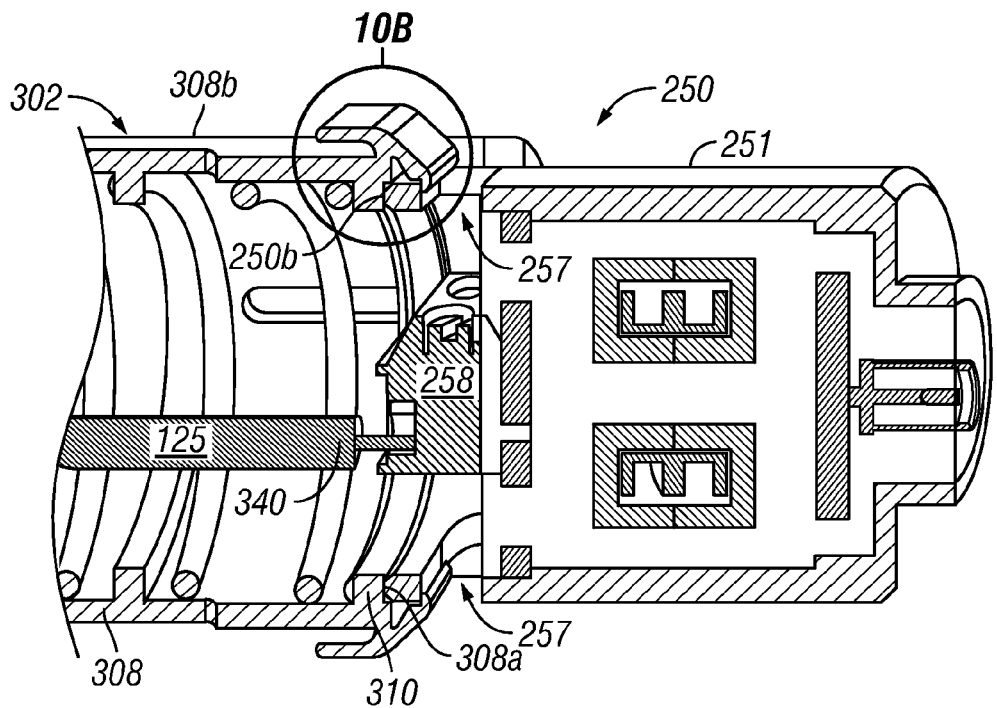
FIGS. 10A and 10B are cross-sectional views of the coupling of the port cover assembly to the transformer capsule of FIG. 3.
Figure 10B:
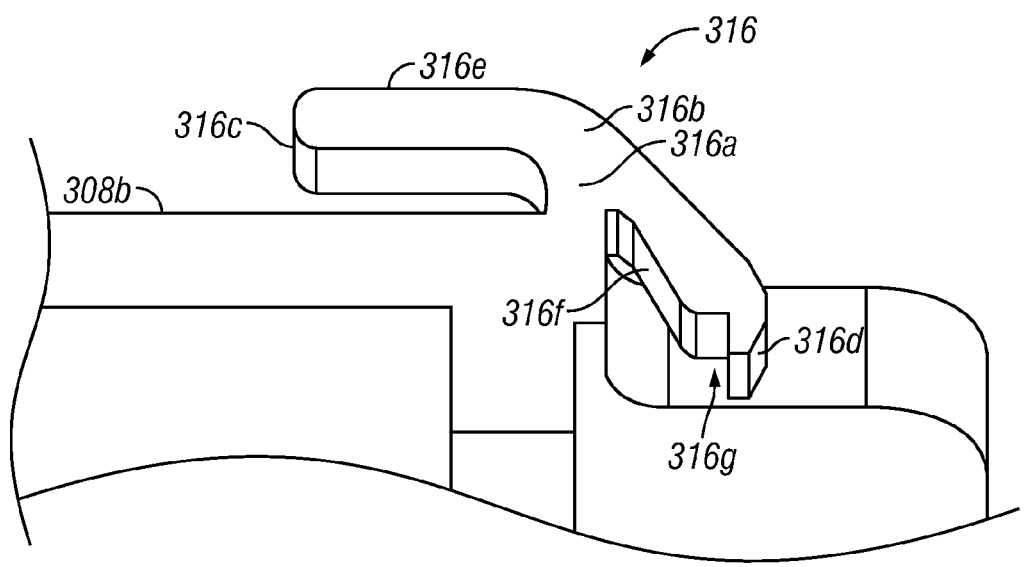

As best viewed in FIGS. 10A and 10B, each latch 316 includes a base portion 316a that extends normally from the outer surface 308d of body 308 and a pivotable portion 316b extending therefrom. Further, each latch 316 is flexible such that portion 316b is pivotable about base portion 316a connected to body 308. Pivoting portion 316b has a tail 316c with a radially outer (relative to axis 205) surface 316e and a nose 316d with a radially inner surface 316f. Pivoting portion 316b includes a groove 316g formed in nose 316d along inner surface 316f.

To couple tubular member 302 to transformer capsule 250, a pressure load is applied to outer surface 316e of each latch 316, causing portions 316b to pivot about their bases 316a such that noses 316d displace generally radially outward (relative to axis 205). With noses 316d displaced radially outward, end 250b of transformer capsule 250 is inserted into tubular member 302 to abut the stop ring 310 proximate end 308a of body 308 with cutouts 257 of transformer capsule 250 circumferentially aligned (relative to axis 205) with latches 316. The pressure load to each latch 316 is then subsequently removed, allowing pivoting portions 316b return to their original positions, meaning noses 316d displace radially inward. When noses 316d pivot radially inward, each groove 316g of noses 316d receives a radially outer (relative to axis 205) edge of housing 251 bounding a cutout 257 such that tubular member 302 is now coupled, or locked, to transformer capsule 250, as shown in FIG. 10A.

To decouple or unlock these components 250, 302, a pressure load is again applied to outer surface 316e of each latch 316, causing portions 316b to pivot such that noses 316d displace radially outward and release the edges of housing 251 bounding cutouts 257. Once noses 316d release housing 251, transformer capsule 250 may be removed from within tubular member 302 to disengage port cover assembly 300.

Referring again to FIGS. 8 and 9, cover cap 304 includes a circular body 318, two tube levers 320, two housing latches 324, a spring centralizer 326, a stop shoulder 328, and a plurality of cable clips 322. Circular body 318 has a bore or passage 318a extending therethrough. In this embodiment, passage 318a is located proximate the center of circular body 318. Passage 318a is configured to receive cable 125, as shown. Circular body 318 further includes a radially outer (relative to axis 110) surface 318b distal tubular member 302 and a radially inner (relative to axis 110) surface 318c proximal tubular member 302.

Clips 322 enable cable 125 to be secured against cover cap 304, as shown. Each clip 322 is coupled to, or formed integrally with, outer surface 318b of circular body 318. In this embodiment, cable clip 322 includes an axially extending (relative to axis 205) base portion 322a connected to outer surface 318b of circular body 318 and a pivotable portion 322b extending therefrom. Each clip 322 is flexible such that portion 322b is pivotable about base 322a. Pivotable portion 322b includes a groove 322c along its surface proximate circular body 318.

To secure cable 125 between a clip 322 and cover cap 304, as shown, a tension load is applied to pivotable portion 322b of clip 322. In response, portion 322b pivots about its base 322a. Cable 125 is then inserted into groove 322c between clip 322 and outer surface 318b of circular body 318, and the tension load to portion 322b removed. When the tension load is removed, portion 322b returns to its original position, thereby securing cable 125 within groove 322c against circular body 318.

To subsequently release cable 125 from clip 322, a tension load is again applied to portion 322b such that portion 322b pivots away from circular body 318, allowing cable 125 to be removed from groove 322c. When the tension load to portion 322b is removed, portion 322b again returns to its original position, but without cable 125 seated within groove 322c between clip 322 and circular body 318.

Stop shoulder 328 limits excessive insertion of port cover assembly 300 into transducer port 165 (FIG. 3) of spool piece 105. Stop shoulder 328 extends radially outward (relative to axis 205) from outer surface 318b of circular body 318, and in this embodiment, extends around the full periphery of cover cap 304. When port cover assembly 300 is inserted within transducer port 165, as shown in FIG. 3, stop shoulder 328 abuts face 140 of boss 135 and prevents further axial advancement or insertion of port cover assembly 300 into port 165.

Referring still to FIGS. 8 and 9, tube levers 320 enable releasable coupling of cover cap 304 to tubular member 302. Tube levers 320 extend axially (relative to axis 205) from inner surface 318c of circular body 318 and are circumferentially spaced. Their circumferential spacing is the same as that between the slots 312 of each pair 314 of slots 312 in tubular member 302. Each tube lever 320 has a radially inner (relative to central axis 110 of FIG. 2) or first end 320a proximal bore 130 and a radially outer (relative to axis 110) or second end 320b coupled to, or formed integral with, inner surface 318c of circular body 318. Further, each tube lever 320 is flexible such that first end 320a is radially pivotable (relative to axis 205) about second end 320b connected to circular body 318. At first end 320a, each tube lever 320 further includes a radially inward extending (relative to axis 205) pin 330 configured to be insertable within a slot 312 in tubular member 302.

To releasably couple cover cap 304 to tubular member 302, a tension load is applied to each tube lever 320, causing first ends 320a of tube levers 320 to pivot radially outward about second ends 320b. With tube levers 320 pivoted radially outward, second end 308b of tubular member 302 is inserted between tube levers 320 of cover cap 304. Once tubular member 302 is positioned between tube levers 320, the tension load applied to tube levers 320 is removed, allowing first ends 320a of tube levers 320 to pivot radially inward and pins 330 to engage tubular member 302. Tubular member 302 is then rotated relative to cover cap 304, if necessary, to insert pins 330 of tube levers 320 into slots 312 proximal second end 308b of tubular member 302. When pins 330 engage slots 312, cover cap 304 is releasably coupled to tubular member 302.

To release cover cap 304 from tubular member 302, a tension load is again applied to tube levers 320, causing first ends 320a of tube levers 320 to pivot radially outward. As first ends 320a pivot radially outward, pins 330 disengage slots 312. With pins 330 disengaged from slots 312, tubular member 302 may be removed from between tube levers 320 of cover cap 304 to disengage cover cap 304.

Housing latches 324 enable releasable coupling of port cover assembly 300 to spool piece 105. Referring to FIG. 3, spool piece 105 has a groove 338 formed therein. Groove 338 bounds transducer port 165 and extends axially (relative to axis 205) from the inlet 165b of transducer port 165 at face 140 of boss 135. Groove 338 has a first portion 338a extending from radially outer (relative to axis 110 of FIG. 2) end 165b of port 165 and a second portion 338b connected thereto. First portion 338a has an axially extending (relative to axis 205) surface 338c, and second portion 338b has an axially extending surface 338d. Inner surface 338c is defined by a diameter (relative to axis 205) that is less than the diameter that defines inner surface 338d. Thus, a shoulder 338e is formed in spool piece 105 at the transition between first and second portions 338a, b of groove 338.

Referring to FIGS. 3 and 9, housing latches 324 are disposed radially outward (relative to axis 205) of tube levers 320 and extend axially from the periphery of circular body 318. Housing latches 324 are circumferentially spaced. In this embodiment, latches 324 are circumferentially spaced (relative to axis 205) apart 180 degrees. Each housing latch 324 has an axially extending (relative to axis 205) portion or ramp 324a with a first end 324b connected to circular body 318 and a second end 324c. Further, each housing latch 324 is flexible such that ramp 324a is radially pivotable (relative to axis 205) about first end 324b relative to circular body 318. At second end 324c, latch 324 has a substantially radially extending (relative to axis 205) locking member 324d. Locking member 324d has a radially outer tail 324e and a radially inner nose 324f. A shoulder 324g (best viewed in FIG. 3) is formed in latch 324 at the transition between ramp 324a and locking member 324d radially inward of tail 324e. Locking member 324d includes a groove 324h formed in a radially extending (relative to axis 205) surface of nose 324f facing circular body 318.

To releasably couple port cover assembly 300 to spool piece 105, port cover assembly 300 is inserted into transducer port 165 until locking members 324d are proximate face 140 of boss 135. A radially inward (relative to axis 205) directed pressure load is then applied to each latch 324, causing ramps 324a to pivot radially inward relative to circular body 318. Once latches 324 are pivoted radially inward, port cover assembly 300 is inserted further into port 165, and latches 324 are at least partially received within groove 338 of spool piece 105. When latches 324 are at least partially received within groove 338, the pressure load to each latch 324 is removed, allowing ramps 324a to pivot radially outward bringing tails 324e of locking members 324d into engagement with first portion 338a of groove 338. As port cover assembly 300 is further inserted into port 165, tails 324e slide along first portion 338a of groove 338. When locking members 324d reach second portion 338b of groove 338, ramps 324a pivot radially outward, enabling tails 324e to displace radially outward into second portion 338b of groove 338, as shown in FIG. 3.

With locking members 324d seated within second portion 338b of groove 338, port cover assembly 300 is releasably coupled to spool piece 105. Movement of port cover assembly 300 relative to spool piece 105 in an axially outward (relative to axis 205 and away from bore 130) direction is limited by engagement between shoulders 324g of latches 324 and shoulder 338e of spool piece 105.

To decouple port cover assembly 300 from spool piece 105, a flat head screw driver is inserted through a hole 332 extending through circular body 318 radially inward (relative to axis 205) of each latch 324 to engage groove 324h in locking member 324d. Once engaged, a load is applied to latch 324, causing tail 324e to pivot radially inward to disengage second portion 338b of groove 338. When tails 324e disengage second portion 338b and have pivoted radially inward a sufficient distance to clear shoulder 338e of spool piece 105, port cover assembly 300 is decoupled, or unlocked, from spool piece 105 and may be pulled from port 165 of spool piece 105.

Referring to FIGS. 3 and 8, spring centralizer 326 enables centralizing of spring 306 within tubular member 302. Spring centralizer 326 is disposed between tube levers 320 and extends axially (relative to axis 205) from inner surface 318c of circular body 318. Spring centralizer 326 is a tubular member with a radially inner (relative to central axis 110 of FIG. 2) or first end 326a proximal bore 130 and a radially outer (relative to central axis 110) or second end 326a coupled to, or formed integral with, inner surface 318c of circular body 318.

Referring to FIG. 8, spring 306 enables spring loading of port cover assembly 300. Spring 306 has a radially inner (relative to central axis 110 of FIG. 2) or first end 306a, proximal bore 130, and a radially outer (relative to central axis 110) or second end 306b, distal bore 130. Spring 306 is compressed between cover cap 304 and tubular member 302 with first end 306a abutting the stop ring 310 proximate end 308b of tubular member 302 and second end 306b inserted over spring centralizer 326 and abutting inner surface 318c of cover cap 304. Thus, spring centralizer 326 enables end 306b of spring 306 to remain centralized within tubular member 302.

When installed as shown, cover cap 304 is axially translatable (relative to axis 205) relative to tubular member 302. This relative movement is limited by engagement of pins 330 of tube levers 320 of cover cap 304 with ends 312a, b of the slots 312 into which pins 330 of tube levers 320 are inserted. In the absence of a compressive load to cover cap 304, spring 306 expands against cover cap 304 and tubular member 302, causing cover cap 304 to translate axially away from tubular member 302, relatively speaking, until pins 330 engage second ends 312b of slots 312, as shown. Engagement of pins 330 with second ends 312b prevents cover cap 304 from disengaging tubular member 302 under load from spring 306. Upon application of a compressive load to cover cap 304, cover cap 304 translates axially toward tubular member 302, compressing spring 306 against tubular member 302. Relative movement of cover cap 304 in this direction is limited by engagement of pins 330 with first ends 312a of slots 312. In this manner, cover cap 304 and tubular member 302, and thus port cover assembly 300, are spring-loaded.

Also, when installed as shown, second end 306b of spring 306 reacts against cover cap 304 and first end 306a reacts against the stop ring 310 proximate end 308b of tubular member 302. The load exerted by spring 306 on this stop ring 310 causes tubular member 302 and transformer capsule 250 releasably coupled thereto to remain shouldered against transducer holder 230. This enables electrical connector 253 of transformer capsule 250 to remain coupled with electrical coupling 235 of transducer holder 230 and thus piezoelectric capsule 210.

Referring now to FIGS. 3, 4, and 7-10, the order in which the various components of transducer assembly 200 and port cover assembly 300 are assembled may be varied. However, transducer assembly 200 and port cover assembly 300 are preferably assembled prior to insertion into port 165, and further, a first subassembly including transformer capsule 250 and port cover assembly 300 is preferably assembled prior to coupling transformer capsule 250 to transducer holder 230. Moreover, piezoelectric capsule 210 may be coupled to transducer holder 230 before or after the first subassembly (including transformer capsule 250 and port cover assembly 300) is coupled to transducer holder 230. However, sealed electrical coupling 235 is disposed (relative to axis 205) in throughbore 236 of transducer holder 230 before both piezoelectric capsule 210 and the subassembly (including transformer capsule 250 and port cover assembly 300) are coupled to transducer holder 230.

An exemplary method for assembling gas transducer assembly 200 and port cover assembly 300 will now be described with reference to FIGS. 3, 4, and 7-10. The first subassembly including transformer capsule 250 and port cover assembly 300 may be assembled by coupling transformer capsule 250, tubular member 302, cover cap 304, and spring 306 in any particular order. As one example, these components may be assembled in the following order.

First, spring 306 is inserted through end 308b of tubular member 302 to abut the stop ring 310 proximate end 308b. Cover cap 304 is then releasably coupled to tubular member 302 with spring 306 compressed therebetween. A tension load is applied to each tube lever 320, causing first ends 320a of tube levers 320 to pivot radially outward about second ends 320b. With tube levers 320 pivoted radially outward, second end 308b of tubular member 302 is inserted between tube levers 320 of cover cap 304, compressing spring 306 between cover cap 304 and tubular member 302, and positioning second end 306b of spring 306, disposed within tubular member 302, over spring centralizer 326. Once tubular member 302 is positioned between tube levers 320 with spring 306 positioned about spring centralizer 326, the tension load applied to tube levers 320 is removed, allowing first ends 320a of tube levers 320 to pivot radially inward and pins 330 to engage tubular member 302. If necessary, tubular member 302 is then rotated relative to cover cap 304 to align pins 330 of tube levers 320 within slots 312 proximal second end 308b of tubular member 302. When pins 330 engage slots 312, cover cap 304 is releasably coupled to tubular member 302 with spring 306 compressed therebetween.

Next, cable 125 is inserted through passage 318a of cover cap 304 into tubular member 302. The end 340 of cable 125 to be coupled to terminal block 258, as shown in FIG. 8, is then pulled through tubular member 302, and a knot 342 is formed in cable 125 on the interior side (proximal bore 130) of cover cap 304. Knot 342 is formed in cable 125 at a position along cable 125 such that, when end 340 is coupled to terminal block 258, as shown, there is sufficient length between end 340 and knot 342 to prevent the application of tension along cable 125 to this coupling. Knot 342 in cable 125, when reacting against inner surface 318c of cover cap 304, provides resistance to tension loads that may be applied to cable 125 from outside of spool piece 105.

End 340 of cable 125 is next coupled to terminal block 258. End 340 of cable 125 is stripped of its outer jacket to expose the shield and two insulated conductors. The shield is twisted to form a wire, which is then inserted into the ground screw terminal 261 of terminal block 258 and the associated screw 262 tightened to electrically couple the shield to housing 251 of transformer capsule 250. Each of insulated conductors is inserted into one of the other screw terminals 261 and the associated screws 262 tightened to electrically couple the electronics package 195 to transformer capsule 250.

Next, tubular member 302, with cover cap 304 and spring 306 coupled thereto, is releasably coupled to transformer capsule 250. A pressure load is applied to outer surface 316e of each housing latch 316, causing portions 316b to pivot about bases 316a such that noses 316d displace generally radially outward (relative to axis 205). With noses 316d of latches 316 displaced radially outward, end 250b of transformer capsule 250 is inserted into tubular member 302 to abut the stop ring 310 proximate end 308a of body 308 with cutouts 257 of transformer capsule 250 circumferentially aligned (relative to axis 205) with latches 316. The pressure load to each latch 316 is then removed, allowing pivoting portions 316b to return to their original positions, meaning noses 316d displace radially inward, and grooves 316g of noses 316d receive an edge of housing 251 bounding a cutout 257 such that tubular member 302 is now coupled, or locked, to transformer capsule 250.

Finally, cable 125 is secured to cover cap 304 by a cable clip 322. A tension load is applied to portion 322b of cable clip 322. In response, portion 322b pivots about base 322a of clip 322. Cable 125 is then be inserted within groove 322c between clip 322 and outer surface 318b of cover cap 304, and the tension load to portion 322b removed. When the tension load is removed, portion 322b returns to its original position, thereby securing cable 125 within groove 322c against cover cap 304.

Once assembled, the first subassembly, including port cover assembly 300 and transformer capsule 250, is coupled to transducer holder 230 by axially (relative to axis 205) inserting first end 250a of transformer capsule 250 into counterbore 233 of transducer holder 230 to shoulder transformer capsule 250 against transducer holder 230. Before or after the first subassembly is coupled to transducer holder 230, piezoelectric capsule 210 is also coupled to transducer holder 230 by axially inserting (relative to axis 205) second end 210b of piezoelectric capsule 210 into counterbore 231 of transducer holder 230 and threading second end 210b into counterbore 231 via mating threads 221, 232 until second end 210b is sufficiently seated in counterbore 231. As noted above, sealed electrical coupling 235 is positioned in throughbore 236 of transducer holder 230 before both the first subassembly and piezoelectric capsule 210 are installed in counterbores 233, 231, respectively. Transformer capsule 250 and piezoelectric capsule 210 are preferably seated in counterbores 233, 231, respectively, such that male coax connectors 235a, b of sealed electrical coupling 235 sufficiently engage mating female plug sockets 216, 253, respectively, of piezoelectric capsule 210 and transformer capsule 250, respectively.

Figure 11:
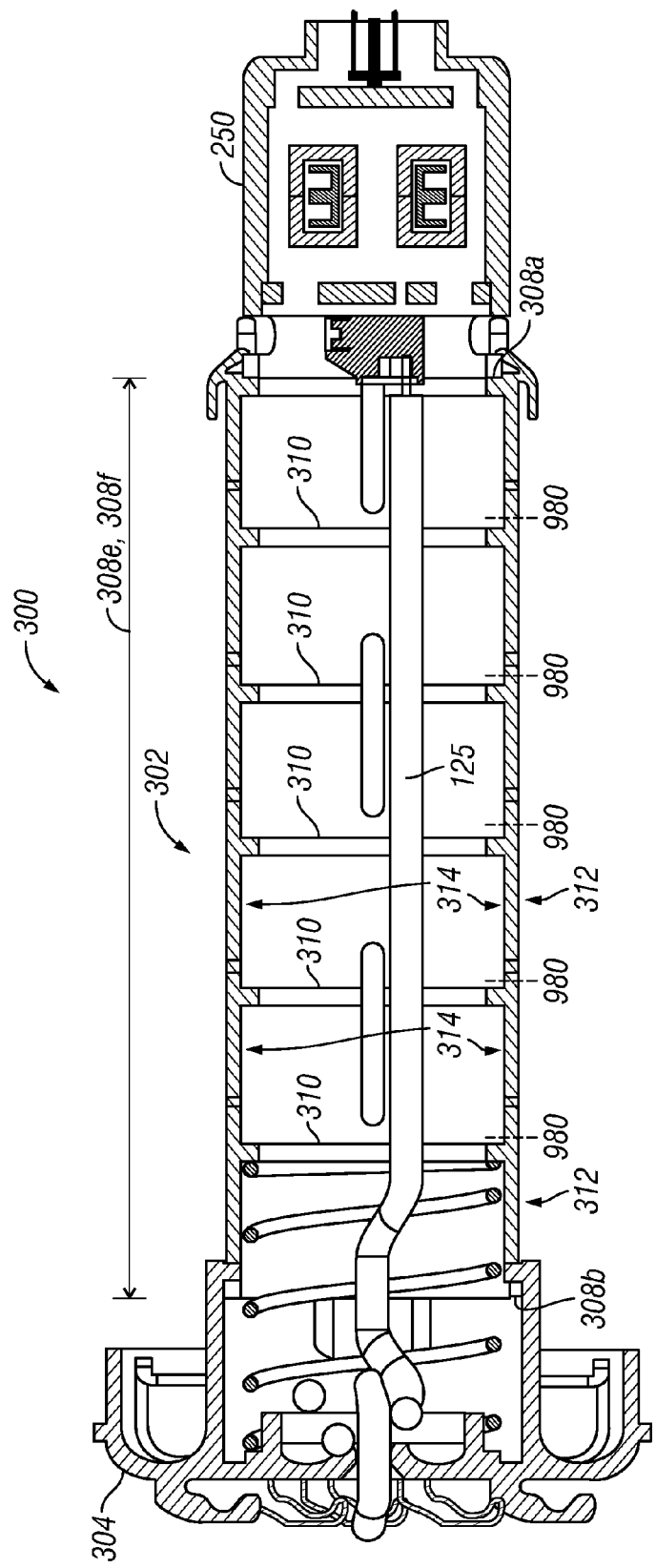
FIG. 11 is a cross-sectional view of the port cover assembly of FIG. 8 with the tubular member as manufactured.

As shown in FIG. 11, tubular member 302 is preferably manufactured with a length 308e such that port cover assembly 300 may be coupled to transducer assembly 200 within transducer ports of varying lengths. Thus, length 308e of tubular member 302 is selected to allow port cover assembly 300 to accommodate the longest expected transducer port. To accommodate comparatively shorter transducer ports, tubular member 302 is shortened from its manufactured length 308e to its installed or assembled length 308f prior to assembly with the remaining components of port cover assembly 300, as described above.

In FIG. 11, tubular member 302 has an assembled length 308f that corresponds to its manufactured length 308e. In other words, tubular member 302 has not been shortened from its manufactured length 308e prior to assembly with the remaining components of port cover assembly 300 and transformer capsule 250. Thus, port cover assembly 300 may accommodate a transducer port having the maximum expected length.

Should it be desirable to shorten port cover assembly 300 to accommodate a shorter transducer port, tubular member 302 may be cut at any of locations 980 to yield a suitable length 308f. As previously described, tubular member 302 includes a plurality of stop rings 310 and pairs 314 of slots 312 along length 308e of tubular member 302. Adjacent stop rings 310 and adjacent pairs 314 of slots 312 are axially spaced (relative to axis 205) a distance 310a. Cut locations 980 share the same axial spacing (relative to axis 205). This enables shortening of tubular member 302 by cutting at any of locations 980 while still enabling tubular member 302 to be assembled with cover cap 304 and spring 306 in the same manner previously described.

Thus, if, for example, it were desirable to shorten tubular member 302 by cutting tubular member 302 at the second cut location 980 radially inward (relative to axis 110 of FIG. 2) of second end 308b of tubular member 302, cover cap 304 would then couple to shortened tubular member 302 by engaging the pair 314 of slots 312 radially inward of the second cut location 980 in the same manner as previously described with spring 306 compressed between cover cap 304 and the stop ring 310 radially inward of the second cut location 980. Shortening tubular member 302 at the second location 980 and subsequently assembling tubular member 302 with cover cap 304 and spring 306 yields the shortened, relatively speaking, port cover assembly 300 shown in FIG. 8.

Figure 12:
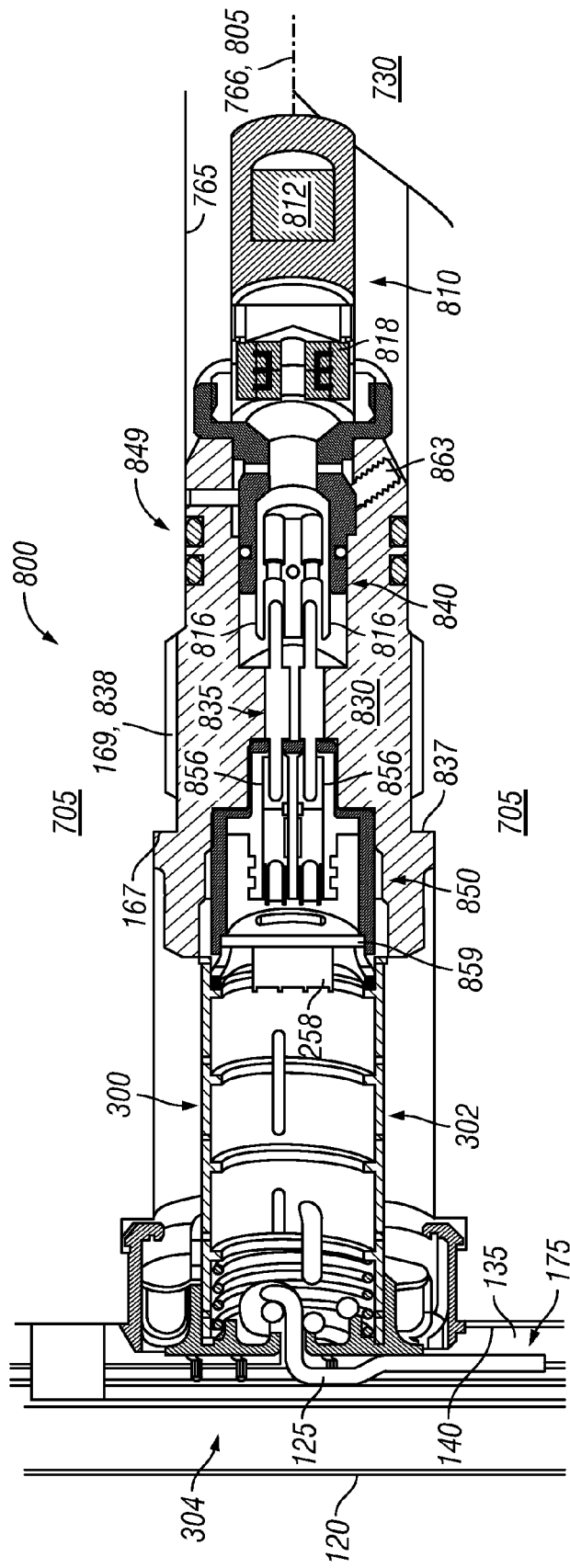
FIG. 12 is a partial cross-sectional view of another embodiment of a gas ultrasonic transducer assembly for use in conjunction with the port cover assembly of FIG. 3 and the ultrasonic flow meter of FIG. 2.

Referring now to FIG. 12, an embodiment of a gas ultrasonic transducer assembly 800 with port cover assembly 300 coupled thereto is shown coaxially disposed in a port 765 of a spool piece 705 that are substantially the same as port 165 and spool piece 105, respectively, previously described. Transducer assembly 800 has a central or longitudinal axis 805 that is generally coincident with central axis 766 of port 765 when transducer assembly 800 is coupled to spool piece 705 within port 765.

Transducer assembly 800 differs from transducer assembly 200 previously described in at least a couple of ways. Namely, transducer assembly 800 includes a transformer 818 that is not sealingly isolated from the fluids flowing in throughbore 730 of spool piece 705 and the pressures within throughbore 730. Rather, transformer 818, like the piezoelectric element of transducer assembly 800, is exposed to fluids flowing in throughbore 730 and their associated pressures. Also, port cover assembly 300 is coupled to transducer assembly 800 by a socket capsule 850 including terminal block 258, instead of transformer capsule 250.

Referring still to FIG. 12 and moving radially outward from throughbore 730 of spool piece 705, transducer assembly 800 includes a piezoelectric and transformer capsule 810, a plug socket holder 840, a transducer holder 830, and socket capsule 850, including terminal block 258. Port cover assembly 300, previously described, is positioned radially outward of transducer assembly 800. Piezoelectric and transformer capsule 810, plug socket holder 840, transducer holder 830, socket capsule 850, and port cover assembly 300 are axially coupled end-to-end and coaxially oriented relative to axes 766, 805. Thus, piezoelectric/transformer capsule 810, plug socket holder 840, transducer holder 830, socket capsule 850, and port cover assembly 300 each have a central axis generally coincident with axes 766, 805. For purposes of conciseness, axial positions of various features and components of transducer assembly 800 are defined herein relative to axes 766, 805, it being understood that each individual component has a central axis generally coincident with axis 805 when assembled into transducer assembly 800 or port cover assembly 300, and generally coincident with axis 766 when installed in port 765.

Figure 13:
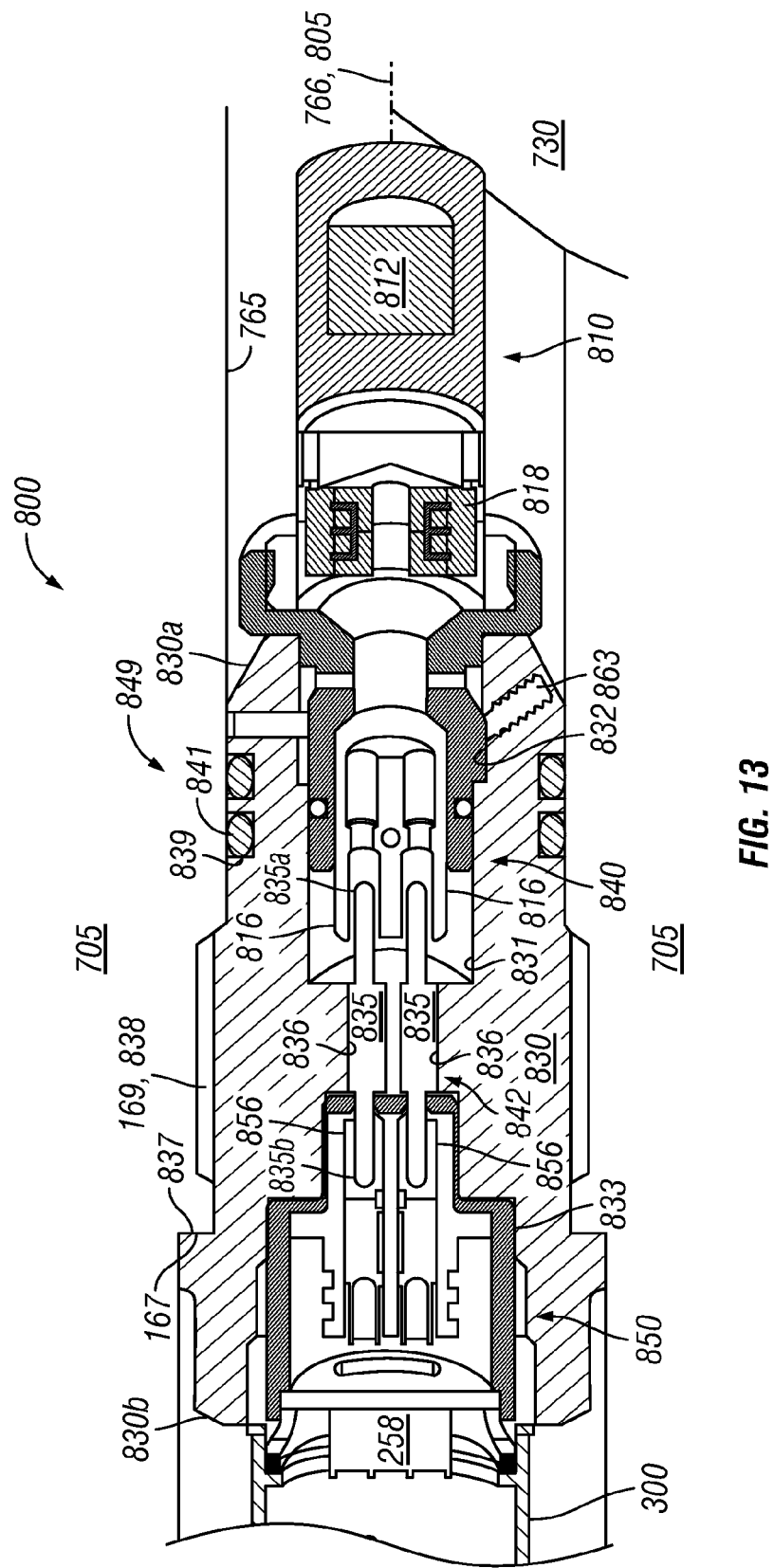
FIG. 13 is an enlarged partial cross-sectional view of the gas ultrasonic transducer assembly of FIG. 12.
Figure 14:
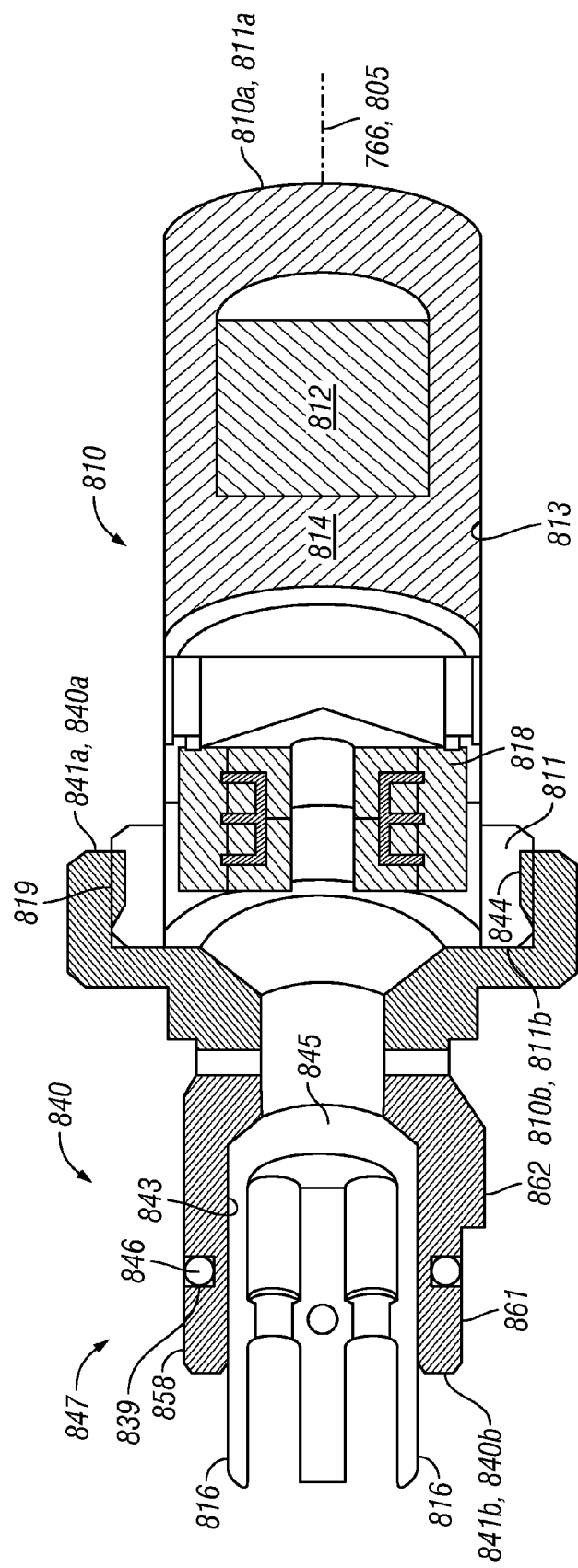
FIG. 14 is an enlarged cross-sectional view of the piezoelectric/transformer capsule and plug socket holder of FIG. 13.

Referring now to FIGS. 13 and 14, piezoelectric/transformer capsule 810 has a radially inner (relative to central axis 110 of FIG. 2) or first end 810a, proximal bore 730, a radially outer (relative to central axis 110) or second end 810b, distal bore 730, and includes a body or housing 811, a piezoelectric element 812, a transformer 818, and a matching layer 814. Housing 811 extends axially relative to central axis 805 between ends 810a, b, and thus, may also be described as having first and second ends 811a, b generally coincident with ends 810a, b, respectively. First ends 810a, 811a of piezoelectric/transformer capsule 810 and housing 811, respectively, extend axially (relative to axis 805) to bore 730 and are exposed to the fluid flowing within throughbore 730. Housing 811 further includes a counterbore 813 at first end 811a that extends axially (relative to axis 805) and external threads 819 proximate second end 811b.

Transformer 818 and piezoelectric element 812 are coaxially disposed in counterbore 813 proximate second end 811b and first end 811a, respectively, of housing 811, and electrically coupled by two wires (not shown) extending therebetween. Piezoelectric element 812 is a piezoelectric material that produces an electrical potential in response to applied mechanical stress, and produces a mechanical stress and/or strain in response to an applied electric field. More specifically, piezoelectric element 812 produces an electrical potential and associated current in response to an acoustic signal, and produces an acoustic signal in response to an applied electrical potential and associated current. In general, piezoelectric element 812 may include any suitable piezoelectric material, such as but not limited to a piezoelectric crystal or ceramic. In this embodiment, piezoelectric element 812 is a piezoelectric crystal. In general, transformer 818 matches the impedance of the piezoelectric element 812 to the electronics.

Matching layer 814 fills the remainder of counterbore 813 and completely surrounds or encases transformer 818 and piezoelectric element 812. The matching layer (e.g., matching layer 814) may include any suitable material, such as but not limited to plastic, metal, glass, ceramic, epoxy, powder-filled epoxy, rubber, or powder-filled rubber. In this embodiment, matching layer 814 includes epoxy that is injected in a fluid form into counterbore 813 and around and over piezoelectric element 212 and transformer 818 and allowed to cure and harden. Regardless of its material, the matching layer (e.g., matching layer 814) provides acoustical coupling between the piezoelectric element (e.g., piezoelectric element 812) and fluid flowing through the meter (e.g., fluid flowing in bore 730). In accordance with certain embodiments disclosed herein, the acoustic matching layer has an acoustic impedance between that of the piezoelectric element and fluid within the meter. With the acoustic impedance of the matching layer between that of the piezoelectric element and the fluid in the meter, the quality of the ultrasonic signal is improved (e.g., larger amplitude and faster rise time).

Matching layer 814, and thus transformer 818 and piezoelectric element 812, is coupled to housing 811 within counterbore 813. In general, matching layer 814 may be coupled to housing 811 by any suitable means including, without limitation, bonding, interference or spring fit, an engagement of mating threads, acoustic coupling oil, grease or adhesive. In this embodiment, matching layer 814 is directly connected to the inner cylindrical surface of counterbore 813 of housing 811 by the adhesive bond of the epoxy.

Referring still to FIGS. 13 and 14, plug socket holder 840 has a radially inner (relative to central axis 110 of FIG. 2) or first end 840a, proximal bore 730, a radially outer (relative to central axis 110) or second end 840b, distal bore 730, and includes a body or housing 841. Housing 841 extends axially (relative to central axis 805) between ends 841a, b, and thus, may also be described as having first and second ends 841a, b generally coincident with ends 840a, b, respectively.

Housing 841 further includes internal threads 844 proximate first end 841a, a counterbore 843 proximate second end 841b, an outer surface 858 with an external groove or recess 839 formed therein, a small diameter portion 861, wherein recess 839 is formed, and a large diameter portion 862, relatively speaking Internal threads 844 mate with external threads 819 of piezoelectric/transformer capsule 810 to enable coupling of plug socket holder 840 and piezoelectric/transformer capsule 810. An annular member 846 is disposed in groove 839 to promote centering of plug socket holder 840 within transducer holder 830. In this embodiment, annular member 846 is an elastomeric O-ring that is radially compressed between plug socket holder 840 and transducer holder 830 upon assembly.

A receptacle holder 845 is disposed within counterbore 843 of housing 841 and secured thereto. Two plug sockets or receptacles 816, in turn, are secured within receptacle holder 845 and electrically coupled to transformer 818 by two leads or wires (not shown). In this embodiment, each plug socket 816 is a female plug.

Figure 15:
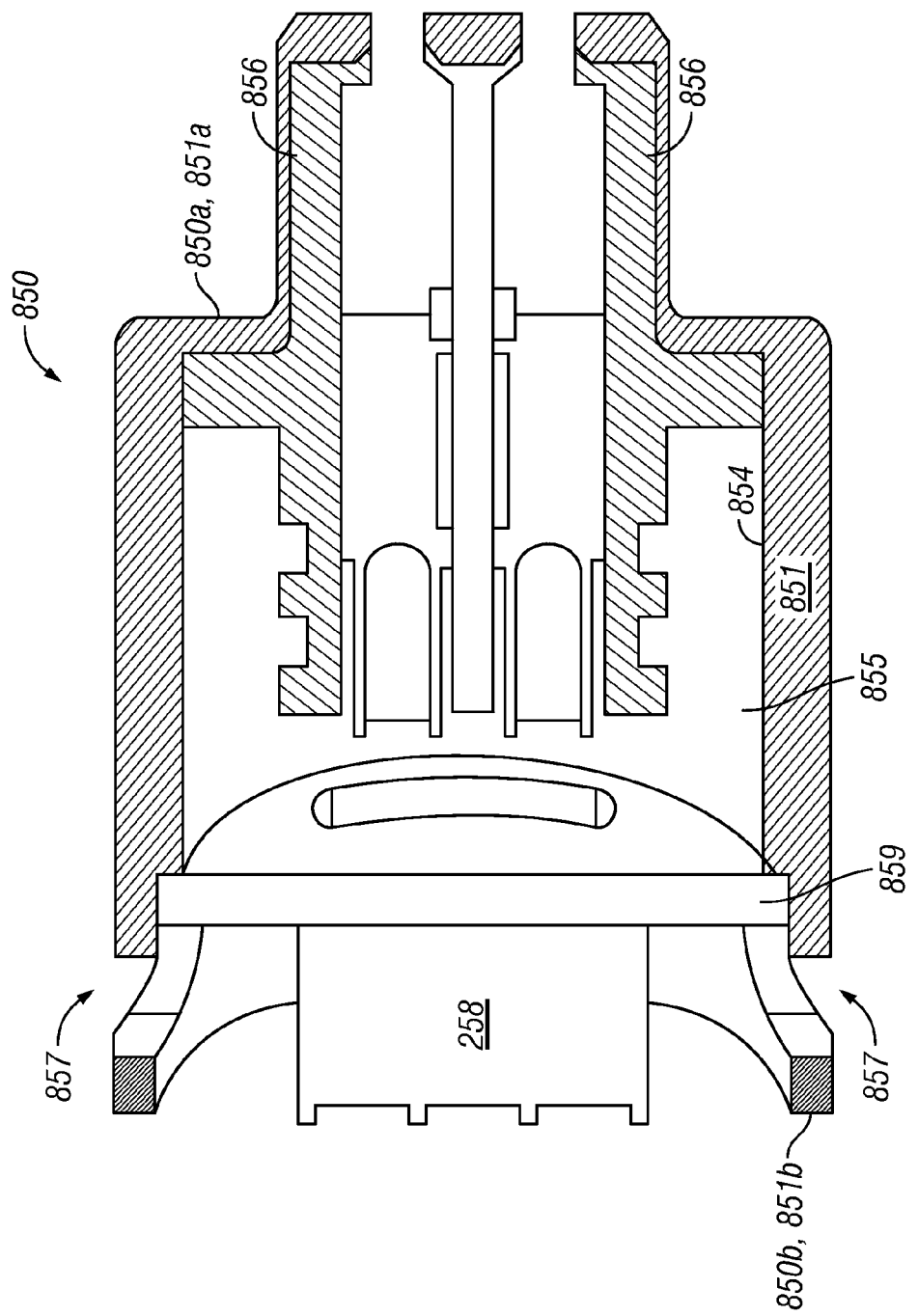
FIG. 15 is an enlarged cross-sectional view of the socket capsule of FIG. 13.

Referring now to FIGS. 12, 13, and 15, socket capsule 850 has a radially inner (relative to axis 110 of FIG. 2) or first end 850a, a radially outer (relative to axis 110) or second end 850b, and includes a body or housing 851. Housing 851 extends axially (relative to axis 805 of FIG. 12) between ends 850a, b, and thus, may also be described as having first and second ends 851a, b coincident with ends 850a, b, respectively. In addition, housing 851 includes a throughbore 854 extending axially (relative to axis 805) between ends 851a, b.

Terminal block 258, previously described, is disposed proximate second end 850b of socket capsule 850 and is coupled to housing 851 proximate second end 851b. In particular, terminal block 258 is mounted to and extends axially (relative to axis 205) from a circuit board 859 disposed in throughbore 854.

Two plug sockets or receptacles 856 are disposed in throughbore 854 and electrically coupled to circuit board 859. Two leads or wires (not shown) electrically couple plug sockets 856 to circuit board 859 and terminal block 258. In this embodiment, each plug socket 856 is a female plug. Female plug sockets 856 and circuit board 859 are rigidly held in place within throughbore 854 relative to housing 851 by a fill material 855 that fills the remainder of throughbore 855. In general, the fill material (e.g., fill material 855) may comprise any suitable material such as plastic or epoxy. Fill material 855 preferably creates an adhesive bond between plug sockets 856 and circuit board 859 and housing 841 sufficient to rigidly hold these components in position. In this embodiment, filler 855 is a rigid epoxy.

Housing 851 further includes two circumferentially (relative to axis 805) spaced cutouts 857 proximate second end 851b. Cutouts 857 enable access to the screws 262 of screw terminals 261 of terminal block 258 and coupling of port cover assembly 300 to socket capsule 850 in the same manner previously described with regard to the coupling of port cover assembly 300 to transformer capsule 250 of transducer assembly 200.

Referring now to FIGS. 12 and 13, transducer holder 830 has a radially inner (relative to axis 110) or first end 830a, proximal bore 730, and a radially outer (relative to axis 110) or second end 830b, distal bore 730. First end 830a includes two counterbores 831, 832. Counterbore 832 extends axially (relative to axis 805) from first end 830a, and counterbore 831 extends axially from counterbore 832. When plug socket holder 840 is installed within transducer holder 830, as shown, counterbore 831 of transducer holder 830 receives small diameter portion 861 of plug socket holder 840, and counterbore 832 receives large diameter portion 862. Plug socket holder 840 is retained within transducer holder 830 by a plurality of set screws 863 coupled therebetween.

Two throughbores 836 extend axially (relative to axis 805) through transducer holder 830 between counterbore 831 and another counterbore 833 that extends axially from second end 830b. An electrical coupling 835 is coaxially disposed in each throughbore 836. Each electrical coupling 835 has ends 835 a, b connected to piezoelectric/transformer capsule 810 and socket capsule 850, respectively. Couplings 835 electrically couple piezoelectric/transformer capsule 810 and socket capsule 850, and allow communication of data relating to the fluid flowing in bore 730 from piezoelectric/transformer capsule 810 to socket capsule 850. In this embodiment, ends 835a, b of couplings 835 are each male connectors that mate and engage with corresponding female plug sockets 816, 856 in piezoelectric/transformer capsule 810 and socket capsule 850, respectively.

An annular seal 842 is provided between each coupling 835 and transducer holder 830, thereby restricting and/or preventing the axial flow of fluids (relative to axis 805) between couplings 835 and transducer holder 830. Seal 842 formed between electrical couplings 835 and transducer holder 830 is preferably sufficient to withstand the expected fluid pressures in bore 730, which are typically greater than ambient. In this embodiment, each seal 842 is a glass seal.

The radially outer (relative to axis 805) surface of transducer holder 830 includes an annular shoulder 837 proximal second end 830b, external threads 838 positioned between shoulder 837 and first end 830a, and one or more recesses or grooves 839 axially positioned (relative to axis 805) between external threads 838 and first end 830a. An annular seal member 841 is disposed in each groove 839. Together, grooves 839 and seals 841 disposed therein define seal assemblies 849 positioned radially (relative to axis 805) between transducer holder 830 and spool piece 705. Seal assemblies 849 restrict and/or prevent the axial flow of fluid (relative to axis 805) between transducer holder 830 and spool piece 705. Consequently, seal assemblies 849 restrict and/or prevent fluids in bore 730 from flowing between transducer holder 830 and spool piece 705. In this embodiment, each annular seal member 841 is an elastomeric O-ring seal that is radially compressed between spool piece 705 and transducer holder 830 upon assembly.

As described, annular seals 842 restrict and/or prevent the axial flow of fluids (relative to axis 805) between electrical couplings 835 and transducer holder 830, and seal assemblies 849 restrict and/or prevent the flow of fluid between transducer holder 830 and spool piece 705. Thus, seal assemblies 849 and seals 842 together form a fluid barrier, or seal, that seals port 765 to restrict and/or prevent potentially hazardous, contaminating, or corrosive fluids in bore 730 from escaping bore 730 via port 765. Restricting and/or preventing the flow of fluids from bore 730 through port 765 may be particularly important in situations where the fluid in bore 730 contains toxic and/or poisonous substances (e.g., the fluid is a hydrocarbon stream containing hydrogen sulfide). Seal assemblies 849 and seals 842 also function to maintain the pressure differential between ambient conditions external spool piece 705 and the pressurized fluid in bore 730. Thus, although piezoelectric/transformer capsule 810 is exposed to the fluid in bore 730 and its associated pressure, socket capsule 850, port cover assembly 300, and cables 125 are isolated from the fluid and pressure within bore 730. Consequently, socket capsule 850, port cover assembly 300, and cables 125 are merely subjected to the ambient pressures external spool piece 705.

During assembly, transducer holder 830 is threaded and axially advanced into port 765 (relative to axis 766) until shoulders 167, 837 engage, thereby preventing continued axial advancement of transducer holder 830 (and transducer assembly 800) into port 765. Thus, shoulder 167 in port 765 defines the axial position of transducer holder 830 (and transducer assembly 800) within port 765. Also, first end 850a of socket capsule 850, with cable 125 and port cover assembly 300 coupled thereto, is inserted into counterbore 833 of transducer holder 830 to shoulder socket capsule 850 against transducer holder 830 with ends 835b of male connectors 835 received within female plug sockets 856.

In some circumstances, it may also be desirable to limit or prevent exposure of the transducer assembly and/or spool piece surfaces bounding the port in which the transducer assembly is installed to fluid, such as rain, melted snow, or atmospheric condensation. In such cases, a sealed port cover assembly may be installed within the transducer port and coupled to the transducer assembly, including transducer assembly 200, transducer assembly 800, or another embodiment of a transducer assembly. Like port cover assembly 300, a sealed port cover assembly enables coupling of cable 125 to terminal block 258 such that there is negligible tension at this coupling and enables cable 125 to be easily covered, for example, by cover 120. Moreover, the sealed port cover assembly forms a seal across end 465b of transducer port 465 to prevent and/or restrict moisture ingression to port 465.

Figure 16:
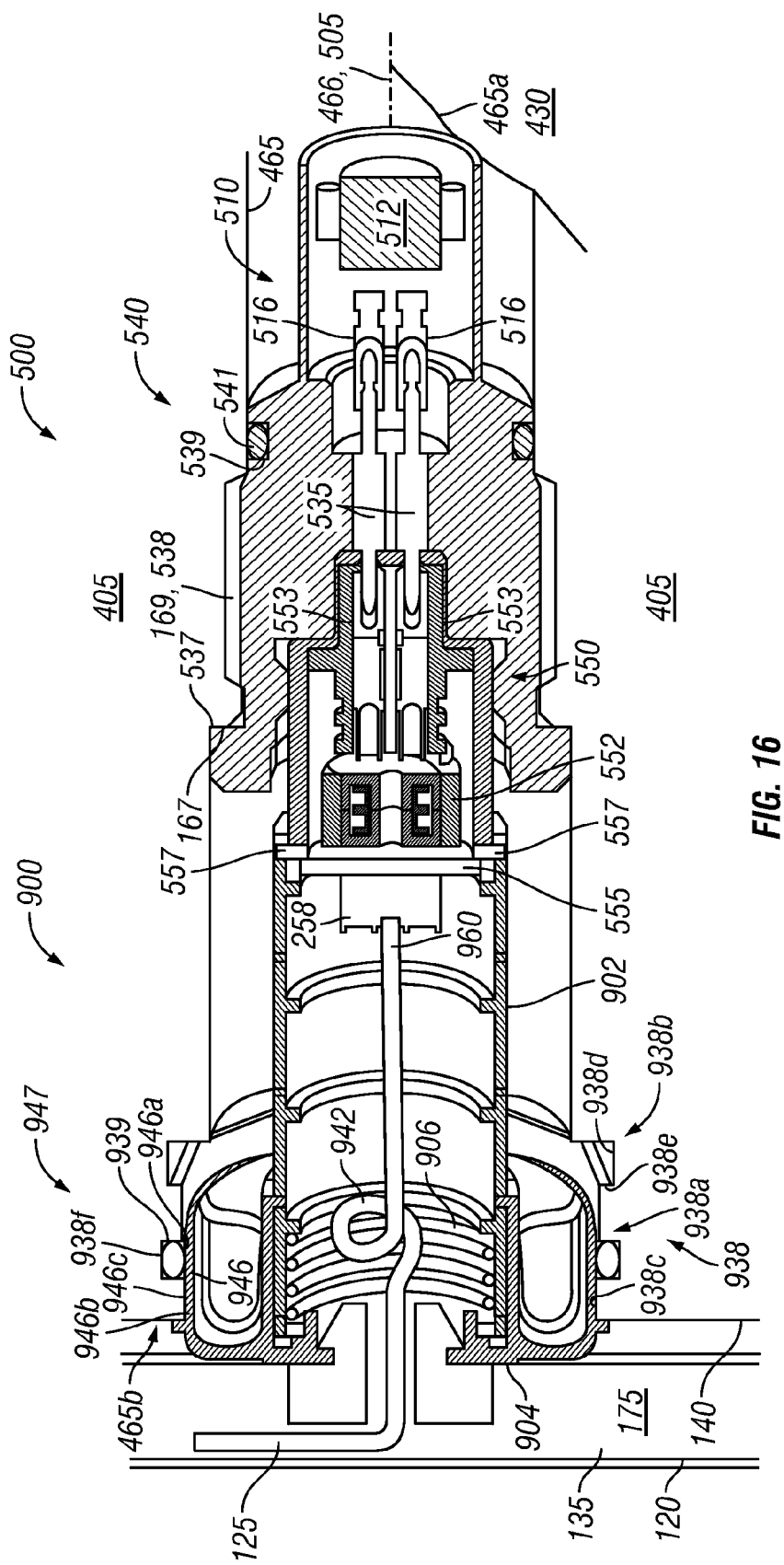
FIG. 16 is a partial cross-sectional view of another embodiment of a gas ultrasonic transducer assembly with a sealed port cover assembly coupled thereto for use in conjunction with the ultrasonic flow meter of FIG. 2.

Referring to FIG. 16, a gas ultrasonic transducer assembly 500 and a sealed port cover assembly 900 coupled thereto are coaxially disposed in a port 465 of a spool piece 405 that are substantially the same as port 165, 765 and spool piece 105, 705, respectively, previously described. Transducer assembly 500 and sealed port cover assembly 900 have a central or longitudinal axis 505 that is generally coincident with central axis 466 of port 465 when transducer assembly 500 and port cover assembly 900 are coupled to spool piece 405 within port 465.

Transducer assembly 500 is similar to transducer assembly 200 previously described. Namely, transducer assembly 500 includes a transformer capsule 550 that is sealingly isolated from the fluids flowing in throughbore 430 of spool piece 405 and the pressures within throughbore 430. However, in this embodiment, the transducer holder and the piezoelectric capsule are essentially merged into one integral structure, and further, a pinned coupling (as opposed to a coax coupling) is employed to electrically couple the transformer and piezoelectric element.

Also, port cover assembly 900 is similar to port cover assembly 300 previously described. Namely, port cover assembly 900 includes a tubular member 902 that couples to transformer capsule 550 and a cover cap 904 that is spring loaded to tubular member 902. However, unlike cover cap 304, cover cap 904 is sealed to prevent and/or restrict the passage of fluid therethrough, and sealingly engages spool piece 405 to prevent and/or restrict fluid flow between cover cap 904 and spool piece 405. Further, the couplings between tubular member 902 and transformer capsule 405 are two bayonet connections, rather than a pair of latches 316.

Moving radially outward from throughbore 430 of spool piece 405, transducer assembly 500 comprises a piezoelectric capsule 510 and transformer capsule 550. Port cover assembly 900 is positioned radially outward of transducer assembly 500. Piezoelectric capsule 510, transformer capsule 550, and port cover assembly 900 are axially coupled end-to-end and coaxially oriented relative to axes 466, 505. Thus, piezoelectric capsule 510, transformer capsule 550, and port cover assembly 900 each have a central axis generally coincident with axes 466, 505. For purposes of simplicity, axes 466, 505 are used herein to define axial positions of various features and components of transducer assembly 500 and port cover assembly 900, it being understood that each individual component has a central axis generally coincident with axis 505 when assembled into transducer assembly 500 or port cover assembly 900, and generally coincident with axis 466 when installed in port 465.

Referring now to FIGS. 16-19, piezoelectric capsule 510 has a radially inner (relative to axis 110) or first end 510a, a radially outer (relative to axis 110) or second end 510b, and comprises a body or housing 511, a piezoelectric element 512, and a matching layer 514. Housing 511 extends axially (relative to axis 505) between ends 510a, b, and thus, may also be described as having first and second ends 511a, b, respectively, coincident with ends 510a, b. First ends 510a, 511a of piezoelectric capsule 510 and housing 511, respectively, extend axially (relative to axis 505) to throughbore 430 and are exposed to the fluid flowing within throughbore 430. In addition, first end 511a of housing 511 includes a counterbore 513 that extends axially (relative to axis 505) from end 511a, and second end 511b of housing 511 includes a counterbore 517 that extends axially (relative to axis 505) from end 511b. Two throughbores 536 extend axially (relative to axis 505) through housing 511 between counterbores 513, 517.

Piezoelectric element 512 is positioned in counterbore 513 proximal first end 511a and bore 430. Piezoelectric element 512 is a piezoelectric material that produces an electrical potential in response to applied mechanical stress and a mechanical stress and/or strain in response to an applied electric field. In general, piezoelectric element 512 may comprises any suitable piezoelectric material such as a piezoelectric crystal or ceramic. However, in this embodiment, piezoelectric element 512 is a piezoelectric crystal.

Two sockets or receptacles 516 are also positioned in counterbore 513 radially inward (relative to axis 110 of FIG. 2) of and aligned with one of throughbores 536. In this embodiment, each socket 516 is a female plug receptacle. Two leads or wires (not shown) electrically couple piezoelectric element 512 to plug sockets 516.

Piezoelectric element 512 and plug sockets 516 are rigidly held in place relative to housing 511 by matching layer 514 that generally fills the remainder of counterbore 513 and surrounds piezoelectric element 512 and female plug sockets 516. Matching layer 514, and thus piezoelectric element 512 and plug sockets 516, are coupled to housing 511 within counterbore 513. In this embodiment, matching layer 514 is directly connected to the inner cylindrical surface of counterbore 513 of housing 511. The matching layer (e.g., matching layer 514) may comprise any suitable material such as plastic, metal, glass, ceramic, epoxy, powder-filled epoxy, rubber, or powder-filled rubber. In this embodiment, matching layer 514 comprises epoxy that is injected into counterbore 513 and around and over piezoelectric element 512, plug sockets 516, and the leads or wires (not shown) extending therebetween. Regardless of the material of the matching layer (e.g., matching layer 514), the matching layer provides acoustical coupling between the piezoelectric element (e.g., piezoelectric element 512) and fluid flowing through the meter. In accordance with certain embodiments disclosed herein, the acoustic matching layer has an acoustic impedance between that of the piezoelectric element and fluid within the meter. With the acoustic impedance of the matching layer between that of the piezoelectric element and the fluid in the meter, the quality of the ultrasonic signal is improved (e.g., larger amplitude and faster rise time).

An electrical coupling 535 is coaxially disposed in each throughbore 536. Each electrical coupling 535 has ends 535a, b connected to piezoelectric capsule 510 and transformer capsule 550, respectively. Couplings 535 electrically couple piezoelectric capsule 510 and transformer capsule 550, and allow communication of data relating to the fluid flowing in bore 430 from piezoelectric capsule 510 to transformer capsule 550. In this embodiment, ends 535a, b of couplings 535 are each male connectors that mate and engage with corresponding female plug sockets 516 in piezoelectric capsule 510 and two female plug sockets in transformer capsule 550, respectively.

An annular seal 542 is provided between each coupling 535 and housing 511, thereby restricting and/or preventing the axial flow of fluids (relative to axis 505) between couplings 535 and housing 511. Seals 542 formed between coax couplings 535 and housing 511 are preferably sufficient to withstand the expected fluid pressures in bore 430, which are typically greater than ambient. In this embodiment, each seal 542 is a glass seal.

Figure 17:
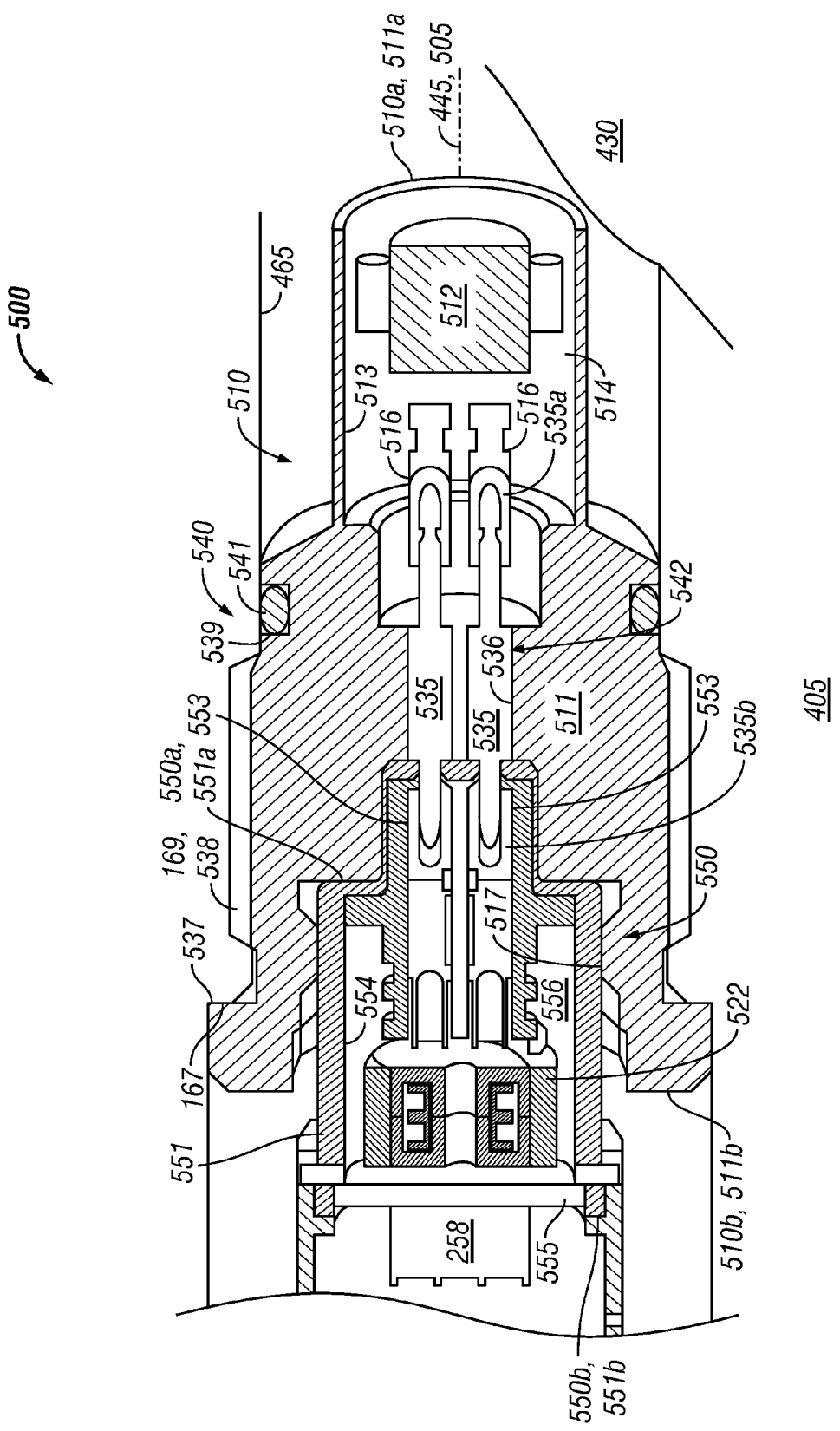
FIG. 17 is an enlarged partial cross-sectional view of the gas ultrasonic transducer assembly of FIG. 16.
Figure 18:
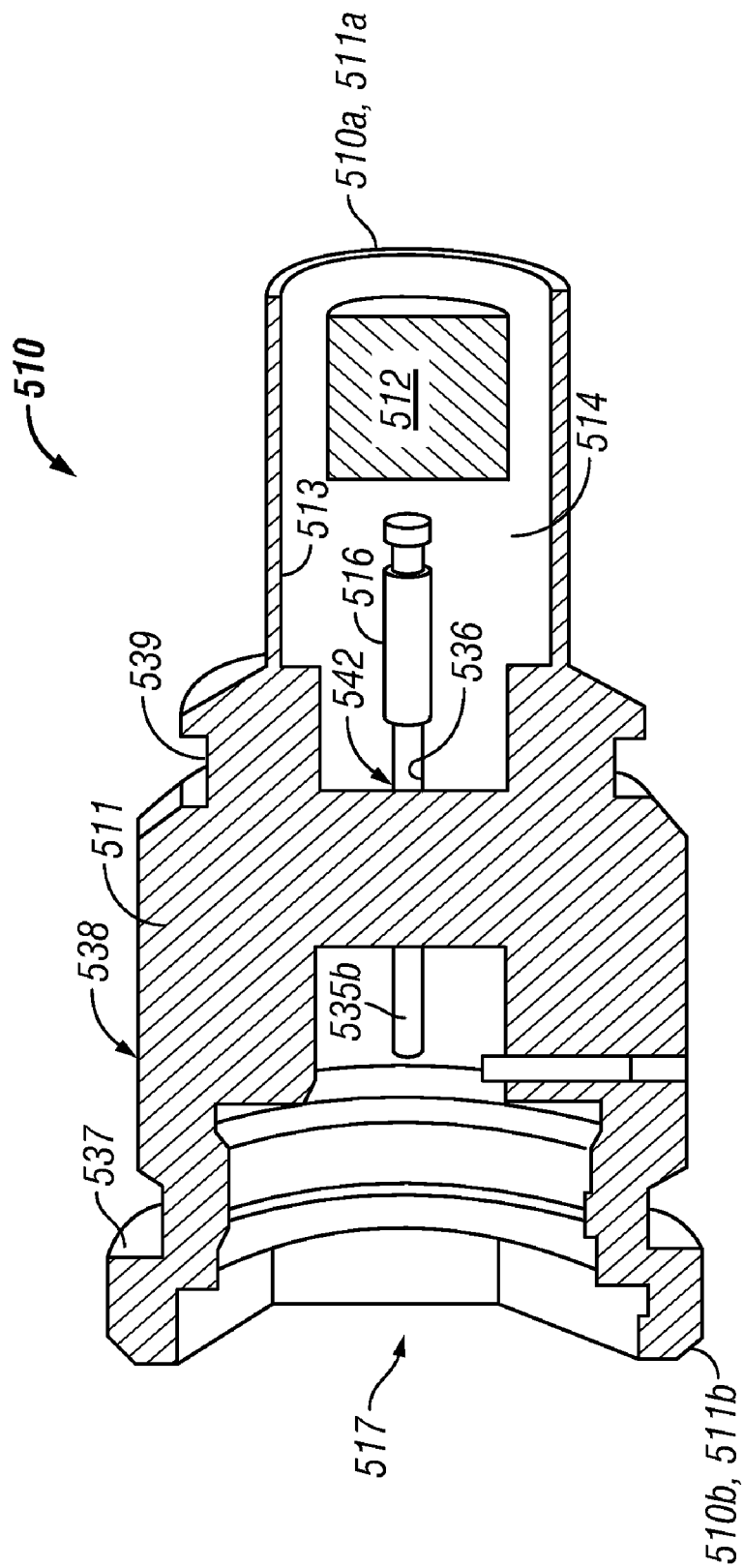
FIG. 18 is an enlarged cross-sectional view of the piezoelectric capsule of FIG. 17.
Figure 19:
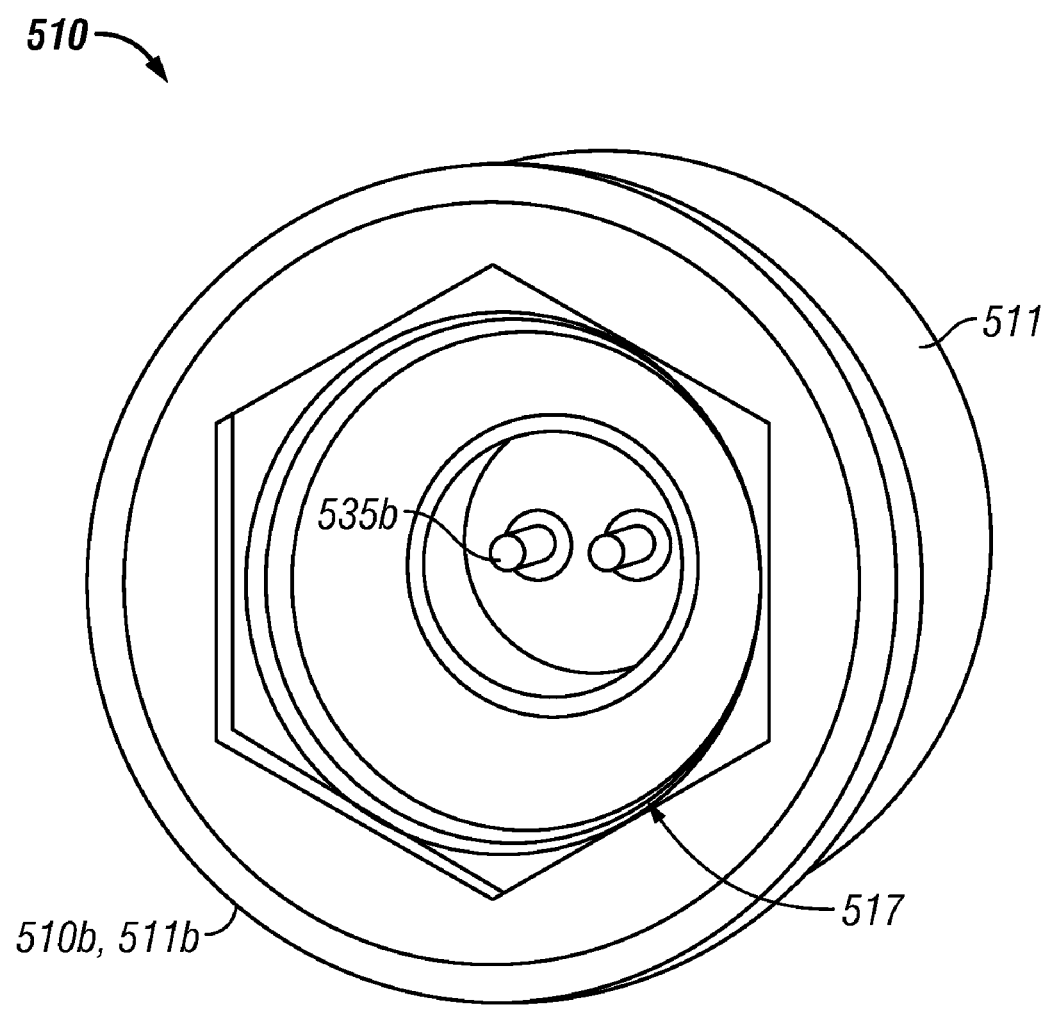
FIG. 19 is an end view of the piezoelectric capsule of FIG. 17.

Referring to FIGS. 16 and 17, the radially outer surface of housing 511 (relative to axis 505) includes an annular shoulder 537 proximal second end 510b, external threads 538 positioned between shoulder 537 and inner end 510a, and an annular recess or groove 539 axially positioned (relative to axis 505) between external threads 538 and inner end 510a. An annular seal 541 is disposed in groove 539. Together, groove 539 and seal 541 disposed therein define a seal assembly 540 positioned radially (relative to axis 505) between piezoelectric capsule 510 and spool piece 405. Seal assembly 540 forms an annular seal between piezoelectric capsule 510 and spool piece 405, thereby restricting and/or preventing the flow of fluid (e.g., fluid flowing in bore 430) between piezoelectric capsule 510 and spool piece 405. In this embodiment, annular seal 541 is an elastomeric O-ring seal that is radially compressed between spool piece 405 and piezoelectric capsule 510 upon assembly.

As previously described, seal assembly 540 restricts and/or prevents the flow of fluid (e.g., fluid flowing in bore 430) between piezoelectric capsule 510 and spool piece 405, and annular seals 542 restrict and/or prevent the axial flow of fluids (relative to axis 505) between each coupling 535 and housing 511. Seal assembly 540 and seals 542 together form a fluid barrier, or seal, that seals port 465 to restrict and/or prevent potentially hazardous, contaminating, or corrosive fluids in bore 430 from escaping bore 430 via port 465. Seal assembly 540 and seals 542 also function to maintain the pressure differential between ambient conditions external spool piece 405 and the pressurized fluid flowing in bore 430. Thus, although piezoelectric capsule 510 is exposed to the fluid and pressures within bore 430, transformer capsule 550, port cover assembly 900, and cable 125 are isolated from the fluid and pressure within bore 430.

Piezoelectric capsule 510 is threadingly coupled to spool piece 405 via mating threads 169, 538, and annular shoulder 537 of housing 511 engages annular shoulder 167 of port 465. During assembly, piezoelectric capsule 510 is threaded and axially advanced into port 465 until shoulders 167, 537 engage, thereby preventing continued axial advancement of piezoelectric capsule 510 (and transducer assembly 500) into port 465. Thus, shoulder 167 in port 465 defines the axial position of piezoelectric capsule 510 (and transducer assembly 500) within port 465.

Referring still to FIGS. 16 and 17, transformer capsule 550 has a radially inner (relative to axis 110 of FIG. 2) or first end 550a, a radially outer (relative to axis 110) or second end 550b, and includes a body or housing 551, a circuit board 555, terminal block 258 previously described coupled thereto, a transformer 552, and a pair of female plug sockets or receptacles 553. Housing 551 extends axially (relative to axis 505 of FIG. 16) between ends 550a, b, and thus, may also be described as having first and second ends 551a, b coincident with ends 550a, b, respectively. Housing 551 includes a throughbore 554 extending axially (relative to axis 505) between ends 551a, b and two circumferentially spaced (relative to axis 505) radially outward extending pins 557 proximate end 551b, which, as will be described, enable coupling of port cover assembly 900 to transformer capsule 550.

As best shown in FIG. 17, plug sockets or receptacles 553, circuit board 555, and transformer 552 are disposed in throughbore 554. In this embodiment, each plug socket 553 is a female plug. Terminal block 258 is disposed proximate second end 550b of transformer capsule 550 and is coupled to housing 551 proximate second end 551b. In particular, terminal block 258 is mounted to and extends axially (relative to axis 505) from circuit board 555. Circuit board 555 and transformer 552 are electrically coupled via a pair of lead wires (not shown). Transformer 252 and plug sockets 553 are electrically coupled via another pair of lead wires (also not shown). Terminal block 258 is electrically coupled to circuit board 555 in a manner similar to the coupling of terminal block 258 of transducer assembly 200 with circuit board 259 previously described.

Circuit board 555, transformer 552, and female plug sockets 553 are rigidly held in place relative to housing 551 within throughbore 554 by a fill material 556 that fills the remainder of throughbore 554. In FIG. 17, transformer capsule 550 is shown with fill material 556 (e.g., after installation of fill material 556 in throughbore 554). In general, the fill material (e.g., fill material 556) may include any suitable material such as plastic, epoxy, or ceramic. Fill material 556 creates an adhesive bond between circuit board 555, transformer 552, female plug sockets 553, and the lead wires to rigidly hold these components in position. In this embodiment, filler 556 is a rigid epoxy.

As best shown in FIGS. 16 and 17, electrical couplings 535 are disposed in throughbores 536 of housing 511 and extend between piezoelectric capsule 510 and transformer capsule 550. Ends 535*a, b* of each electrical couplings 535 engage and mate with female plug sockets 516, 553, respectively, thereby electrically coupling piezoelectric capsule 510 and transformer capsule 550. In particular, first end 550*a* of transformer capsule 550, with cable 125 and port cover assembly 900 coupled thereto, is inserted into counterbore 517 of piezoelectric capsule 510 to shoulder transformer capsule 550 against piezoelectric capsule 510 with ends 535*b* of male connectors 535 received within female plug sockets 553. Thus, piezoelectric capsule 510 and transformer capsule 550 are axially spaced apart (relative to axis 505) by electrical couplings 535.

Referring again to FIG. 16, port cover assembly 900, like port cover assembly 300, enables coupling of cable 125 to terminal block 258 such that there is little, preferably negligible, tension at this coupling and enables cable 125 to be easily covered, for example, by cover 120. In addition, port cover assembly 900 also prevents and/or restricts ingress of fluid, such as rainwater, melted snow, or atmospheric condensate, through end 465*b* of transducer port 465. Thus, port cover assembly 900 forms a seal across end 465*b* of transducer port 465. Port cover assembly 900 includes a tubular member 902, a sealed cover cap 904, and a spring 906 disposed therebetween.

Referring to FIGS. 20, 21, 23, and 24, tubular member 902 has a cylindrical body 908 with a radially inner (relative to axis 110 of FIG. 2) or first end 908*a*, proximal bore 430 (FIG. 16), and a radially outer (relative to axis 110) or second end 808*b*, distal bore 430. Tubular member 902 further includes a plurality of axially spaced (relative to axis 505 of FIG. 15) stop rings 910. As will be described, stop rings 910 enable spring loading of cover cap 904 to tubular member 902. Each stop ring 910 extends both circumferentially along and radially inward from the inner surface 908*c* of body 908. Further, each stop ring 910 is spaced an equal distance 910*a* between two adjacent stop rings 910, between end 908*b* and an adjacent stop ring 910, or between end 908*a* and an adjacent stop ring 910. In this embodiment, stop rings 910 are spaced 0.5 inches apart.

Tubular member 902 further includes one or more pairs 914 of slots 912 formed in body 908. As will be described, slots 912 enable releasable coupling of cover cap 904 to tubular member 902. Each slot 912 has a radially inner (relative to axis 110) or first end 912*a*, proximal bore 430, a radially outer (relative to axis 110) or second end 912*b*, distal bore 430, and a length 912*c*. Length 912*c* of each slot 912 is greater than spacing 910*a* between adjacent stop rings 910. The slots 912 of each pair 914 are axially aligned (relative to axis 505), meaning their ends 912*a* are equidistant from end 908*a* of body 908, and their ends 912*b* are equidistant from end 908*b* of body 908. The slots 912 within each pair 914 are also circumferentially spaced apart. Further, adjacent pairs 914 of slots 912 are circumferentially offset. In this embodiment, the slots 912 within each pair 914 are circumferentially spaced 180 degrees, and adjacent pairs 914 of slots 912 are circumferentially offset 90 degrees.

At end 908*a* of body 908, tubular member 902 further includes two locking bayonet slots 916. Locking slots 916 enable releasable coupling of port cover assembly 900 to transformer capsule 550. In this embodiment, tubular member 902 is molded such that slots 916 are integral to body 908. However, in other embodiments, slots 916 may be formed in body 980, for example, by machining Slots 916 are circumferentially spaced (relative to axis 505) such that their circumferentially spacing is substantially the same as that between pins 557 (FIGS. 16, 17) of housing 551 of transformer capsule 550. As will be described, this enables pins 557 to be received within slots 916 to releasably couple, or lock, port cover assembly 900 to transformer capsule 550. Thus, each slot 916 and pin 557 locked therein forms a bayonet connector or connection 917.

Figure 20:
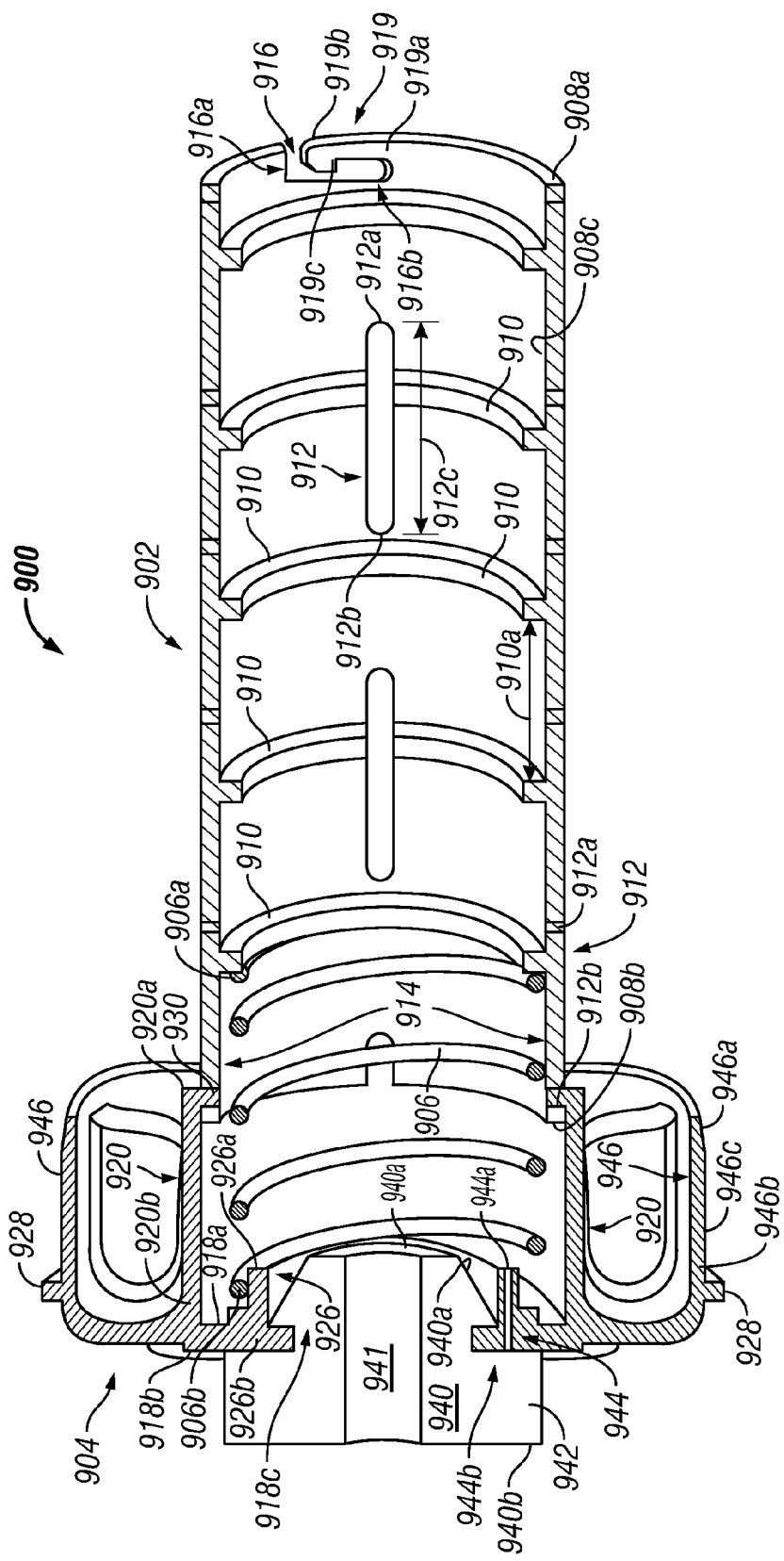
FIG. 20 is an enlarged cross-sectional view of the port cover assembly of FIG. 16.

Referring to FIG. 20, each locking slot 916 of tubular member 902 includes a first axially extending (relative to axis 505) portion 916*a* and a second circumferentially extending (relative to axis 505) portion 916*b*. Portion 916*a* extends axially from end 908*a* of body 908. Portion 916*b* is connected to and extends circumferentially from portion 916*a*. Adjacent each slot 916, body 908 further includes a flexible lever 919. Lever 919 extends between a first end 919*a* connected to body 908 and a second end 919*b* connected to first end 919*a*. Lever 919 further includes a flanged portion 919*c* extending radially outward (relative to axis 110 of FIG. 2) and a bump out 919*d* (FIG. 23) extending radially outward (relative to axis 505) at second end 919*b*. Lever 919 is flexible such that lever 919 is pivotable radially inward (relative to axis 110 of FIG. 2) about its first end 919*a* connected to body 908 under load, and when the tension load is removed, pivotable radially outward (relative to axis 110) to return to its original, unloaded position.

Figure 25:
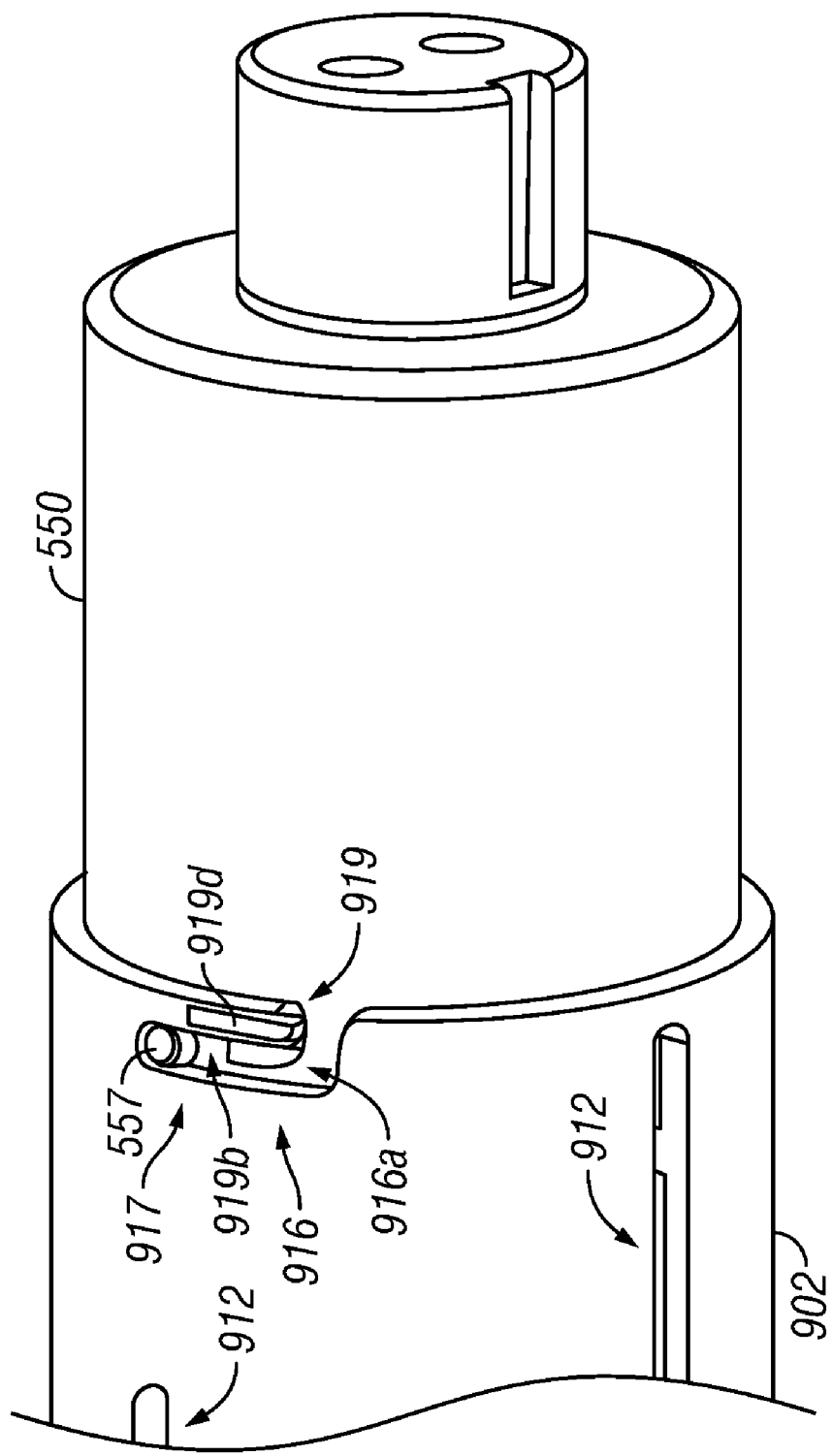
FIG. 25 is an enlarged cross-sectional view of the coupling of the port cover assembly to the transformer capsule of FIG. 3.

To releasably couple tubular member 902 to transformer capsule 550, transformer capsule 550 and tubular member 902 are positioned end-to-end, and axially displaced (relative to axis 505) relative to each other to insert pins 557 of transformer capsule 550 into first portions 916*a* of slots 916 in tubular member 902. With pins 557 inserted within portions 916*a* of slots 916, transformer capsule 550 and tubular member 902 are then rotated (about axis 505) relative to each other to displace pins 557 into and along second portions 916*b* of slots 916. As pins 557 displace within second portions 916*b*, pins 557 approach flanged portions 919*c* of levers 919. A load is applied to each bump out 919*d* of levers 919 to cause levers 919 to pivot radially inward (relative to axis 110). With levers 919 pivoted radially inward, transformer capsule 550 and tubular member 902 are further rotated relative to each other to displace pins 557 within second portions 916*b* of slots 916 beyond flanged portions 919*c* of levers 919. Once pins 557 displace beyond flanged portions 919*c*, the load applied to each bump out 919*d* of levers 919 is removed, allowing levers 919 to pivot radially outward and return to their original, unloaded positions. Tubular member 902 is now releasably coupled, or locked, to transformer capsule 550, as shown in FIG. 25.

To decouple, or unlock, tubular member 902 and transformer capsule 550, tubular member 902 and transformer capsule 550 are again rotated relative to each other to displace pins 557 along second portions 916*b* of slots 916 toward flanged portions 919*c* of levers 919. A load is applied to each bump out 919*d* of levers 919, causing to levers 919 pivot radially inward (relative to axis 110). Transformer capsule 550 and tubular member 902 are further rotated relative to each other to displace pins 557 within second portions 916*b* of slots 916 beyond flanged portions 919*c* of levers 919. Once pins 557 pass beyond flanged portions 916*c*, the load to each bump out 919*d* is removed, allowing levers 919 to pivot radially outward and return to their original positions. Continued relative rotation of tubular member 902 and transformer capsule 550 displaces pins 557 from second portions 916*b* of slots 916 into first portions 916*a*. When pins 557 are positioned within first portions 916*a*, tubular member 902 is displaced axially (relative to axis 505) away from transformer 550, or vice versa, to remove pins 557 from first portions 916*a* of slots 916. Tubular member 902 is now decoupled, or unlocked, from transformer capsule 550.

Referring to FIGS. 20-24, cover cap 904 includes a circular body 918 with a tubular portion 946 extending axially therefrom, a grommet 940, a vent slot 944, two tube levers 920, two latch assemblies 924, a spring centralizer 926, a stop shoulder 928, a plurality of cable clamp assemblies 922. Circular body 918 includes a radially inner (relative to axis 110) surface 918*a* proximal tubular member 902 and a radially outer (relative to axis 110) surface 918*b* distal tubular member 902. Circular body 918 further includes a bore or passage 918*c* extending therethrough. In this embodiment, passage 918*c* is located proximate the center of circular body 918.

Grommet 940 is received through passage 918*c* of circular body 918, as shown. In this embodiment, grommet 940 is flexible, rubber member compression fit within passage 918*c* to provide a barrier or seal preventing and/or restricting moisture ingression through passage 918*c* into transducer port 465 (FIG. 16). Grommet 940 includes a radially inner (relative to axis 110) or first end 940*a* proximal circular body 918, a radially outer (relative to axis 110) or second end 940*b* distal circular body 918, and a passageway 941 extending therebetween. Passageway 941 is configured to receive cable 125 therethrough, as shown in FIG. 16. When cable 125 is inserted through passageway 941 of grommet 940, grommet 940 sealingly engages cable 125 such that moisture ingression through passageway 941 is prevented and/or restricted. Referring still to FIGS. 20-22B, grommet 940 further includes a radially extending (relative to axis 505 of FIG. 16) shoulder 942 disposed between inner and outer ends 940*a, b*. Shoulder 942 sealingly engages outer surface 918*b* of circular body 918 to prevent and/or restrict moisture ingression therebetween.

As previously described, seal assembly 540 (FIG. 16) disposed between transducer assembly 500 and spool piece 405 and seals 542 (FIG. 17) of transducer assembly 500 restrict and/or prevent fluid in bore 430 from escaping bore 430 via port 465. Over time, seal assembly 540 and/or seals 542 may seep small amounts of the fluid from bore 430. Because port cover assembly 900 forms a seal to prevent and/restrict moisture ingression through end 465*b* of transducer port 465, fluid may accumulate over time within transducer port 465 between cover cap 904 and transducer assembly 500. The accompanying pressure buildup may present a safety concern during maintenance or servicing of flow meter 100.

To alleviate fluid pressure buildup, circular body 918 further includes a vent port 944. Vent port 944 extends axially (relative to axis 505 of FIG. 16) between inner surface 918*a* of circular body 918 and outer surface 918*b* radially outward (relative to axis 505) of passageway 918*c*. Vent port 944 includes a radially inner (relative to axis 110) end or inlet 944*a*, proximal bore 430 (FIG. 16), and a radially outer (relative to axis 110) end or outlet 944*b*, distal bore 430. Outlet 944*b* is sealingly covered by shoulder 942 of grommet 940. Thus, moisture ingression through vent port 944 is prevented and/or restricted. If or when fluid pressure within transducer port 465 between cover cap 904 and transducer assembly 500 reaches a sufficient level, the gas pressure within vent port 944 and acting on grommet 940 proximate outlet 944*b* will cause grommet 940 to flex away from outlet 944*b* and allow some gas to vent from transducer port 465 through port 944. When the gas pressure within transducer port 465 is sufficiently reduced, grommet 940 returns to its original position in sealing engagement with outer surface 918*b* of circular body 918 over outlet 944*b*.

Referring to FIGS. 20-24, stop shoulder 928 limits excessive insertion of port cover assembly 900 into transducer port 465 (FIG. 16) of spool piece 405. Stop shoulder 928 extends radially outward (relative to axis 505) from outer surface 918*b* of circular body 918, and in this embodiment, extends around the full periphery of cover cap 904. When port cover assembly 900 is inserted within transducer port 465, as shown in FIG. 16, stop shoulder 928 abuts face 140 of boss 135 and prevents further axial advancement or insertion of port cover assembly 900 into port 465.

Tubular portion 946 of cover cap 904 enables sealing engagement between cover cap 904 and spool piece 505 when port cover assembly 900 is installed within transducer port 465, as shown in FIG. 16. Referring to FIGS. 20, 22A, 22B, and 23, tubular portion 946 extends axially (relative to axis 505) from circular body 918 proximate stop shoulder 928. Tubular portion 946 has a radially inner (relative to axis 110) or first end 946*a*, a radially outer (relative to axis 110) or second end 946*b* connected to, or formed integrally with, circular body 918 proximate stop shoulder 928, and a radially outer (relative to axis 505) surface 946*c*. Outer surface 946*c* is defined by a diameter that is slightly smaller than the diameter of transducer port 465.

Referring briefly to FIG. 16, spool piece 505 has a groove 938 formed therein. Groove 938 bounds transducer port 465 and extends axially (relative to axis 505) from end 465*b* of transducer port 465 at face 140 of boss 135. Groove 938 has a first portion 938*a* extending from end 465*b* and a second portion 938*b* connected thereto. First portion 938*a* has an axially extending (relative to axis 505) surface 938*c*, and second portion 938*b* has an axially extending surface 938*d*. Inner surface 938*c* is defined by a diameter (relative to axis 505) that is less than the diameter that defines inner surface 938*d*. Thus, a shoulder 938*e* is formed in spool piece 505 at the transition between first and second portions 938*a, b*. An annular (relative to axis 505) groove 938*f* is formed in inner surface 938*c*. An annular seal member 939 is disposed in groove 938*f*. Together, groove 938*f* and seal member 939 disposed therein define a seal assembly 947 positioned radially (relative to axis 505) between tubular portion 946 of cover cap 904 and spool piece 505. Seal assembly 947 restricts and/or prevents moisture ingression between cover cap 904 and spool piece 505 into transducer port 465. In this embodiment, annular seal member 939 is an elastomeric O-ring seal that is radially compressed between spool piece 505 and cover cap 904 upon assembly.

Figure 24:
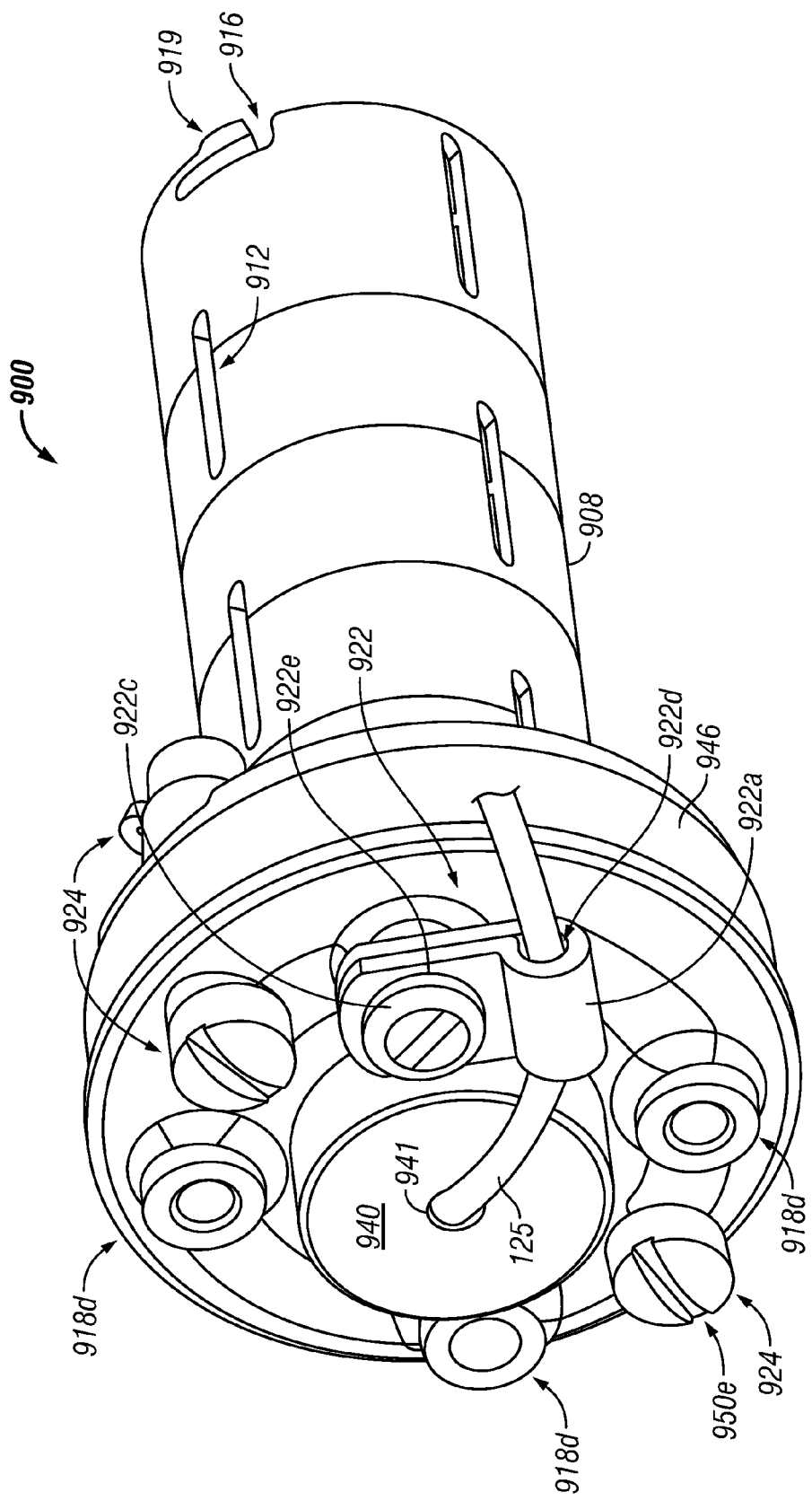
FIG. 24 is perspective view of the port cover assembly of FIG. 16, showing the exterior side of the cover cap.

Returning to FIGS. 23 and 24, clamp assemblies 922 enable cable 125 to be secured against cover cap 904. In this embodiment, port cover assembly 900 may include up to four clamp assemblies 922 (only 1 is shown) disposed circumferentially about grommet 940. Each clamp assembly 922 is coupled to cover cap 904 via a bottomed hole 918*d* formed in outer surface 918b of circular body 918. In some embodiments, each bottomed hole 918d is threaded or sized to receive a self-tapping screw. Each clamp assembly 922 includes a screw 922c, and a cable clamp 922a. Each cable clamp 922a includes a bore 922e configured to receive screw 922c and a receptacle 922d configured to receive cable 125 therethrough, as shown in FIG. 24. Screw 922c extends through bore 922e of cable clamp 922a and is coupled within bottomed hole 918d.

Referring to FIGS. 16 and 20, tube levers 920 enable releasable coupling of cover cap 904 to tubular member 902. Tube levers 920 extend axially (relative to axis 505) from inner surface 918a of circular body 918 and are circumferentially spaced. Their circumferential spacing is the same as that between the slots 912 of each pair 914 of slots 912 in tubular member 902. Each tube lever 920 has a radially inner (relative to central axis 110 of FIG. 2) or first end 920a proximal bore 430 and a radially outer (relative to axis 110) or second end 920b coupled to, or formed integral with, inner surface 918a of circular body 918. Further, each tube lever 920 is flexible such that first end 920a is radially pivotable (relative to axis 505) about second end 920b connected to circular body 918. At first end 920a, each tube lever 920 further includes a radially inward extending (relative to axis 505) pin 930 configured to be insertable within a slot 912 in tubular member 902.

To releasably couple cover cap 904 to tubular member 902, a tension load is applied to each tube lever 920, causing first ends 920a of tube levers 920 to pivot radially outward about second ends 920b. With tube levers 920 pivoted radially outward, second end 908b of tubular member 902 is inserted between tube levers 920 of cover cap 904. Once tubular member 902 is positioned between tube levers 920, the tension load applied to tube levers 920 is removed, allowing first ends 920a of tube levers 920 to pivot radially inward and pins 930 to engage tubular member 902. If necessary, tubular member 902 is then rotated relative to cover cap 904 to engage pins 930 of tube levers 920 within slots 912 proximal second end 908b of tubular member 902. When pins 930 engage within slots 912, cover cap 904 is releasably coupled to tubular member 902.

To release cover cap 904 from tubular member 902, a tension load is again applied to tube levers 920, causing first ends 920a of tube levers 920 to pivot radially outward. As first ends 920a pivot radially outward, pins 930 disengage slots 912. With pins 930 disengaged from slots 912, tubular member 902 may be removed from between tube levers 920 of cover cap 904 to disengage cover cap 904.

Referring to FIGS. 21-24 and 26, latch assemblies 924 enable releasable coupling of transducer assembly 500 to spool piece 505. Latch assemblies 924 are disposed radially outward (relative to axis 505) of tube levers 920 and extend axially through the periphery of circular body 918. Further, latch assemblies 924 are circumferentially spaced (relative to axis 505). In this embodiment, latch assemblies 924 are circumferentially spaced apart 180 degrees, as best viewed in FIG. 24.

Each latch assembly 924 includes a latch operator 950, a latch 951, and a gasket 952. Each latch operator 950 has an axially extending (relative to axis 505) body 950a inserted through a bore 918e through circular body 918. Body 950a has a first end 950b and a second end 950c. Latch operator 950 further includes a head 950d coupled to, or formed integrally with, first end 950b of body 950a. Latch 951 is coupled to second end 950c of body 950a via one or more pins 951h extending therebetween. Head 950d has an outer dimension exceeding the inner diameter of bore 918e. Thus, head 950d limits advancement of latch operator 950 through circular body 918 into transducer port 465 of spool piece 505. Head 950d further includes a slot 950e (FIG. 24) formed therein. Slot 950e enables rotation of latch operator 950 and latch 951 coupled thereto relative to circular body 918.

Latch 951, coupled to second end 950c of body 950a, includes a tubular body 951a and a flanged portion 951b extending generally radially therefrom relative to a longitudinal axis 951c of tubular body 951a. Flanged portion 951b extends circumferentially (relative to axis 951c) about tubular body 951a over less than the full circumference of body 951a. In this embodiment, flanged portion 951b extends circumferentially 180 degrees about tubular body 951a.

Figure 22B:
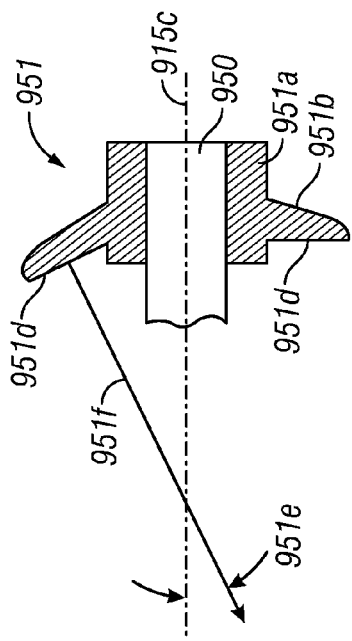
FIGS. 22A and 22B are enlarged cross-sectional views of the cover cap and one latch of the cover cap, respectively, of FIG. 20.
Figure 22A:
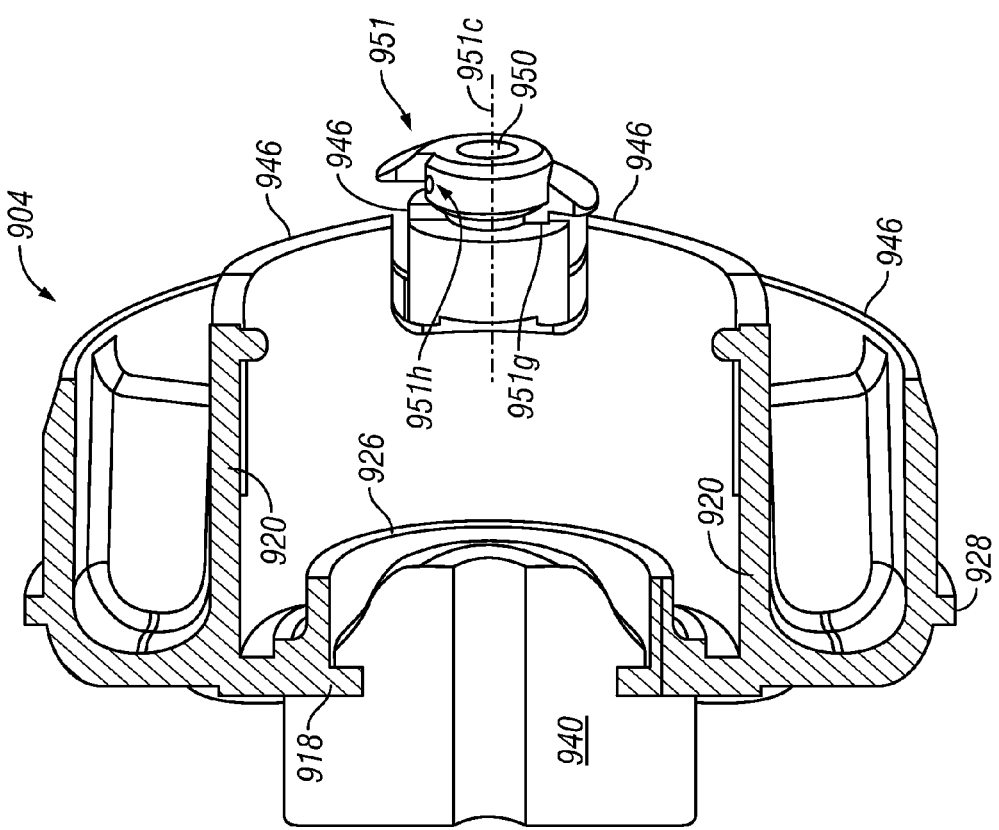
Figure 23:
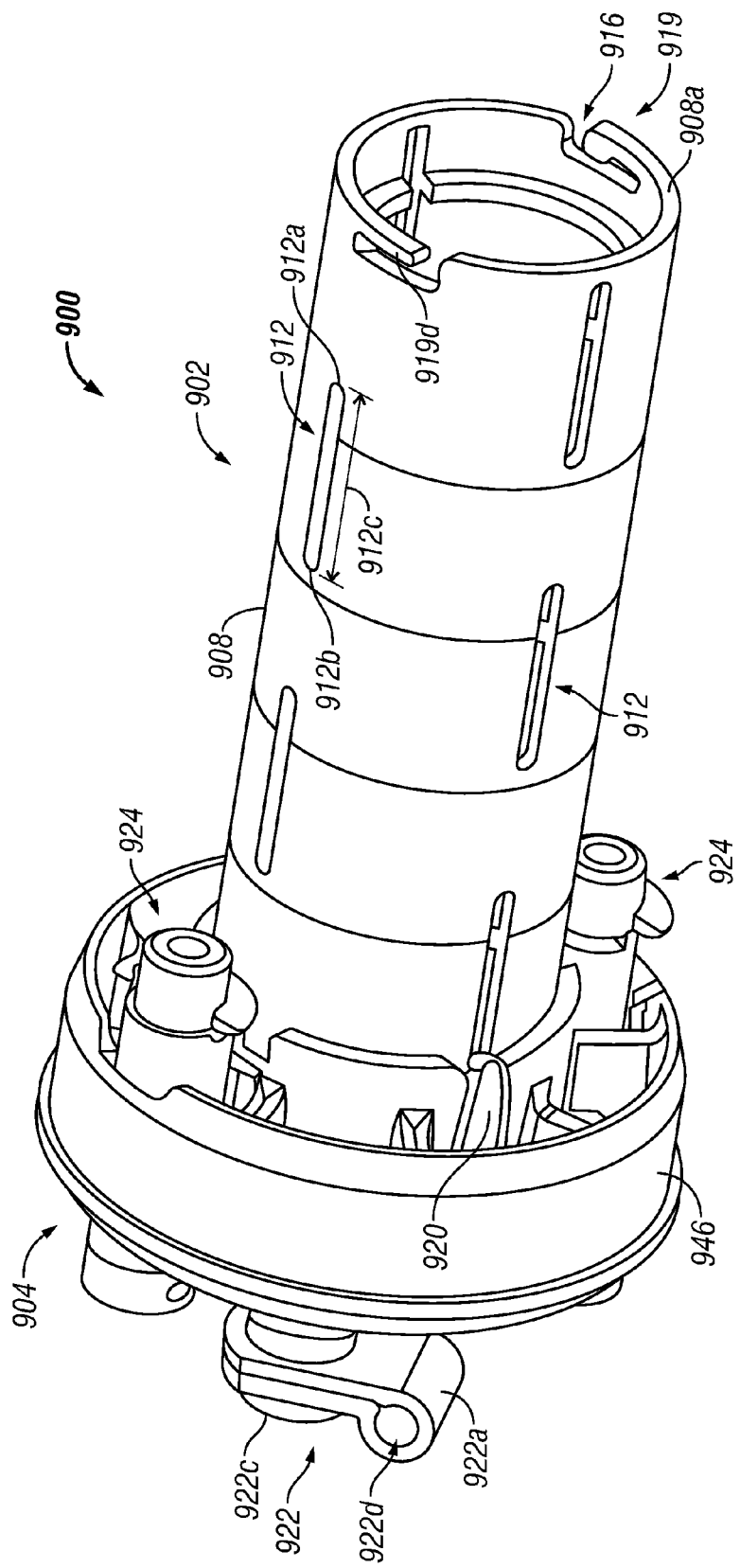
FIG. 23 is a perspective view of the port cover assembly of FIG. 16, showing the interior side of the cover cap and the bayonet slots on the tubular member.

As best viewed in FIG. 22B, flanged portion 951b has a surface 951d with a pitch 951e, wherein pitch 951e is the angle between a vector 951f extending normally from surface 951d and longitudinal axis 951c. In some embodiments, pitch 951e varies along the length of flanged portion 951b, which, as described above, extends circumferentially about tubular body 951a. As best viewed in FIG. 22A, flanged portion 951b further includes a cog 951g extending generally axially (relative to axis 951c) from a portion of surface 951d.

Gasket 952 is disposed between head 950d of latch operator 950 and outer surface 918b of circular body. Gasket 952 prevents and/or restricts moisture ingression between latch operator 950 and bore 918e of circular body 918 into transducer port 465.

To releasably couple port cover assembly 900 to spool piece 505, port cover assembly 900 is inserted into transducer port 465 until latches 951 are proximate face 140 of boss 135. A flathead screwdriver is inserted into each slot 950e of latch operators 950 and rotated to position flanged portions 951b of latches 951 radially inward (relative to axis 505), as illustrated by latch 951 in the upper half of FIG. 21 and in the lower half of FIG. 26. Once flanged portions 951b are positioned radially inward, port cover assembly 900 is inserted further into port 465 until heads 950d of latch operators 950 abut face 140 of boss 135. When heads 950d abut face 140, latches 951 are aligned axially (relative to axis 505) with second portion 938b of groove 938 in spool piece 505, as shown in FIG. 26.

Figure 21:
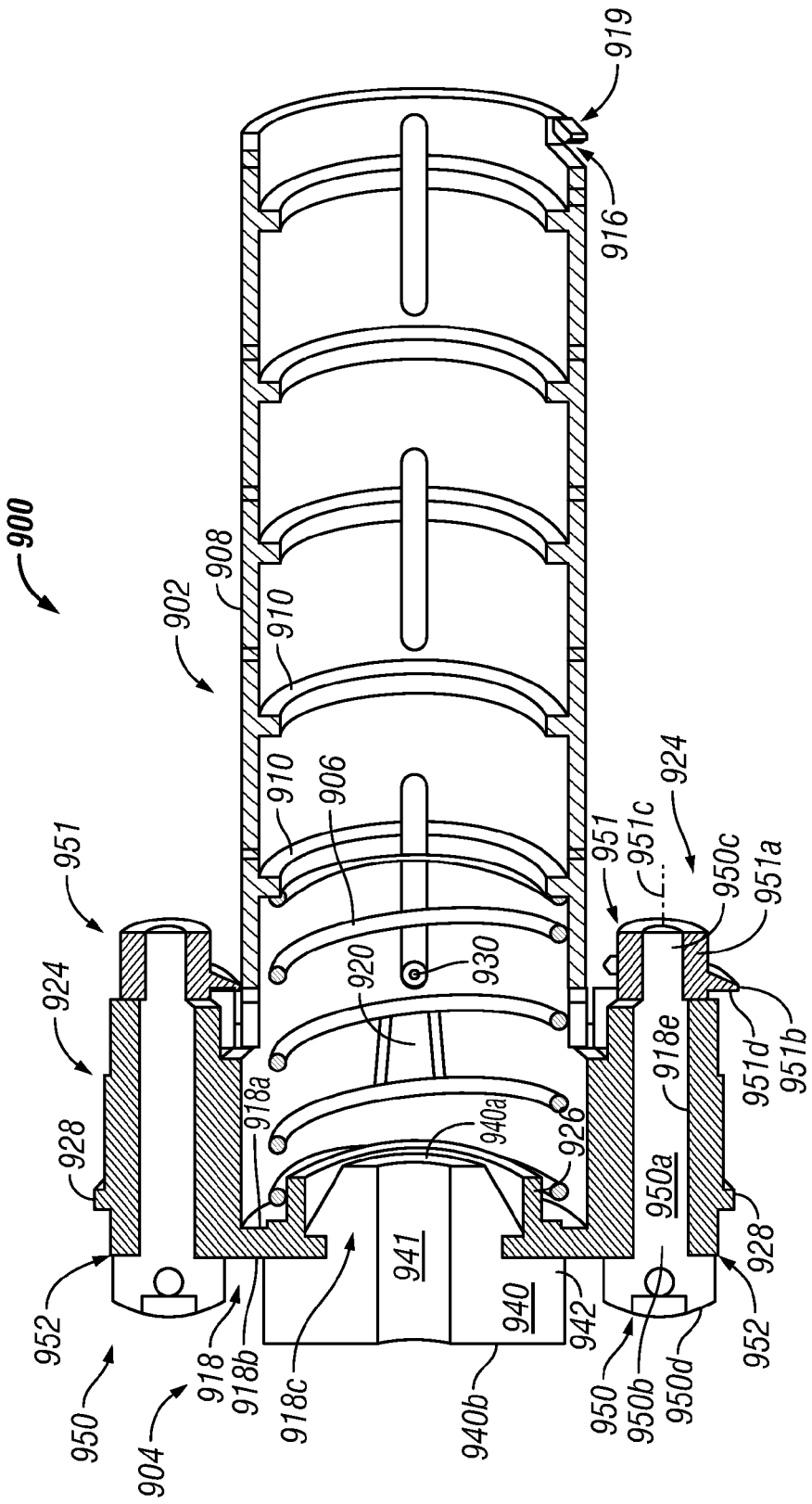
FIG. 21 is another enlarged cross-sectional view of the port cover assembly of FIG. 16, the cross-section shown offset from the cross-section of FIG. 20 by 90 degrees relative to the assembly axis.
Figure 26:
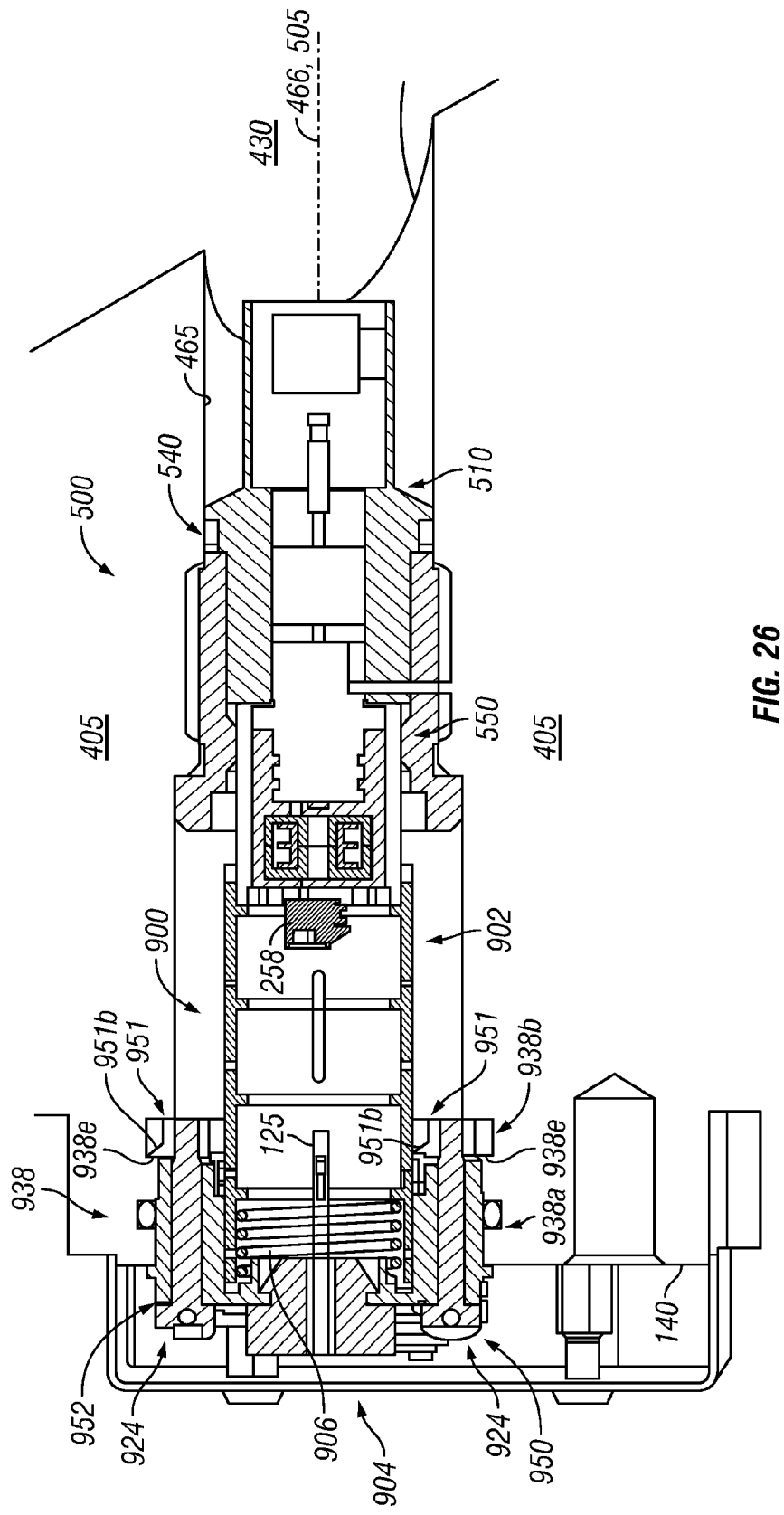
FIG. 26 is another partial cross-sectional view of the gas ultrasonic transducer assembly and sealed port cover assembly disposed in the transducer port of the ultrasonic flow meter of FIG. 16, the cross-section shown offset from the cross-section of FIG. 16 by 90 degrees relative to the port cover assembly axis.

Latch operators 950 are again rotated using a flathead screwdriver but this time to position flanged portions 951b of latches 951 radially outward (relative to axis 505) such that flanged portions 951b are received in second portions 938b of groove 938, as illustrated by latch 951 in the lower half of FIG. 21 and in the upper half of FIG. 26. As latch operators 950, and thus latches 951 are rotated, flanged portions 951b of latches 951 engage shoulder 938c of groove 938 over surfaces 951d. Due to the pitch 951e of surfaces 951d, engagement between flanged portions 951b and shoulder 938c causes axial displacement (relative to axis 505) of latches 924 and therefore cover cap 904 further into port 465 of spool piece 505, insuring stop shoulder 928 abuts face 140 of transducer boss 135 (FIG. 2). Furthermore, the pitch 951e of latches 951 provides increased resistance to rotation of latch assemblies 924 relative to spool piece 505 and consequently prevents inadvertent loosening of latch assemblies 924.

As previously described, each flanged portion 951b extends circumferentially about its respective tubular body 951a less than a full circumference of tubular body 951a. When engaged with shoulder 938c of spool piece 505, as described above, continued rotation of latches 951 relative to spool piece 505 will cause flanged portions 951b to disengage groove 938 unless prevented because each flanged portion 951b does not fully circumscribe its respective tubular body 951a and the latch operator 950 coupled thereto. Continued rotation of latch 951 and latch operator 950 coupled thereto is, however, limited by cog 951g, which engages tubular portion 946 of cover cap 304 to prevent further rotation of latch 951 and latch operator 950 beyond the point at which latch 951 disengages groove 938.

With flanged portions 951b of latches 951 received within second portion 938b of groove 938, port cover assembly 900 is releasably coupled to spool piece 505. Movement of port cover assembly 900 relative to spool piece 505 in an axially outward (relative to axis 505 and away from bore 430) direction is limited by engagement between flanged portions 951b of latches 951 and shoulder 938e of spool piece 505.

To decouple port cover assembly 900 from spool piece 505, latch operators 950 are rotated using a flathead screwdriver to position flanged portions 951b of latches 951 radially inward (relative to axis 505) such that flanged portions 951b do not extend into second portion 938b of groove 938. When so positioned, port cover assembly 900 is decoupled, or unlocked, spool piece 505 and may be pulled from port 465 of spool piece 505.

Referring to FIGS. 16, 20, and 21, spring centralizer 926 enables centralizing of spring 906 within tubular member 902. Spring centralizer 926 is disposed between tube levers 920 and extends axially (relative to axis 505) from inner surface 918a of circular body 918. Spring centralizer 926 is a tubular member with a radially inner (relative to central axis 110 of FIG. 2) or first end 926a proximal bore 430 and a radially outer (relative to central axis 110) or second end 926b coupled to, or formed integral with, inner surface 918a of circular body 918.

Referring to FIGS. 16, 20, and 21, spring 906 enables spring loading of port cover assembly 900. Spring 906 has a radially inner (relative to central axis 110 of FIG. 2) or first end 906a, proximal bore 430, and a radially outer (relative to central axis 110) or second end 906b, distal bore 430. Spring 906 is disposed within tubular member 902 with end 906a abutting the stop ring 910 proximate end 908b of tubular member 902. Further, spring 906 is compressed between cover cap 904 and the stop ring 910 with end 906b inserted over spring centralizer 926 and abutting inner surface 918a of cover cap 904. Thus, spring centralizer 926 enables end 906b of spring 906 to remain centralized within tubular member 902.

When installed as shown, cover cap 904 is axially translatable (relative to axis 505) relative to tubular member 902. This relative movement is limited by engagement of pins 930 of tube levers 920 of cover cap 904 with ends 912a, b of the slots 912 into which pins 930 of tube levers 920 are inserted. In the absence of a compressive load to cover cap 904, spring 906 expands against cover cap 904 and tubular member 902, causing cover cap 904 to translate axially away from tubular member 902, relatively speaking, until pins 930 engage second ends 912b of slots 912, as shown in FIG. 20. Engagement of pins 930 with second ends 912b prevents cover cap 904 from disengaging tubular member 902 under load from spring 906. Upon application of a compressive load to cover cap 904, cover cap 904 translates axially toward tubular member 902, compressing spring 906 against tubular member 902. Relative movement of cover cap 904 in this direction is limited by engagement of pins 930 with first ends 912a of slots 912. In this manner, cover cap 904 and tubular member 902, and thus port cover assembly 900, are spring-loaded.

Also when installed as shown, end 906b of spring 906 reacts against cover cap 904. Due to engagement of pins 930 of tube levers 920 with slots 912 proximate end 908b of tubular member 902, cover cap 904 is prevented from disengaging tubular member 902 under load from spring 906. At the same time, end 906a of spring 906 reacts against the stop ring 910 proximate end 908b of tubular member 902. The load exerted by spring 906 on the stop ring 910 causes tubular member 902 and transformer capsule 550 releasably coupled thereto to remain shouldered against housing 511 of piezoelectric capsule 510. This enables plug sockets 553 of transformer capsule 550 to remain coupled with electrical couplings 535 of piezoelectric capsule 510.

Referring now to FIGS. 16, 17, and 20-26, the order in which the various components of transducer assembly 500 and port cover assembly 900 are assembled may be varied. However, transducer assembly 500 and port cover assembly 900 are preferably assembled prior to insertion into port 465, and further, a first subassembly including transformer capsule 550 and port cover assembly 900 is preferably assembled prior to coupling transformer capsule 550 to piezoelectric capsule 510.

An exemplary method for assembling gas transducer assembly 500 and port cover assembly 900 will now be described with reference to FIGS. 16, 17, and 20-26. The first subassembly including transformer capsule 550 and port cover assembly 900 may be assembled by coupling transformer capsule 550, tubular member 902, cover cap 904, and spring 906 in any particular order. As one example, these components may be assembled in the following order.

First, spring 906 is inserted through end 908b of tubular member 902 to abut the stop ring 910 proximate end 908b. Cover cap 904 is then releasably coupled to tubular member 902 with spring 906 compressed therebetween. A tension load is applied to each tube lever 920, causing first ends 920a of tube levers 920 to pivot radially outward about second ends 920b. With tube levers 920 pivoted radially outward, second end 908b of tubular member 902 is inserted between tube levers 920 of cover cap 904, compressing spring 906 between cover cap 904 and tubular member 902, and positioning second end 906b of spring 906, disposed within tubular member 902, over spring centralizer 926. Once tubular member 902 is positioned between tube levers 920 and spring 906 is positioned about spring centralizer 926, the tension load applied to tube levers 920 is removed, allowing first ends 920a of tube levers 920 to pivot radially inward and pins 930 to engage tubular member 902. If necessary, tubular member 902 is then rotated relative to cover cap 904 to align pins 930 of tube levers 920 within slots 912 proximal second end 908b of tubular member 902. When pins 930 engage within slots 912, cover cap 904 is releasably coupled to tubular member 902 with spring 906 compressed therebetween.

Next, cable 125 is inserted through passageway 941 of grommet 940, and grommet 940 is inserted through passage 918c of cover cap 904 such that cable 125 extends into tubular member 902. The end 960 of cable 125 to be coupled to terminal block 258, as shown in FIG. 16, is then pulled through tubular member 902, and a knot 942 is formed in cable 125 on the interior side (proximal bore 430) of cover cap 904. Knot 942 is formed in cable 125 at a position along cable 125 such that, when end 960 is coupled to terminal block 258, as shown, there is sufficient length between end 960 and knot 942 to prevent the application of tension along cable 125 to this coupling. Knot 942 in cable 125, when reacting against inner surface 918a of cover cap 904, provides resistance to tension loads that may be applied to cable 125 from outside of spool piece 505.

End 960 of cable 125 is next coupled to terminal block 258. End 960 of cable 125 is stripped of its outer jacket to expose the shield and two insulated conductors. The shield is twisted to form a wire, which is then inserted into the ground screw terminal 261 of terminal block 258 and the associated screw 262 tightened to electrically couple the shield to housing 251 of transformer capsule 250. Each of insulated conductors is inserted into one of the other screw terminals 261 and the associated screws 262 tightened to electrically couple the electronics package 195 to transformer capsule 250.

Next, tubular member 902, with cover cap 904 and spring 906 coupled thereto, is releasably coupled to transformer capsule 550. Transformer capsule 550 and tubular member 902 are positioned end-to-end, and axially displaced (relative to axis 505) relative to each other to insert pins 557 of transformer capsule 550 into first portions 916a of slots 916 in tubular member 902. With pins 557 inserted within portions 916a of slots 916, transformer capsule 550 and tubular member 902 are then rotated (about axis 505) relative to each other to displace pins 557 into and along second portions 916b of slots 916. As pins 557 displace within second portions 916b, pins 557 approach flanged portions 919c of levers 919. A load is applied to each bump out 919d of levers 919 to cause levers 919 to pivot radially inward (relative to axis 110). With levers 919 pivoted radially inward, transformer capsule 550 and tubular member 902 are further rotated relative to each other to displace pins 557 within second portions 916b of slots 916 beyond flanged portions 919c of levers 919. Once pins 557 displace beyond flanged portions 919c, the load applied to each bump out 919d of levers 919 is removed, allowing levers 919 to pivot radially outward and return to their original, unloaded positions. Tubular member 902 is now releasably coupled, or locked, to transformer capsule 550.

Finally, cable 125 is secured to cover cap 904 by a clamp assembly 922, which, as previously described, includes screw 922c, and cable clamp 922a. Cable 125 is inserted through receptacle 922d of cable clamp 922a. Screw 922c is then inserted through bore 922e of cable clamp 922 and coupled to a bottomed hole 918d of cover cap 904.

Before the first assembly is coupled to piezoelectric capsule 510, piezoelectric capsule 510 is threadingly coupled to spool piece 505 via mating threads 169, 538 with annular shoulder 537 of housing 511 in engagement with annular shoulder 167 of port 465. After piezoelectric capsule 510 is coupled within transducer port 465 to spool piece 505, the first subassembly, including port cover assembly 900 and transformer capsule 550, is coupled to piezoelectric capsule 510 by axially (relative to axis 505) inserting first end 550a of transformer capsule 550 into counterbore 517 of piezoelectric capsule 510 to shoulder transformer capsule 550 against piezoelectric capsule 510. Transformer capsule 550 is preferably seated in counterbore 517 such that end 535a, b of sealed electrical couplings 535 sufficiently engage mating female plug sockets 553 of transformer capsule 550.

Figure 27:
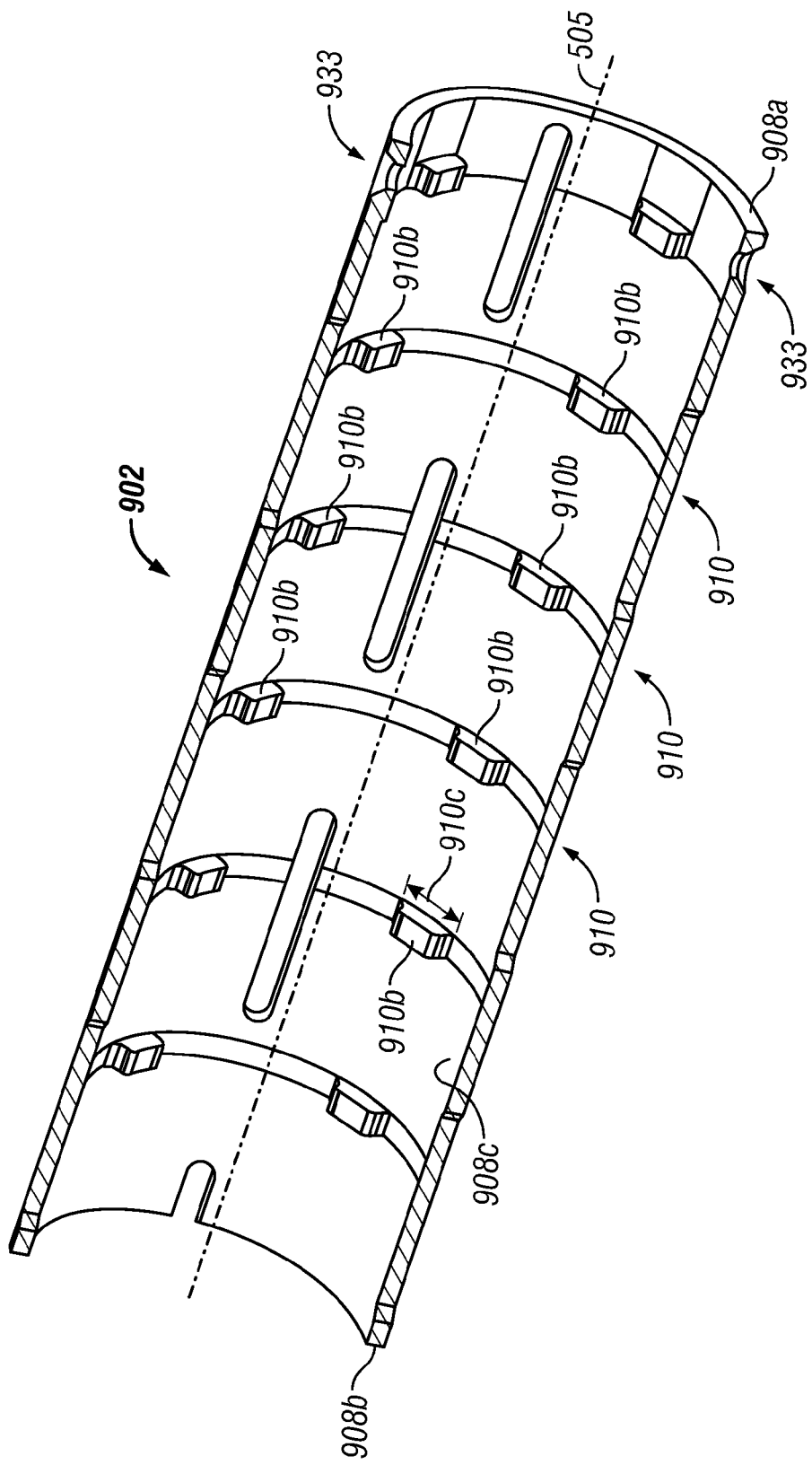
FIG. 27 is a cross-sectional view of another embodiment of a tubular member for a port cover assembly, wherein the tubular member has segmented stop rings.

In the above-described embodiment, port cover assembly 900 includes tubular member 902 having a plurality of stop rings 910, each of which extends continuously along the full circumference of inner surface 908c, as shown in FIG. 21. In other embodiments, each stop ring 910 may be shorter, extending less than the full circumference of inner surface 908c. In still other embodiments, illustrated by FIG. 27, tubular member 902 may include a plurality of segmented stop rings 910, meaning each stop ring 910 has two or more equally spaced, circumferentially speaking relative to axis 505, segments 910b, each extending circumferentially along inner surface 908c a distance 910c less than the full circumference of inner surface 908c. The segments 910b of each stop ring 910 may align circumferentially with segments 910b of adjacent stop rings 910, as shown in FIG. 27, or be circumferentially offset relative to segments 910b of the adjacent stop rings 910.

Further, tubular member 902 of port cover assembly shown in and described with reference to FIGS. 16-26 includes two bayonet slots 916 configured to receive pins 557 of transformer capsule 550 to enable coupling of these components 550, 902. In other embodiments, tubular member 902 and transformer capsule 550 may instead couple by means flat head screws inserted through two or more chamfered holes 933 formed in tubular member 902 at end 908a, as shown in FIG. 27, and threaded into an equal number of holes formed proximate end 550b of transformer capsule 550 with the same circumferential spacing.

Preferred embodiments of a port cover assembly have been described herein. Each port cover assembly 300, 900 enables coupling of cable 125 to a transducer assembly such that there is and remains negligible tension at this coupling. Each port cover assembly 300, 900 also enables cable 125 to be easily covered, for example, by cover 120. Port cover assembly 900 also prevents and/or restricts ingress of fluid, such as rainwater, melted snow, or atmospheric condensate, into the spool piece in which it is installed. Each port cover assembly 300, 900 couples to a transducer assembly in a different manner. Specifically, port cover assembly 300 couples to a transducer assembly via two latches 316, whereas port cover assembly 900 couples to a transducer assembly via bayonet connections 917. It should be readily apparent to one of ordinary skill in the art that either port cover assembly 300, 900 may be modified to connect to a transducer assembly using either type of coupling, latches 316 or bayonet connections 917, or another type of coupling, such as flat head screws inserted through the port cover assembly to threadingly engage the transducer assembly as described in connection with FIG. 27. It should also be appreciated that either port cover assembly 300, 900 may be coupled to any one of the three embodiments of a transducer assembly described herein.

While preferred embodiments have been shown and described, modifications thereof can be made by one skilled in the art without departing from the scope or teachings herein. The embodiments described herein are exemplary only and are not limiting. Many variations and modifications of the systems, apparatus, and processes described herein are possible and are within the scope of the invention. For example, the relative dimensions of various parts, the materials from which the various parts are made, and other parameters can be varied. Accordingly, the scope of protection is not limited to the embodiments described herein, but is only limited by the claims that follow, the scope of which shall include all equivalents of the subject matter of the claims.

What is claimed is:

1. An ultrasonic flow meter for measuring the flow of a fluid through a pipeline, the ultrasonic flow meter comprising:
    a spool piece having a throughbore and a transducer port extending from the throughbore to an outer surface of the spool piece;
    a transducer assembly disposed within the transducer port, the transducer assembly comprising a transformer, a piezoelectric element, and an electrical coupling therebetween; and
    a port cover assembly coupled to the transducer assembly, the port cover assembly receiving a cable coupled to the transducer assembly. wherein the port cover assembly is spring-loaded and configured to bias the port cover assembly toward the transducer assembly to resist the cable from being electrically uncoupled from the transducer assembly.

2. The ultrasonic flow meter of claim 1, wherein the transducer assembly provides a fluid barrier across the transducer port, the fluid barrier separating the transducer port into a first portion proximal the throughbore and a second portion distal the throughbore, wherein the first portion is in fluid communication with the throughbore and the fluid barrier restricts fluid communication between the throughbore and the second portion, and wherein the transducer assembly comprises a transformer coupled between a piezoelectric element and the cable, the transformer disposed within the second portion of the transducer port and the piezoelectric element disposed within the first portion.

3. The ultrasonic flow meter of claim 1, wherein the transducer assembly provides a fluid barrier across the transducer port, the fluid barrier separating the transducer port into a first portion that is proximal throughbore and a second portion that is distal throughbore, wherein the first portion is in fluid communication with the throughbore and the fluid barrier restricts fluid communication between the throughbore and the second portion, and wherein the transducer assembly comprises a transformer coupled between a piezoelectric element and the cable, the transformer and the piezoelectric element disposed within the first portion of the transducer port.

4. The ultrasonic flow meter of claim 1, wherein the port cover assembly has a central axis and comprises:
a tubular member releasably coupled to the transducer assembly;
a cover cap releasably coupled to the tubular member; and
a spring compressed therebetween.

5. The ultrasonic flow meter of claim 4, wherein the port cover assembly further comprises two levers, each lever having a first end connected to the cover cap and a second end with a pin extending therefrom, the lever radially pivotable about the first end to insert the pin into an axially extending slot formed in the tubular member, whereby the cover cap is releasably coupled to the tubular member.

6. The ultrasonic flow meter of claim 5, wherein, when the pins are inserted within the slots, the cover cap is axially displaceable relative to the tubular member, the relative movement of the cover cap and the tubular member being limited by engagement of the pins with ends of the slots.

7. The ultrasonic flow meter of claim 6, wherein the cover cap is axially displaceable relative to the tubular member under load from the spring.

8. The ultrasonic flow meter of claim 4, wherein the tubular member has an inner surface and a stop ring extending therefrom, wherein the spring is compressed between the cover cap and the stop ring.

9. The ultrasonic flow meter of claim 4, wherein the cover cap has a tubular spring centralizer extending axially therefrom, the spring centralizer receiving an end of the spring.

10. The ultrasonic flow meter of claim 4, wherein the port cover assembly further comprises one or more cable clips extending from the cover cap, wherein each cable clip is configured to secure the cable to the cover cap.

11. An ultrasonic flow meter for measuring the flow of a fluid through a pipeline, the ultrasonic flow meter comprising:
a spool piece having a throughbore and a transducer port extending from the throughbore to an outer surface of the spool piece;
a transducer assembly disposed within the transducer port, the transducer assembly comprising a transformer, a piezoelectric element, and an electrical coupling therebetween; and
a port cover assembly coupled to the transducer assembly, the port cover assembly receiving a cable that is coupled to the transducer assembly and having at least two latches releasably coupled to the spool piece, wherein the latches are configured to limit the movement of the port cover assembly relative to the spool piece.

12. The ultrasonic flow meter of claim 11, wherein the transducer assembly provides a fluid barrier across the transducer port, the fluid barrier separating the transducer port into a first portion proximal the throughbore and a second portion distal the throughbore, wherein the first portion is in fluid communication with the throughbore and the fluid barrier restricts fluid communication between the throughbore and the second portion, and wherein the transducer assembly comprises a transformer coupled between a piezoelectric element and the cable, the transformer disposed within the second portion of the transducer port and the piezoelectric element disposed within the first portion.

13. The ultrasonic flow meter of claim 11, wherein the transducer assembly provides a fluid barrier across the transducer port, the fluid barrier separating the transducer port into a first portion that is proximal throughbore and a second portion that is distal throughbore, wherein the first portion is in fluid communication with the throughbore and the fluid barrier restricts fluid communication between the throughbore and the second portion, and wherein the transducer assembly comprises a transformer coupled between a piezoelectric element and the cable, the transformer and the piezoelectric element disposed within the first portion of the transducer port.

14. The ultrasonic flow meter of claim 11, wherein the port cover assembly has a central axis and comprises:
a tubular member releasably coupled to the transducer assembly; and
a cover cap releasably coupled to the tubular member, wherein the two latches are coupled to the cover cap.

15. The ultrasonic flow meter of claim 14, wherein the cover cap has an annular shoulder extending substantially radially therefrom, the shoulder configured to limit insertion of the port cover assembly into the transducer port.

16. The ultrasonic flow meter of claim 14, wherein the port cover assembly further comprises two connections releasably coupling the tubular member to the transducer assembly.

17. The ultrasonic flow meter of claim 16, where each connection comprises a latch extending from the tubular member and a cutout formed in a housing of the transducer assembly, the latch pivotable to releasably engage the housing proximate the cutout.

18. The ultrasonic flow meter of claim 16, wherein each connection is a bayonet connection comprising a pin extending from a housing of the transducer assembly and a slot formed in the tubular member, the slot configured to receive the pin.

19. The ultrasonic flow meter of claim 11, wherein the spool piece has a groove and each of the latches releasably engages the groove.

20. The ultrasonic flow meter of claim 19, wherein each latch has a first end connected to the cover cap and a second end with a locking member extending therefrom, wherein each latch is radially pivotable about the corresponding first end to insert the locking member into the groove.

21. The ultrasonic flow meter of claim 19, wherein the port cover assembly further comprises two latch operators, each latch operator extending through the cover cap and having one latch coupled thereto, the latch operator rotatable relative to the cover cap to insert the latch into the groove.

22. The ultrasonic flow meter of claim 21, wherein each latch has a tubular body disposed about one latch operator and a flanged portion extending therefrom, the flanged portion insertable within the groove through rotation of the latch operator relative to the cover cap.

23. An ultrasonic flow meter for measuring the flow of a fluid through a pipeline, the ultrasonic flow meter comprising:
- a spool piece having a throughbore and a transducer port extending from the throughbore to an outer surface of the spool piece;
- a transducer assembly disposed within the transducer port, the transducer assembly including a first fluid barrier across the transducer port, the first fluid barrier separating the transducer port into a first portion proximal the throughbore and a second portion distal the throughbore, wherein the first portion is in fluid communication with the throughbore and the first fluid barrier restricts fluid communication between the throughbore and the second portion; and
- a port cover assembly coupled to the transducer assembly, the port cover assembly receiving a cable that is coupled to the transducer assembly and forming a second fluid barrier that restricts ingression of fluid external to the spool piece into the transducer port.

24. The ultrasonic flow meter of claim 23, wherein the transducer assembly comprises a transformer electrically coupled between a piezoelectric element and the cable, wherein the transformer is disposed within the second portion of the transducer port and the piezoelectric element is disposed within the first portion.

25. The ultrasonic flow meter of claim 23, wherein the transducer assembly comprises a transformer electrically coupled between a piezoelectric element and the cable, wherein the transformer and the piezoelectric element are disposed within the first portion of the transducer port.

26. The ultrasonic flow meter of claim 23, wherein the port cover assembly is a seal that prevents ingression of fluid external to the spool piece into the transducer port.

27. The ultrasonic flow meter of claim 23, wherein the port cover assembly comprises a cover cap in sealing engagement with the spool piece.

28. The ultrasonic flow meter of claim 27, wherein the cover cap comprises:
- a circular body with a passage formed therein; and
- a grommet inserted through the passage, the grommet receiving the cable therethrough.

29. The ultrasonic flow meter of claim 28, wherein the grommet is an elastomeric member compression fit within the passage.

30. The ultrasonic flow meter of claim 27, wherein the port cover assembly further comprises a tubular member releasably coupled to the cover cap, the tubular member having an axially extending vent port with an inlet in fluid communication with the transducer port and an outlet sealingly covered by the grommet.

31. The ultrasonic flow meter of claim 30, wherein the grommet is deformable under fluid pressure within the transducer port to uncover the outlet, whereby at least some fluid is released from the transducer port through the vent port.

32. The ultrasonic flow meter of claim 27, further comprising one or more cable clamp assemblies, each cable clamp assembly operable to secure the cable to the cover cap and comprising:
- a cable clamp having a receptacle configured to receive the cable;
- a gasket disposed between the cable clamp and the cover cap; and
- a screw inserted through the cable clamp and the gasket and coupled to the cover cap.

33. The ultrasonic flow meter of claim 27, wherein the port cover assembly further comprises two latch assemblies, each latch assembly operable to releasably couple the port cover assembly to the spool piece and comprising:
- a latch operator extending through the cover cap;
- a sealing member disposed between the latch operator and the cover cap; and
- a latch coupled to the latch operator;
- wherein the latch operator is rotatable relative to the cover cap to insert the latch into the a groove in the spool piece.

* * * * *